(12) United States Patent
Umehara et al.

(10) Patent No.: US 10,423,528 B2
(45) Date of Patent: Sep. 24, 2019

(54) OPERATION PROCESSING DEVICE, INFORMATION PROCESSING APPARATUS, AND CONTROL METHOD FOR OPERATION PROCESSING DEVICE

(71) Applicant: FUJITSU LIMITED, Kawasaki-shi, Kanagawa (JP)

(72) Inventors: Kenta Umehara, Yokohama (JP); Toru Hikichi, Inagi (JP); Hideaki Tomatsuri, Narashino (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 15/616,102

(22) Filed: Jun. 7, 2017

(65) Prior Publication Data

US 2018/0004661 A1 Jan. 4, 2018

(30) Foreign Application Priority Data

Jun. 29, 2016 (JP) .................................. 2016-128896

(51) Int. Cl.
| G06F 12/0808 | (2016.01) |
| G06F 12/0806 | (2016.01) |
| G06F 12/0815 | (2016.01) |
| G06F 12/0891 | (2016.01) |

(52) U.S. Cl.
CPC ...... *G06F 12/0808* (2013.01); *G06F 12/0806* (2013.01); *G06F 12/0815* (2013.01); *G06F 12/0891* (2013.01)

(58) Field of Classification Search
None
See application file for complete search history.

(56) References Cited

U.S. PATENT DOCUMENTS

| 2006/0224829 A1* | 10/2006 | Evrard ................ G06F 12/0891 711/133 |
| 2007/0168617 A1 | 7/2007 | Borkernhagen et al. |
| 2013/0111136 A1* | 5/2013 | Bell, Jr. .................. G06F 12/08 711/122 |

FOREIGN PATENT DOCUMENTS

| JP | 10-105463 | 4/1998 |
| JP | 2009-524137 | 6/2009 |

* cited by examiner

*Primary Examiner* — Denise Tran
(74) *Attorney, Agent, or Firm* — Staas & Halsey LLP

(57) ABSTRACT

An apparatus includes: a processor core to execute an instruction; a first cache to retain data used by the processor core; and a second cache to be coupled to the first cache, wherein the second cache includes a data-retaining circuit to include storage areas to retain data, an information-retaining circuit to retain management information that includes first state information for indicating a state of data retained in the data-retaining circuit, a state-determining circuit to determine, based on the management information, whether requested data that is requested with a read request from the first cache is retained in the data-retaining circuit, and an eviction-processing circuit to, where the state-determining circuit determines the requested data not to be retained in the data-retaining circuit with no enough space in the storage areas to store the requested data, evict data from the storage areas without issuing an eviction request based on the read request.

19 Claims, 51 Drawing Sheets

OPERATION PROCESSING DEVICE, INFORMATION PROCESSING APPARATUS, AND CONTROL METHOD FOR OPERATION PROCESSING DEVICE

CROSS-REFERENCE TO RELATED APPLICATION

This application is based upon and claims the benefit of priority of the prior Japanese Patent Application No. 2016-128896, filed on Jun. 29, 2016, the entire contents of which are incorporated herein by reference.

FIELD

The embodiments discussed herein are related to an operation processing device, an information processing apparatus, and a control method for the operation processing device.

BACKGROUND

An operation processing device such as a central processing unit (CPU) includes a cache memory (also called a cache) that may be accessed at a higher speed than a main storage device. The cache memory is arranged between a processor core, such as a CPU core that is an operation processing section, and the main storage device and retains a part of data stored in the main storage device.

In the case of the cache memory having a hierarchical structure, the operation processing device, for example, includes a second-level cache memory and a first-level cache memory that may be accessed at a higher speed than the second-level cache memory. Hereinafter, the first-level cache memory and the second-level cache memory may be respectively referred to as a primary cache memory and a secondary cache memory.

The secondary cache memory, in the case of access target data not being retained in the primary cache memory (in the case of a cache miss occurring in the primary cache memory), is accessed by the primary cache memory. For example, the primary cache memory outputs a read request to the secondary cache memory in the case of occurrence of a cache miss.

The secondary cache memory, in the case of retaining requested data requested with the read request (in the case of a cache hit occurring in the secondary cache memory), transfers the requested data to the processor core through the primary cache memory. The secondary cache memory, in the case of not retaining the requested data (in the case of a cache miss occurring in the secondary cache memory), acquires the requested data from the main storage device and transfers the acquired requested data to the processor core through the primary cache memory. The secondary cache memory retains the requested data acquired from the main storage device. Accordingly, the requested data that is requested with the read request from the primary cache memory is registered in the secondary cache memory.

The secondary cache memory, in the case of a storage areas that stores the requested data acquired from the main storage device not having a space, executes a replacement process of evicting any data retained in the secondary cache memory from the storage area. Hereinafter, the data that is evicted from the secondary cache memory by the replacement process may be referred to as eviction target data. For example, the secondary cache memory selects data having the longest time of not being accessed as the eviction target data. Suggested as a method for selecting the eviction target data is a method of preferentially selecting data not retained in the primary cache memory as the eviction target data (refer to, for example, Japanese National Publication of International Patent Application No. 2009-524137 and Japanese Laid-open Patent Publication No. 10-105463).

The secondary cache memory includes a processing section that executes a process based on a process request such as a read request. This type of secondary cache memory, in the case of, for example, occurrence of a cache miss, issues a request for the replacement process (hereinafter, may be referred to as a replacement request) in the secondary cache memory and inputs the request into the processing section. The processing section that receives the replacement request executes the replacement process. In this case, for one read request from the primary cache memory, the processing section in the secondary cache memory receives not only the read request but also a plurality of process requests such as a replacement request. For example, the throughput of a series of processes executed in correspondence with one read request from the primary cache memory is decreased along with an increase in the number of process requests received by the processing section in the secondary cache memory. That is, the throughput of a cache memory is decreased along with an increase in the number of process requests issued for the processing section in the secondary cache memory.

SUMMARY

According to an aspect of the embodiments, an operation-processing device includes: an operation-processing circuit configured to execute an instruction; a first cache configured to retain data used by the operation-processing circuit; and a second cache configured to be coupled to the first cache, wherein the second cache includes a data-retaining circuit configured to include a plurality of storage areas to retain data, a first information-retaining circuit configured to retain first management information that includes first state information for indicating a state of data retained in the data-retaining circuit, a state-determining circuit configured to determine, based on the first management information, whether requested data that is requested with a read request from the first cache is retained in the data-retaining circuit, and an eviction-processing circuit configured to, where the state-determining circuit determines the requested data not to be retained in the data-retaining circuit with no enough space in the storage areas to store the requested data, evict data from any of the plurality of storage areas without issuing an eviction request based on the read request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described by using the drawings.

Figure 1:
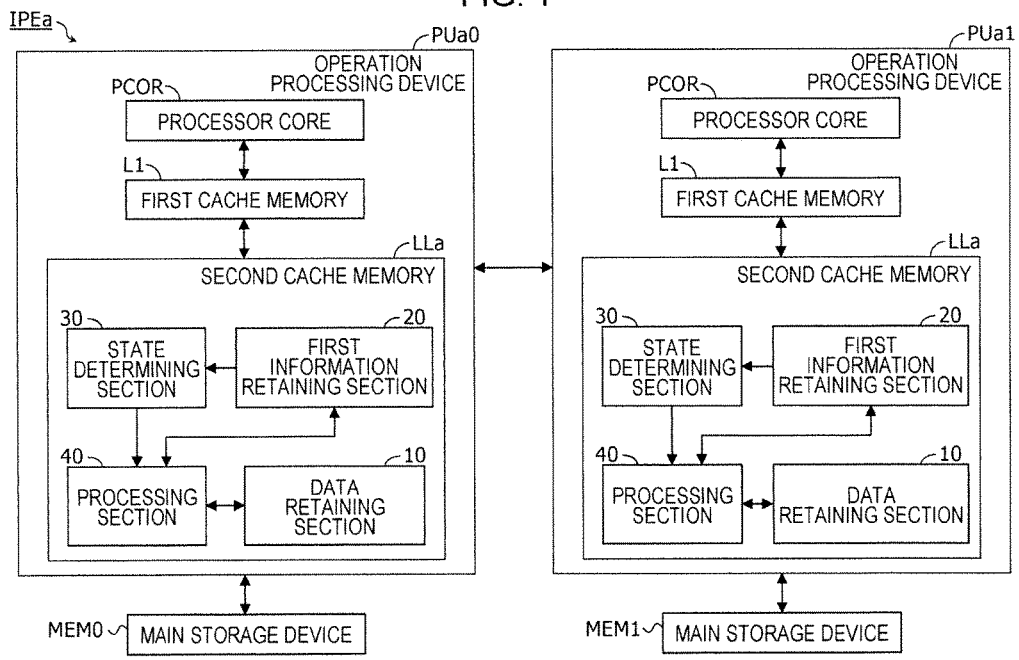
FIG. 1 is a diagram illustrating one embodiment of an operation processing device, an information processing apparatus, and a control method for the operation processing device.

FIG. 1 illustrates one embodiment of an operation processing device, an information processing apparatus, and a control method for the operation processing device. An information processing apparatus IPEa illustrated in FIG. 1 is a computer apparatus such as a server. For example, the information processing apparatus IPEa includes a plurality of operation processing devices PUa (PUa0 and PUa1) communicably connected to each other and a plurality of main storage devices MEM (MEM0 and MEM1) respectively connected to the plurality of operation processing devices PUa. The number of operation processing devices PUa is not limited to the example illustrated in FIG. 1.

The operation processing device PUa is a processor such as a CPU that executes an instruction. The operation processing device PUa includes a processor core PCOR such as a CPU core, a first cache memory L1 retaining data used by the processor core PCOR, and a second cache memory LLa connected to the first cache memory L1.

The processor core PCOR, for example, executes an operation or the like based on an instruction by referencing data retained in the first cache memory L1. That is, the processor core PCOR is one example of an operation processing section that executes an instruction.

The first cache memory L1, for example, is a set-associative cache memory and is a primary cache memory that may be accessed at a higher speed than the second cache memory LLa. The first cache memory L1 retains a part of data retained in the second cache memory LLa. For example, the first cache memory L1, in the case of receiving a load instruction from the processor core PCOR, outputs data requested with the load instruction to the processor core PCOR. The first cache memory L1, in the case of not retaining the data requested with the load instruction (in the case of a cache miss occurring in the first cache memory L1), outputs a read request to the second cache memory LLa. For example, the first cache memory L1, in the case of not retaining data requested with a store instruction received from the processor core PCOR (in the case of a cache miss occurring in the first cache memory L1), outputs a read request to the second cache memory LLa.

Accordingly, a read request to the second cache memory LLa is caused by a cache miss that occurs in the first cache memory L1 due to a store or load instruction from the processor core PCOR. A prefetch request from the first cache memory L1 is included in one type of read request issued to the second cache memory LLa.

The second cache memory LLa, for example, is a set-associative cache memory and is connected to the first cache memory L1. That is, the second cache memory LLa is a secondary cache memory of a lower level than the first cache memory L1. The second cache memory LLa includes a data retaining section (also called a data-retaining circuit) 10, a first information retaining section (also called a first information-retaining circuit) 20, a state determining section (also called state-determining circuit) 30, and a processing section (also called an eviction-processing circuit) 40.

The data retaining section 10, for each index address of the second cache memory LLa, retains a part of data stored in the main storage device MEM that is a storage device of a lower level than the second cache memory LLa. The index address corresponds to a bit group of a part of a memory address that is used in access to data. For example, the index address of the second cache memory LLa corresponds to a cache line number of the second cache memory LLa.

The first information retaining section 20 retains first management information that includes first state information indicating the state of data retained in the data retaining section 10. For example, the first information retaining section 20, for each index address of the second cache memory LLa, retains a tag address of the second cache memory LLa and the first management information including the first state information or the like. The tag address corresponds to a part of a bit group of the memory address except for the index address.

The first state information included in the first management information indicates the state of data (cache line) indicated by the index address and the tag address of the second cache memory LLa. In the MESI protocol, the state of data is classified as any of "Modified", "Exclusive", "Shared", and "Invalid". For example, the state of dirty data that is updated by a store operation or the like and rewritten is classified as "Modified". The state of clean data that is retained in only one second cache memory LLa of a plurality of second cache memories LLa and not updated is classified as "Exclusive". The state of clean data that is retained in the plurality of second cache memories LLa is classified as "Shared". The state of meaningless data such as data after initialization of the second cache memory LLa or invalidated data is classified as "Invalid". Hereinafter, "Modified", "Exclusive", "Shared", and "Invalid" may be respectively referred to as "M", "E", "S", and "I".

The state determining section 30 determines whether or not requested data requested with a read request is retained in the data retaining section 10 based on the first management information. For example, the state determining section 30 references the first management information, of the first management information retained in the first information retaining section 20, of a cache line that is indicated by the index address included in the memory address of the requested data. Hereinafter, the index address and the tag address included in the memory address of the requested data may be respectively referred to as the index address and the tag address of the requested data. For example, the state determining section 30, in the case of the tag address of the requested data being registered in the first management information of the cache line indicated by the index address of the requested data, determines the requested data to be retained in the data retaining section 10.

That is, the state determining section 30, in the case of the tag address of the requested data being registered in the first management information of the cache line indicated by the index address of the requested data, determines a cache hit to occur in the second cache memory LLa. The state determining section 30, in the case of the tag address of the requested data not being registered in the first management information of the cache line indicated by the index address of the requested data, determines a cache miss to occur in the second cache memory LLa.

The processing section 40, for example, in the case of the state determining section 30 determining the requested data to be retained in the data retaining section 10, transfers the requested data from the data retaining section 10 to the first cache memory L1. The processing section 40, in the case of the state determining section 30 determining the requested data not to be retained in the data retaining section 10, request the main storage device MEM to transfer the requested data. For example, the processing section 40 issues a read request for the requested data to the main storage device MEM. Accordingly, the requested data is transferred from the main storage device MEM to the second cache memory LLa. The processing section 40 stores, in the data retaining section 10, the requested data that is transferred from the main storage device MEM to the second cache memory LLa. Accordingly, the requested data is registered in the second cache memory LLa. The processing section 40 transfers the requested data from the data retaining section 10 to the first cache memory L1.

The processing section 40, in the case of a storage area of the data retaining section 10 not having a space to store the requested data, executes a process of evicting data from any of a plurality of storage areas of the data retaining section 10 without issuing an eviction request based on the read request. The eviction request is a request for a process of evicting data from the data retaining section 10 and is a process request subsequent to the read request.

That is, the processing section 40, during an execution cycle of the read request, executes a process of evicting data from the data retaining section 10 without issuing an eviction request. Hereinafter, the data that is evicted from the data retaining section 10 may be referred to as eviction target data.

For example, the processing section 40, in the case of the state of the eviction target data being equal to "Exclusive", sets the first state information included in the first management information of the eviction target data to "Invalid" during the execution cycle of the read request. The requested data that is transferred from the main storage device MEM to the second cache memory LLa is registered in the cache line having the first state information thereof set to "Invalid". Accordingly, the processing section 40, as a process of evicting the eviction target data from the data retaining section 10, executes a process of setting the first state information included in the first management information of the eviction target data to "Invalid" during the execution cycle of the read request.

That is, the processing section 40, in the case of the state determining section 30 determining the requested data not to be retained in the data retaining section 10 with no enough space in the storage area to register the requested data, executes a process of evicting data from any of the plurality of storage areas without issuing an eviction request.

An eviction request subsequent to the read request may be issued. That is, the second cache memory LLa may be differently used in the case of issuing an eviction request in the second cache memory LLa and inputting the eviction request into the processing section 40 and in the case of executing a process of evicting data from the data retaining section 10 without issuing an eviction request. For example, the processing section 40 that receives an eviction request executes a process of evicting the eviction target data requested with the eviction request from the data retaining section 10.

In the case of executing a process of evicting data from the data retaining section 10 without issuing an eviction request, the number of process requests input into the processing section 40 may be decreased compared with the case of issuing an eviction request. Consequently, the throughput of the processing section 40 at the time of executing a series of processes for one read request from the first cache memory L1 may be improved. That is, the throughput at the time of a cache miss occurring in the second cache memory LLa may be improved.

The configurations of the operation processing device PUa and the information processing apparatus IPEa are not limited to the example illustrated in FIG. 1. For example, the operation processing device PUa may include a plurality of sets of the processor core PCOR and the first cache memory L1. In this case, the second cache memory LLa is shared by the plurality of processor cores PCOR and is connected to the plurality of first cache memories L1.

In the embodiment heretofore illustrated in FIG. 1, the second cache memory LLa includes the data retaining section 10, the first information retaining section 20, the state determining section 30, and the processing section 40. The state determining section 30 determines whether or not requested data requested with a read request from the first cache memory L1 is retained in the data retaining section 10 based on the first management information. The processing section 40, in the case of the state determining section 30 determining the requested data not to be retained in the data retaining section 10 with no enough space in the storage area to store the requested data, executes a process of evicting data from any of the plurality of storage areas without issuing an eviction request.

For example, the processing section 40 executes a process of evicting data from the data retaining section 10 without issuing an eviction request, and thereby the number of process requests input into the processing section 40 may be decreased compared with the case of issuing an eviction request. Consequently, the throughput of the processing section 40 at the time of executing a series of processes for one read request from the first cache memory L1 may be improved. Accordingly, the throughput of the second cache memory LLa may be improved.

Figure 2:
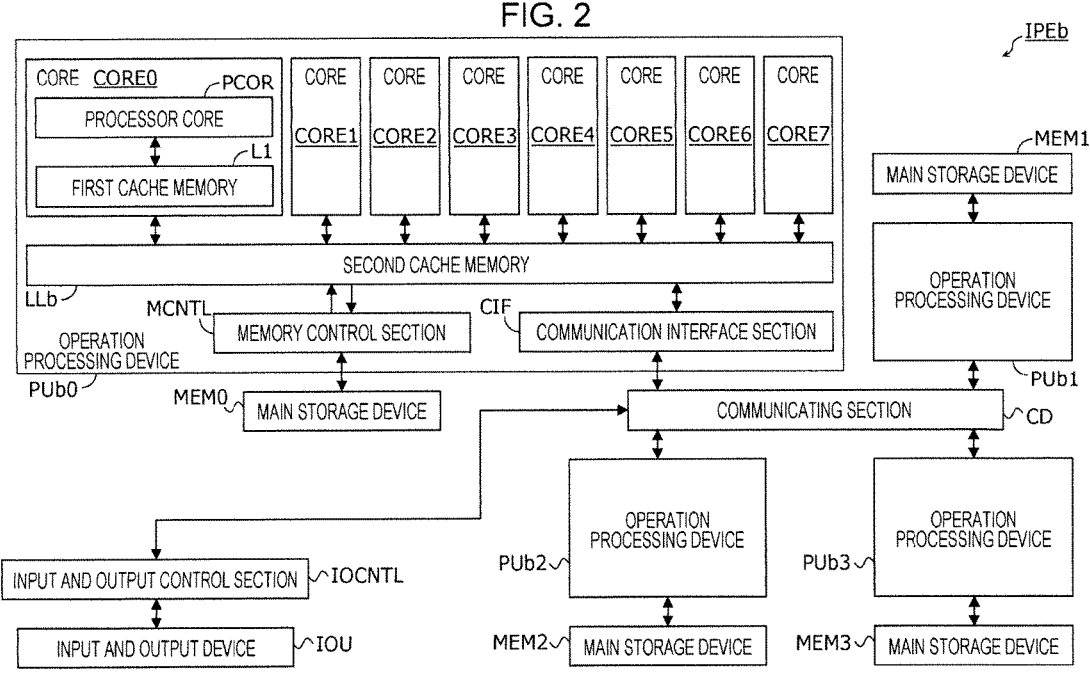
FIG. 2 is a diagram illustrating another embodiment of an operation processing device, an information processing apparatus, and a control method for the operation processing device.

FIG. 2 illustrates another embodiment of an operation processing device, an information processing apparatus, and a control method for the operation processing device. The same or corresponding elements as the elements described in FIG. 1 will be designated by the same or corresponding reference signs and will not be described in detail. An information processing apparatus IPEb illustrated in FIG. 2 is a computer apparatus such as a server. For example, the information processing apparatus IPEb includes a plurality of operation processing devices PUb (PUb0, PUb1, PUb2, and PUb3), a plurality of main storage devices MEM (MEM0, MEM1, MEM2, and MEM3), a communicating section CD, an input and output control section IOCNTL, and an input and output device IOU. The number of operation processing devices PUb and the number of main storage devices MEM are not limited to the example illustrated in FIG. 2. The plurality of operation processing devices PUb, the plurality of main storage devices MEM, the communicating section CD, and the input and output control section IOCNTL, for example, are mounted on a system board of the server.

The operation processing device PUb includes a plurality of cores CORE (CORE0, CORE1, . . . , CORE7), a second cache memory LLb, a memory control section (also called memory control circuit) MCNTL, and a communication interface section (also called a communication interface circuit) CIF. In FIG. 2 and thereafter, the number of cores CORE will be described as eight. The number of cores CORE is not limited to eight.

Each core CORE includes the corresponding processor core PCOR and the corresponding first cache memory L1 and is connected to the second cache memory LLb.

The processor core PCOR is the same as or corresponds to the processor core PCOR illustrated in FIG. 1. For example, the processor core PCOR executes an operation or the like based on an instruction by referencing data retained in the first cache memory L1.

The first cache memory L1, for example, is a set-associative cache memory and is the same as or corresponds to the first cache memory L1 illustrated in FIG. 1. The first cache memory L1 is a primary cache memory that may be accessed at a higher speed than the second cache memory LLb, and retains a part of data retained in the second cache memory LLb.

The second cache memory LLb is a set-associative cache memory and is connected to the memory control section MCNTL, the communication interface section CIF, the plurality of cores CORE, and the like. That is, the second cache memory LLb is a secondary cache memory of a lower level than the first cache memory L1 and is shared by the plurality of cores CORE. Details of the second cache memory LLb will be described in FIG. 3.

For example, the main storage device MEM of a lower level than the second cache memory LLb is connected to the memory control section MCNTL. The memory control section MCNTL executes data transfer or the like with the second cache memory LLb and the main storage device MEM. In the example illustrated in FIG. 2, data transfer between the memory control section MCNTL and the main storage device MEM is executed by using a bidirectional bus, and data transfer between the memory control section MCNTL and the second cache memory LLb is executed by unidirectional transfer. Data transfer between the memory control section MCNTL and another module is not limited to the example illustrated in FIG. 2.

The memory control section MCNTL operates in conjunction with the second cache memory LLb. For example, one memory control section MCNTL operates under one second cache memory LLb. For example, in the case of the information processing apparatus PUa1 having a cache coherent non-uniform memory access (ccNUMA) configuration, the memory control section MCNTL controls one local memory address space constituting ccNUMA. A group that includes the core CORE, the second cache memory LLb, and the memory control section MCNTL included in one node constituting ccNUMA may be referred to as a core memory group (CMG). For example, a plurality of CMGs may be mounted on one semiconductor chip, and one semiconductor chip may be mounted on the system board. One CMG may be mounted on one semiconductor chip, and a plurality of semiconductor chips may be connected on the system board.

The main storage device MEM, for example, is a memory of a lower level than the second cache memory LLb and is connected to the memory control section MCNTL in the operation processing device PUb.

For example, the communicating section CD is connected to the communication interface section CIF. For example, the operation processing device PUb executes data transfer or the like with another operation processing device PUb through the communicating section CD.

The communicating section CD is connected to the plurality of operation processing devices PUb and to the input and output control section IOCNTL and executes communication between the operation processing device PUb and the input and output control section IOCNTL, communication between the operation processing devices PUb, or the like.

For example, the input and output device IOU is connected to the input and output control section IOCNTL. The input and output control section IOCNTL executes data transfer or the like between the input and output device IOU and the communicating section CD. The input and output device IOU is an input device such as a keyboard to input data into the operation processing device PUb, an output device such as a display to output a process result of the operation processing device PUb, and the like.

The configurations of the operation processing device PUb and the information processing apparatus IPEb are not limited to the example illustrated in FIG. 2. For example, the first cache memory L1 and the second cache memory LLb may be cache memories other than set-associative cache memories (for example, direct-mapped cache memories). The number of levels of cache memories may be greater than or equal to three. The information processing apparatus IPEb may include a CPU connection interface device that is connected to another information processing apparatus IPEb. In this case, the CPU connection interface device in the information processing apparatus IPEb is connected to the CPU connection interface device in another information processing apparatus IPEb.

Figure 3:
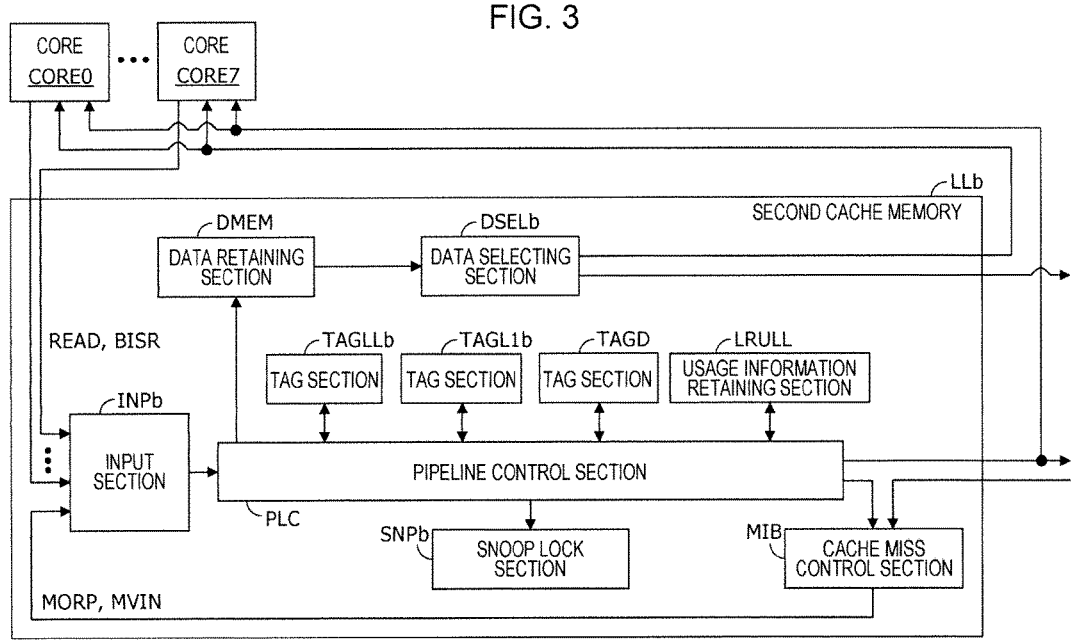
FIG. 3 is a diagram illustrating one example of a second cache memory illustrated in FIG. 2.

FIG. 3 illustrates one example of the second cache memory LLb illustrated in FIG. 2. The configuration of the second cache memory LLb is not limited to the example illustrated in FIG. 3.

The second cache memory LLb includes a data retaining section (also called a data-retaining circuit) DMEM, a data selecting section (also called a data-selecting circuit) DSELb, tag sections (also called tag circuits) TAGLLb, TAGL1$b$, and TAGD, a usage information retaining section (also called a usage information-retaining circuit) LRULL, an input section (also called an input circuit) INPb, and a pipeline control section (also called a pipeline control circuit) PLC. Furthermore, the second cache memory LLb includes a snoop lock section (also called a snoop lock circuit) SNPb and a cache miss control section (also called a cache miss control circuit) MIB.

Figure 4:
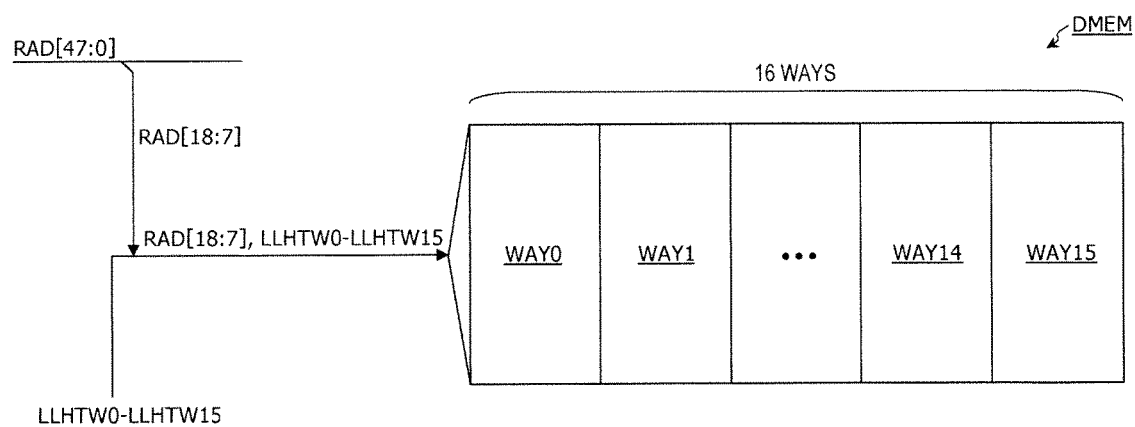
FIG. 4 is a diagram illustrating one example of a data retaining section illustrated in FIG. 3.

The data retaining section DMEM retains a part of data stored in the main storage device MEM or the like connected to the memory control section MCNTL. For example, the data retaining section DMEM, as illustrated in FIG. 4, includes a plurality of ways that retains data for each index address. The storage capacity of the data retaining section DMEM is great compared with the storage capacity of the first cache memory L1.

The data selecting section DSELb controls data transfer between the data retaining section DMEM and the memory control section MCNTL, data transfer between the data retaining section DMEM and another CMG, or the like. Details of the data selecting section DSELb will be described in FIG. 8.

The tag section TAGLLb retains the first management information that includes the first state information indicating the state of data retained in the data retaining section DMEM. That is, the tag section TAGLLb is one example of a first information retaining section. The tag section TAGL1$b$ retains second management information that includes second state information indicating the state of data retained in the first cache memory L1. That is, the tag section TAGL1$b$ is one example of a second information retaining section (also called a second information-retaining circuit). Details of the tag sections TAGLLb and TAGL1$b$ will be described in FIG. 5.

The tag section TAGD retains directory information that indicates the state of data to be managed by one node of the ccNUMA configuration. For example, the tag section TAGD retains the directory information of ccNUMA managed by the second cache memory LLb including the tag section TAGD and manages the state of data output to another CMG. Hereinafter, the case of the memory address of data processed by the second cache memory LLb residing in the scope of management of the current CMG may be referred to as "Local=Host". The case of the memory address of data processed by the second cache memory LLb residing outside of the scope of management of the current CMG may be referred to as "Local≠Host".

For example, the state of data (directory) in the case of another CMG retaining data in the address space of "Local=Host" is classified as any of "Exclusive", "Shared", and "Invalid". "Exclusive" indicates the state of only a target CMG retaining data. It is not guaranteed that data is not updated. That is, "Exclusive" includes the state of retainment in "M" in the MESI protocol. "Shared" indicates the state of one or more second cache memories LLb of another CMG retaining target data. "Invalid" indicates the state of another CMG not retaining target data. For example, the tag section TAGD has a function of displaying the directory information for a requested address at the time of a pipeline process in "Local=Host".

The usage information retaining section LRULL retains selection information for selecting a way that has the longest waiting time of no access by any of the plurality of first cache memories L1 of the plurality of ways of the data retaining section DMEM. For example, in the case of a cache miss occurring in the second cache memory LLb with the second cache memory LLb not having an area to register data transferred from the main storage device MEM to the second cache memory LLb, a replacement process of evicting any data retained in the second cache memory LLb is executed. At this point, a way that is a storing destination of the data from the main storage device MEM (that is, a way retaining the evicted data) is determined by least recently used (LRU) using the selection information retained in the usage information retaining section LRULL. Details of the usage information retaining section LRULL will be described in FIG. 5.

The input section INPb receives a process request from the core CORE, the cache miss control section MIB, or the like and inputs the received process request into the pipeline control section PLC. For example, the input section INPb receives a process request READ, BISR, or the like from the core CORE and receives a process request MORP, MVIN, or the like from the cache miss control section MIB. Hereinafter, the process request MORP may be referred to as an eviction request MORP.

In a process based on the process request READ (hereinafter, may be referred to as a read request READ), the second cache memory LLb responds with data to the first cache memory L1 in the case of occurrence of a cache hit. The second cache memory LLb issues a read request to the main storage device MEM in the case of occurrence of a cache miss.

In a process based on the process request BISR, for example, the second cache memory LLb executes a replacement completion process (a process related to completion of the replacement process) or the like that does not accompany write-back from the first cache memory L1 to the second cache memory LLb.

In a process based on the process request MORP, the second cache memory LLb executes a process of evicting data from the data retaining section DMEM. The process request MORP is a process request subsequent to the process request READ. That is, the process request MORP is an eviction request based on the read request READ.

In a process based on the process request MVIN, the second cache memory LLb registers data requested with the read request READ in the second cache memory LLb and responds with the data to the first cache memory L1. The process request MVIN is a process request subsequent to the process request READ.

The pipeline control section PLC, based on information retained in the tag section TAGLLb or TAGL1b or the like, executes a process that is based on a process request (the process request READ or the like) received from the input section INPb. Details of the pipeline control section PLC will be described in FIG. 9 and thereafter.

The snoop lock section SNPb includes an information retaining section (also called an information-retaining circuit) that retains third management information for managing, for each first cache memory L1, data of a target of a process of evicting data from the first cache memory L1. Details of the snoop lock section SNPb will be described in FIG. 6.

The cache miss control section MIB manages a subsequent process in the case of a cache miss occurring for the data requested with the read request READ. For example, the cache miss control section MIB issues the process request MORP to the input section INPb in the case of occurrence of a cache miss and eviction of data from the data retaining section DMEM. That is, the cache miss control section MIB is one example of an eviction control section (also called an eviction control circuit) that issues the eviction request MORP to a processing section such as the pipeline control section PLC. The cache miss control section MIB does not issue the process request MORP in the case of receiving information indicating stopping of the process request MORP from the pipeline control section PLC.

The cache miss control section MIB issues the process request MVIN to the input section INPb in the case of receiving a response to data requested from the memory control section MCNTL with the data requested with the read request READ being ready to be stored in the data retaining section DMEM.

The cache miss control section MIB issues a request for a block type change process to the input section INPb as a part of the process request MVIN. The block type change process is a process of changing the state of data of the ways of the second cache memory LLb. For example, the pipeline control section PLC, in the case of executing a process based on the read request READ in "Exclusive" for data retained in "Shared", secures a resource for the cache miss control section MIB for executing the block type change process. The cache miss control section MIB determines a subsequent instruction according to the state of the target data retained in the second cache memory LLb or the first cache memory L1 and issues a process request to the pipeline control section PLC.

FIG. 4 illustrates one example of the data retaining section DMEM illustrated in FIG. 3. The data retaining section DMEM, for each index address RAD[18:7], includes a plurality of ways WAY (WAY0, WAY1, . . . , WAY14, and WAY15) that retains data. The index address RAD[18:7] is one example of a first index that is represented by a bit group of a part of a memory address RAD[47:0] used in access to data. In the example illustrated in FIG. 4, the number of ways WAY of the data retaining section DMEM is 16. That is, the second cache memory LLb is a 16-way set-associative cache memory. The number of ways WAY of the data retaining section DMEM is not limited to 16.

The data retaining section DMEM receives the access target index address RAD[18:7] and information LLHTW (LLHTW0 to LLHTW15) that indicates the access target way WAY. For example, the information LLHTW is transferred from the pipeline control section PLC to the data retaining section DMEM. Hereinafter, the information LLHTW may be referred to as access way information LLHTW or hit way information LLHTW. For example, in the case of the second cache memory LLb receiving a read request from the core CORE, the data retaining section DMEM outputs, to the requester core CORE, data that is specified by the index address RAD[18:7] and the hit way information LLHTW0 to LLHTW15. Hereinafter, the access target memory address RAD may be referred to as a requested address RAD. The index address RAD[18:7] may be referred to as an address RAD[18:7].

Figure 5:
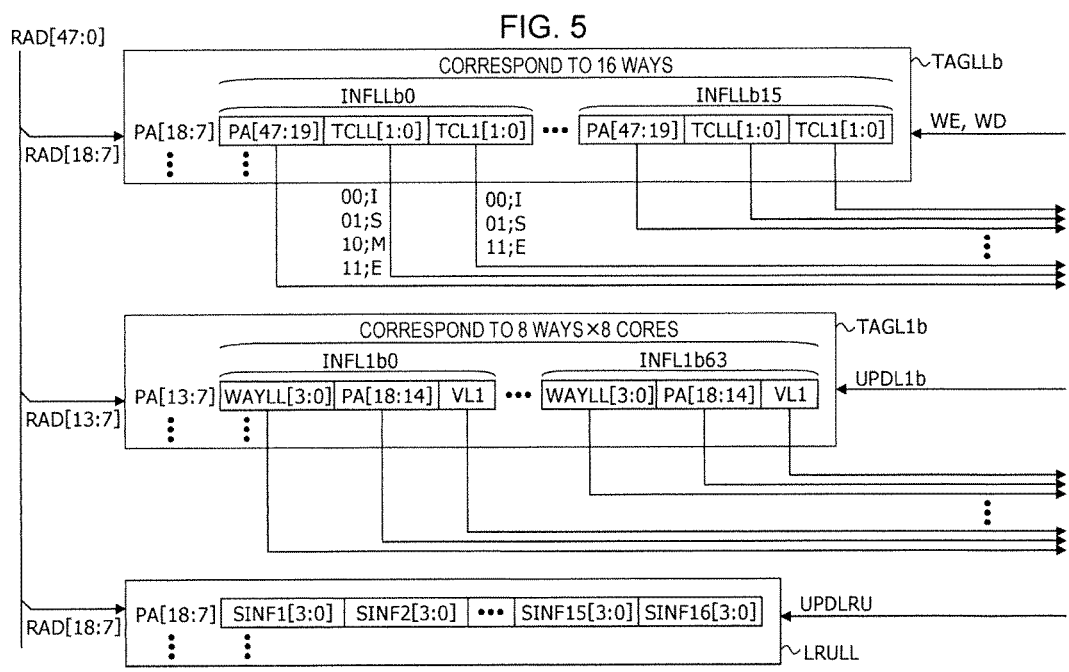
FIG. 5 is a diagram illustrating one example of a tag section and a usage information retaining section illustrated in FIG. 3.

FIG. 5 illustrates one example of the tag sections TAGLLb and TAGL1b and the usage information retaining section LRULL illustrated in FIG. 3. The tag section TAGLLb illustrated in FIG. 5 is one example in the case of the second cache memory LLb including 16 ways. The tag section TAGL1b illustrated in FIG. 5 is one example in the case of the first cache memory L1 including eight ways. For example, the size of the cache lines of the first cache memory L1 and the second cache memory LLb is 128 bytes.

A cache line number of the second cache memory LLb is represented by an index address PA[18:7]. The index address PA[18:7] is specified by the index address RAD[18:7] that is represented by a bit group of a part (from the bit number 7 to the bit number 18) of the memory address RAD[47:0]. A cache line number of the first cache memory L1 is represented by the index address PA[13:7]. The index address PA[13:7] is specified by the index address RAD[13:7] that is represented by a bit group of a part (from the bit number 7 to the bit number 13) of the memory address RAD[47:0] used in access to data. The index address RAD[13:7] is one example of a second index that is represented by a bit group of a part of the first index (the index address RAD[18:7]).

The tag section TAGLLb, for one index address PA[18:7], retains first management information INFLLb (INFLLb0, . . . , INFLLb15) that corresponds to the ways of the second cache memory LLb (16 ways in the example illustrated in FIG. 5). The number appended to the reference sign of the first management information INFLLb corresponds to the number appended to the reference sign of the way WAY of the second cache memory LLb. Accordingly, the tag section TAGLLb retains the first management information INFLL of each way WAY for each index address PA[18:7] of the second cache memory LLb.

Each first management information INFLLb includes a tag address PA[47:19] of the second cache memory LLb and type codes TCLL[1:0] and TCL1[1:0]. The tag address PA[47:19] of the second cache memory LLb is represented by a bit group of a part (from the bit number 19 to the bit number 47) of the memory address RAD[47:0]. The type code TCLL[1:0] indicates the state of data (cache line) specified by the index address PA[18:7] and the tag address PA[47:19] of the second cache memory LLb. The state of data, for example, is managed with the MESI protocol.

In the example illustrated in FIG. 5, the type code TCLL[1:0] is set to "00" in the case of the state of data being equal to "Invalid". In the case of the state of data being equal to "Shared", the type code TCLL[1:0] is set to "01". In the case of the state of data being equal to "Modified", the type code TCLL[1:0] is set to "10". In the case of the state of data being equal to "Exclusive", the type code TCLL[1:0] is set to "11".

The type code TCL1[1:0] indicates the state, in the first cache memory L1, of data (cache line) specified by the index address PA[18:7] and the tag address PA[47:19] of the second cache memory LLb. The state of data, for example, is managed with the MESI protocol. The second cache memory LLb does not detect a timing of change of data retained in the first cache memory L1. Thus, the type code TCL1[1:0] is set to a value, other than "10", that indicates the state of data being equal to "Modified".

The first management information INFLL retained by the tag section TAGLL, for example, is updated based on a signal WE or WD that corresponds to update information from the pipeline control section PLC. The signal WE is a write enable signal that indicates updating the first management information INFLL. The signal WD is update data.

The tag section TAGL1b, for one index address PA[13:7], retains pieces of second management information INFL1b in number represented by the product of the number of ways of the first cache memory L1 and the number of first cache memories L1. In the example illustrated in FIG. 5, the tag section TAGL1b retains 64 (=eight ways×eight cores) pieces of second management information INFL1b (INFL1b0, . . . , INFL1b63) for one index address PA[13:7].

Accordingly, the tag section TAGL1b, for each index address PA[13:7] of the first cache memory L1, retains the second management information INFL1b of each way in each first cache memory L1. In the example illustrated in FIG. 5, the quotient and the remainder in the case of dividing the number appended to the reference sign of the second management information INFL1b by eight respectively correspond to the number appended to the reference sign of the core CORE and a way number (any of zero to seven) of the first cache memory L1. For example, the second management information INFL1b0 indicates the second management information INFL1b of the zeroth way of the first cache memory L1 of the core CORE0. The second management information INFL1b63 indicates the second management information INFL1b of the seventh way of the first cache memory L1 of the core CORE7.

Each second management information INFL1b includes way information WAYLL[3:0], difference information PA[18:14], and validity VL1. The way information WAYLL[3:0] and the difference information PA[18:14] are information retained instead of the tag address PA[47:14] of the first cache memory L1. For example, the way information WAYLL[3:0] indicates the way WAY, of the plurality of ways WAY of the second cache memory LLb, in which data specified by the index address PA[13:7] and the tag address PA[47:14] of the first cache memory L1 is retained. That is, the way information WAYLL[3:0] corresponds to the address PA[47:19] of the tag address PA[47:14] (the tag address PA[47:19] of the second cache memory LLb).

The difference information PA[18:14] indicates the difference between the index address PA[13:7] of the first cache memory L1 and the index address PA[18:7] of the second cache memory LLb. That is, the difference information PA[18:14] is represented by a bit group of a part (from the bit number 14 to the bit number 18) of the memory address RAD[47:0] and corresponds to the address PA[18:14] of the tag address PA[47:14]. Accordingly, the way information WAYLL[3:0] and the difference information PA[18:14] are used instead of the tag address PA[47:14] of the first cache memory L1.

The validity VL1 indicates whether or not data (cache line) specified by the index address PA[13:7] of the first cache memory L1, the way information WAYLL[3:0], and the difference information PA[18:14] is valid. For example, in the case of data being valid, the validity VL1 is set to "1".

The second management information INFL1b retained by the tag section TAGL1b, for example, is updated based on update information UPDL1b from the pipeline control section PLC.

The usage information retaining section LRULL retains selection information SINF (SINF1[3:0], SINF2[3:0], . . . , SINF15[3:0], and SINF16[3:0]) for each index address PA[18:7]. The way WAY that is registered in the selection information SINF1[3:0] is the way WAY that has the longest waiting time of no access by any of the plurality of first cache memories L1 of the plurality of ways WAY of the data retaining section DMEM. As the number after the reference sign SINF of the selection information SINF is increased, the way WAY having a shorter waiting time is registered. The selection information SINF that is retained by the usage information retaining section LRULL, for example, is updated based on update information UPDLRU from the pipeline control section PLC.

The configurations of the tag sections TAGLLb and TAGL1b and the usage information retaining section LRULL are not limited to the example illustrated in FIG. 5.

Figure 6:
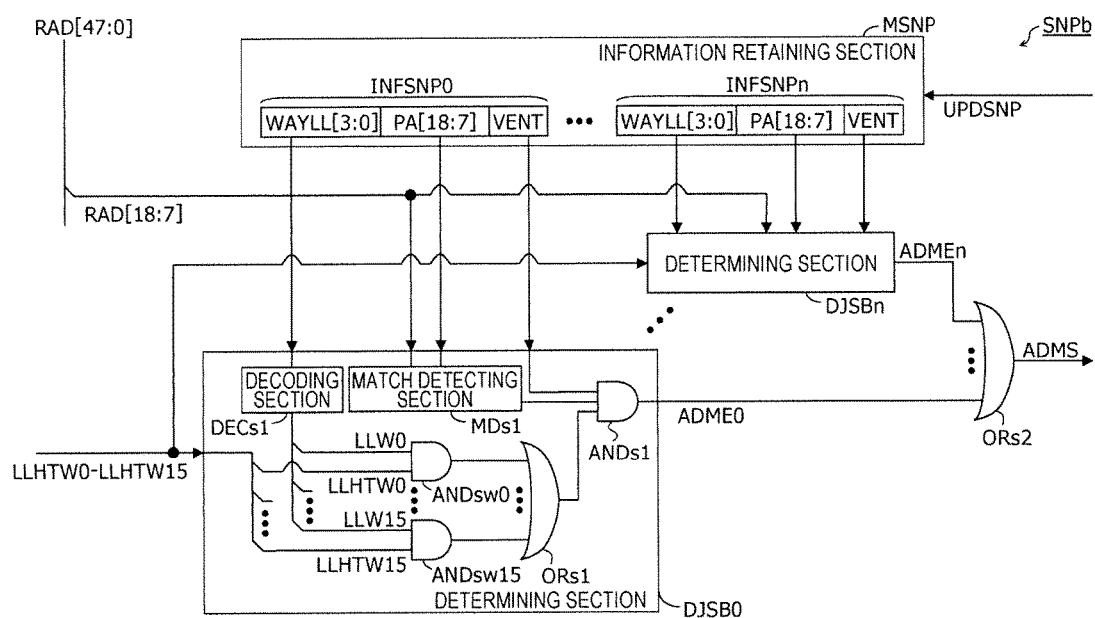
FIG. 6 is a diagram illustrating one example of a snoop lock section illustrated in FIG. 3.

FIG. 6 illustrates one example of the snoop lock section SNPb illustrated in FIG. 3. The snoop lock section SNPb includes an information retaining section (also called an information-retaining circuit) MSNP, a plurality of determining sections (also called determining circuits) DJSB (DJSB0 to DJSBn), and a logical sum circuit ORs2.

The information retaining section MSNP retains third management information INFSNP (INFSNP0, ..., INFSNPn) for managing, for each first cache memory L1, data that is a target of a process of evicting data from the first cache memory L1. In the example illustrated in FIG. 6, the information retaining section MSNP retains "n+1" (n is an integer greater than or equal to zero) pieces of third management information INFSNP. Each third management information INFSNP includes the way information WAYLL[3:0], the index address PA[18:7], and validity VENT. The way information WAYLL[3:0] is a way identifier that indicates the way WAY, of the plurality of ways WAY of the data retaining section, retaining management target data. The index address PA[18:7] indicates the first index included in the memory address of the management target data. The validity VENT is a validity bit that indicates that the management target data is valid. That is, the information retaining section MSNP is one example of a third information retaining section (also called a third information retaining circuit). The third management information INFSNP retained by the information retaining section MSNP, for example, is updated based on update information UPDSNP from the pipeline control section PLC.

The determining section DJSB determines whether or not data for which a cache hit occurs in the second cache memory LLb is intermediate data of a process of evicting data from the first cache memory L1. The number and "n" appended to the reference sign of the determining section DJSB correspond to the number and "n" appended to the reference sign of the third management information INFSNP. The plurality of determining sections DJSB is the same as or corresponds to each other. Thus, the determining section DJSB0 will be described.

The determining section DJSB0 includes a decoding section (also called decoding circuit) DECs1, a match detecting section (also called a match-detecting circuit) MDs1, a logical sum circuit ORs1, and logical product circuits ANDs1 and ANDsw0 to ANDsw15. The number appended to the reference sign of the logical product circuit ANDsw corresponds to the number appended to the reference sign of the way WAY of the second cache memory LLb.

The decoding section DECs1 receives the way information WAYLL[3:0] in the third management information INFSNP0 from the information retaining section MSNP. The decoding section DECs1 decodes a logical value indicated by the way information WAYLL[3:0] to generate decoded information LLW0 to LLW15 that includes a bit indicating truth or falsity for each of the plurality of ways WAY0 to WAY15. For example, in the case of the way information WAYLL[3:0] indicating "15" in decimal, the decoding section DECs1 sets the decoded information LLW15 to truth (for example, the logical value "1") and sets the decoded information LLW0 to LLW14 to falsity (for example, the logical value "0").

The decoding section DECs1 respectively outputs the decoded information LLW0 to LLW15 decoded from the way information WAYLL[3:0] to the logical product circuits ANDsw0 to ANDsw15. For example, the decoding section DECs1 outputs the decoded information LLW0 to the logical product circuit ANDsw0.

The logical product circuit ANDsw0 calculates the logical product of the hit way information LLHTW0 received from the pipeline control section PLC and the decoded information LLW0 received from the decoding section DECs1 and outputs a calculation result to the logical sum circuit ORs1. The logical product circuit ANDsw other than the logical product circuit ANDsw0 is described by replacing the number appended to the reference signs of the hit way information LLHTW and the decoded information LLW in the description of the logical product circuit ANDsw0 with the number corresponding to the logical product circuit ANDsw.

The logical sum circuit ORs1 calculates the logical sum of the calculation results of the logical product circuits ANDsw0 to ANDsw15 and outputs a calculation result to the logical product circuit ANDs1.

The match detecting section MDs1 receives the index address PA[18:7] in the third management information INFSNP0 from the information retaining section MSNP. The match detecting section MDs1 compares the address RAD[18:7] received from the input section INPb with the index address PA[18:7] in the third management information INFSNP0 and outputs a comparison result to the logical product circuit ANDs1. For example, in the case of the address RAD[18:7] matching the index address PA[18:7], the match detecting section MDs1 outputs information indicating truth (for example, the logical value "1") as the comparison result to the logical product circuit ANDs1. In the case of the address RAD[18:7] not matching the index address PA[18:7], the match detecting section MDs1 outputs information indicating falsity (for example, the logical value "0") as the comparison result to the logical product circuit ANDs1.

The logical product circuit ANDs1 receives the validity VENT in the third management information INFSNP0 from the information retaining section MSNP. The logical product circuit ANDs1 calculates the logical product of the comparison result of the match detecting section MDs1, the calculation result of the logical sum circuit ORs1, and the validity VENT received from the information retaining section MSNP and outputs information ADME indicating a calculation result to the logical sum circuit ORs2.

The logical sum circuit ORs2 calculates the logical sum of the information ADME0 to ADMEn received from the determining section DJSB0 to DJSBn and outputs a calculation result as address match information ADMS to the pipeline control section PLC. The configuration of the snoop lock section SNPb is not limited to the example illustrated in FIG. 6.

Figure 7:
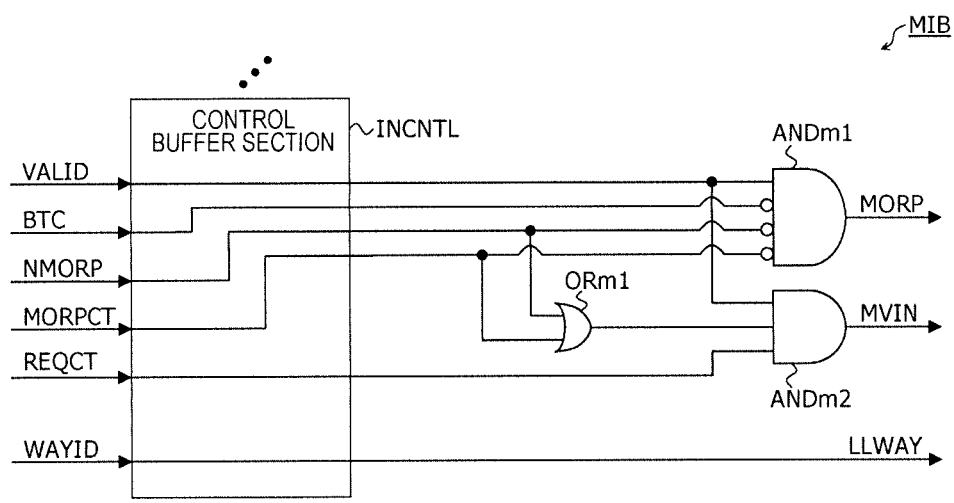
FIG. 7 is a diagram illustrating one example of a main portion of a cache miss control section illustrated in FIG. 3.

FIG. 7 illustrates one example of a main portion of the cache miss control section MIB illustrated in FIG. 3. The cache miss control section MIB includes a plurality of control buffer sections INCNTL, logical product circuits ANDm1 and ANDm2, and a logical sum circuit ORm1. For example, the cache miss control section MIB receives an instruction from the pipeline control section PLC in the case of having a space in any of the plurality of control buffer sections INCNTL. The control buffer section INCNTL retains information VALID, BTC, NMORP, MORPCT, and WAYID received from the pipeline control section PLC and retains information REQCT received from the memory control section MCNTL or the like.

For example, the information VALID is a signal that is set to the logical value "1" in the case of a cache miss occurring in the second cache memory LLb. The information BTC is a signal that is set to the logical value "1" in the case of requesting the block type change process. The information NMORP is a signal that is set to the logical value "1" in the case of stopping issuing of the process request MORP. The information MORPCT is a signal that is set to the logical value "1" in the case of a process based on the process request MORP being ended. The information WAYID is a way identifier that indicates the way WAY, of the plurality of ways WAY of the data retaining section DMEM, retaining the eviction target data. The information WAYID, in the case of issuing the process request MORP to the input section INPb, is transferred as information LLWAY to the pipeline control section PLC through the input section INPb. The information REQCT is a signal that is set to the logical value "1" in the case of transferring requested data from the memory control section MCNTL or the like.

The logical product circuit ANDm1 calculates the logical product of inverted signals of the signal VALID and the signal BTC, an inverted signal of the signal NMORP, and an inverted signal of the signal MORPCT and outputs information MORP indicating a calculation result to the input section INPb. For example, the information MORP of the logical value "1" means that the process request MORP is issued.

The logical sum circuit ORm1 calculates the logical sum of the signal NMORP and the signal MORPCT and outputs information indicating a calculation result to the logical product circuit ANDm2.

The logical product circuit ANDm2 calculates the logical sum of the signal VALID, the calculation result of the logical sum circuit ORm1, and the signal REQCT and outputs information MVIN indicating a calculation result to the input section INPb. For example, the information MVIN of the logical value "1" means that the process request MVIN is issued. The configuration of the cache miss control section MIB is not limited to the example illustrated in FIG. 7.

Figure 8:
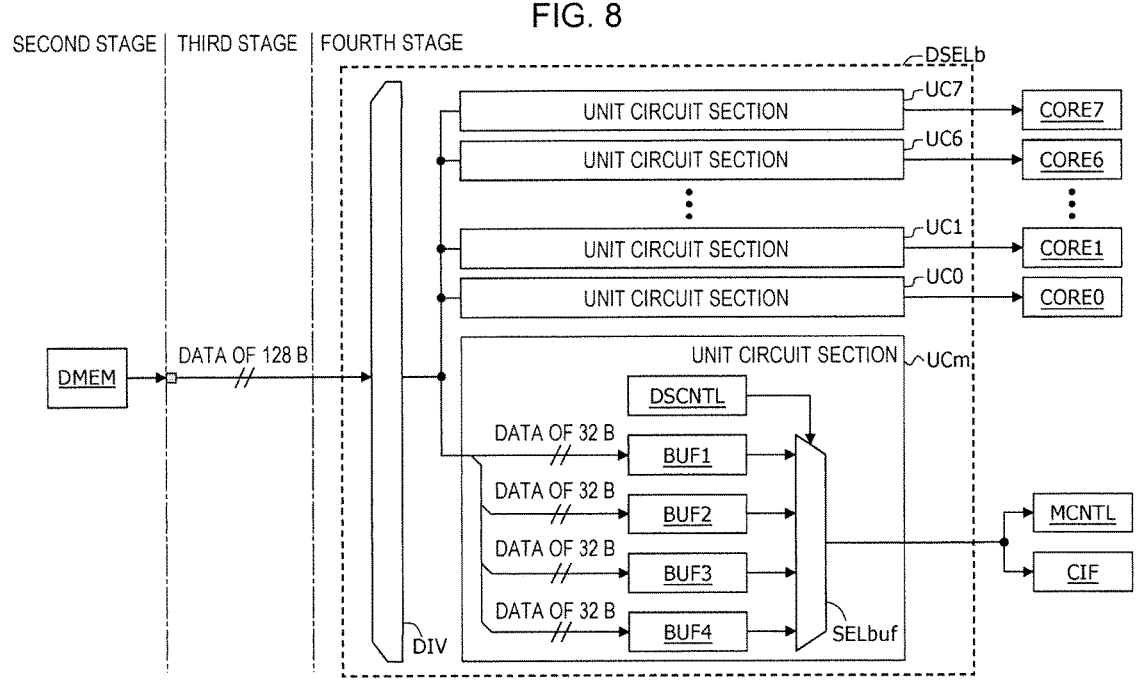
FIG. 8 is a diagram illustrating one example of a data selecting section illustrated in FIG. 3.

FIG. 8 illustrates one example of the data selecting section DSELb illustrated in FIG. 3. A dot-dashed line illustrated in FIG. 8 corresponds to a boundary between stages of a pipeline process. A halftone rectangle illustrated in FIG. 8 indicates a pipeline register. In the example illustrated in FIG. 8, the width of data output from the data retaining section DMEM is 128 bytes. Data transfer to the memory control section MCNTL or the like is executed in 32 bytes×4 cycles.

The data selecting section DSELb includes a dividing section DIV and a plurality of unit circuit sections UC (UC0 to UC7 and UCm). The dividing section DIV divides data of 128 bytes transferred from the data retaining section DMEM into data of 32 bytes and transfers four pieces of data of 32 bytes to each unit circuit section UC.

The unit circuit sections UC0 to UC7 are disposed in respective correspondence with the cores CORE0 to CORE7. The number appended to the reference signs of the unit circuit sections UC0 to UC7 corresponds to the number appended to the reference signs of the cores CORE0 to CORE7. For example, the core CORE0 receives data from the data retaining section DMEM through the unit circuit section UC0. The unit circuit section UCm is disposed in correspondence with the memory control section MCNTL and the communication interface section CIF. The plurality of unit circuit sections UC is the same as or corresponds to each other. Thus, the unit circuit section UCm will be described.

The unit circuit section UCm includes four buffer sections BUF (BUF1, BUF2, BUF3, and BUF4) respectively retaining the four pieces of data of 32 bytes transferred from the dividing section DIV, a selection control section DSCNTL, and a selecting section SELbuf. The selection control section DSCNTL outputs the data of 32 bytes in order through the selecting section SELbuf by selecting the four buffer sections BUF in order. Accordingly, data of 128 bytes is divided into data of 32 bytes and transferred to the memory control section MCNTL and the like.

Accordingly, data of a response to the core CORE is differently managed from data of a response to the memory control section MCNTL, the communication interface section CIF, or the like. Accordingly, for example, the data selecting section DSELb, even in the case of a data bus between the data selecting section DSELb and the memory control section MCNTL being occupied by a data response to a preceding process request, may execute a data response to the core CORE in successive cycles in the case of a hit occurring for the subsequent read request READ.

The configuration of the data selecting section DSELb is not limited to the example illustrated in FIG. 8. In the case of the width of data output from the data retaining section DMEM being less than or equal to the width of data in data transfer to the memory control section MCNTL or the like, the data selecting section DSELb may be removed.

Figure 9:
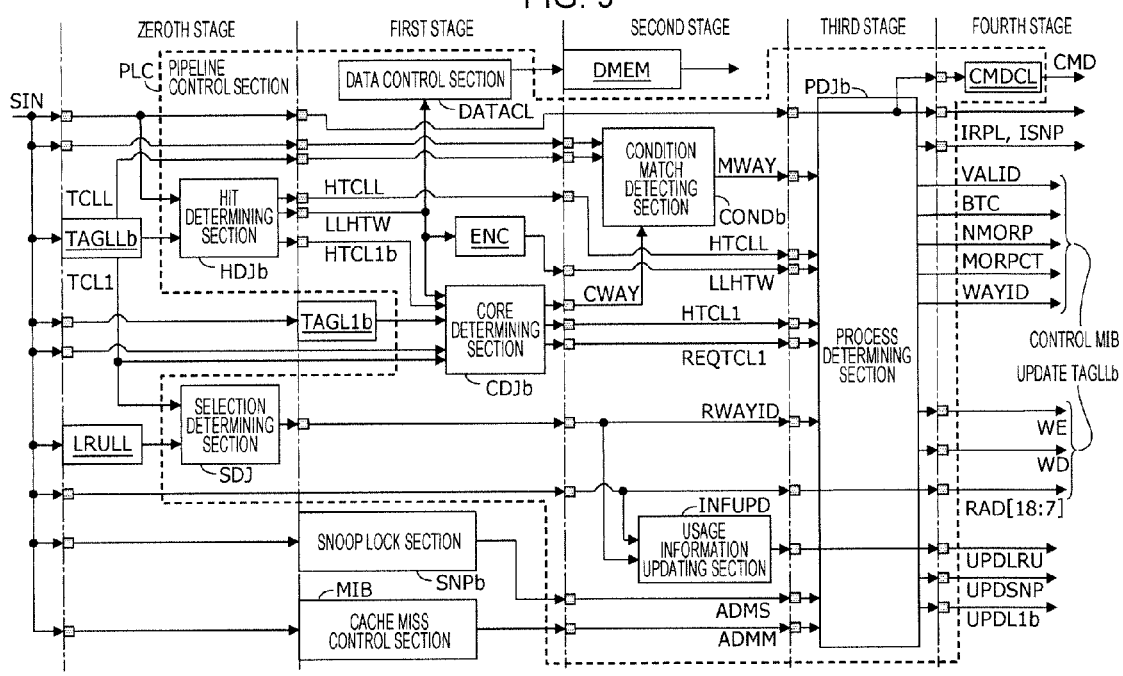
FIG. 9 is a diagram illustrating one example of a pipeline control section illustrated in FIG. 2.

FIG. 9 illustrates one example of the pipeline control section PLC illustrated in FIG. 2. A dot-dashed line and a halftone rectangle illustrated in FIG. 9 have the same meaning as the dot-dashed line and the halftone rectangle illustrated in FIG. 8. Input information SIN illustrated in FIG. 9, for example, includes a process request input from the input section INPb and the memory address of requested data.

The pipeline control section PLC includes a selection determining section SDJ, a hit determining section HDJb, an encoding section ENC, a core determining section CDJb, a data control section DATACL, a condition match detecting section CONDb, a usage information updating section INFUPD, and a process determining section PDJb. Furthermore, the pipeline control section PLC includes a command control section CMDCL.

In a zeroth stage of a pipeline process, the selection determining section SDJ and the hit determining section HDJb execute processes. For example, the selection determining section SDJ references the selection information SINF, of the selection information SINF retained in the usage information retaining section LRULL, that is specified by the index address PA[18:7] included in the information SIN. The selection determining section SDJ, based on the selection information SINF or the like specified by the index address PA[18:7], selects the way WAY of the plurality of ways WAY of the data retaining section DMEM from which data is evicted. Hereinafter, the way WAY that retains data evicted from the data retaining section DMEM may be referred to as a victim way WAY. The selection determining section SDJ outputs information RWAYID indicating the victim way WAY to the usage information updating section INFUPD and the process determining section PDJb.

For example, the selection determining section SDJ, based on the selection information SINF, selects the victim way WAY preferentially from the ways WAY of the plurality of ways WAY other than the way WAY retaining data retained in the first cache memory L1. The way WAY that retains data retained in the first cache memory L1, for example, is specified based on the type code TCL1[1:0] in the first management information INFLLb indicated by the index address PA[18:7]. For example, the selection determining section SDJ, in the case of the result of the logical sum of the type code TCL1[1:1] and the type code TCL1

[0:0] being equal to the logical value "1", determines the corresponding way WAY to retain data retained in the first cache memory L1.

The hit determining section HDJb determines whether or not a cache hit occurs in the second cache memory LLb. That is, the hit determining section HDJb is one example of a state determining section that, based on the first management information INFLLb, determines whether or not requested data requested with the read request READ from the first cache memory L1 is retained in the data retaining section DMEM. Details of the hit determining section HDJb will be described in FIG. 10.

In a first stage, the core determining section CDJb, the data control section DATACL, and the encoding section ENC execute processes.

The core determining section CDJb determines whether or not a cache hit occurs in any of the plurality of first cache memories L1. That is, the core determining section CDJb determines whether or not the requested data requested with the read request READ from the first cache memory L1 is retained in any of the plurality of first cache memories L1. Details of the core determining section CDJb will be described in FIG. 11.

The data control section DATACL accesses the data retaining section DMEM based on the determination result of the hit determining section HDJb. The encoding section ENC encodes the hit way information LLHTW (16 signals) that corresponds in number to the ways and is output from the hit determining section HDJb. For example, in the case of a hit occurring for the way WAY15, the encoding section ENC receives the hit way information LLHTW0 to LLHTW14 of the logical value "0" and the hit way information LLHTW15 of the logical value "1" from the hit determining section HDJb. In this case, the encoding section ENC encodes the 16 signals LLHTW (LLHTW0 to LLHTW15) into hit way information LLHTW[3:0] of four bits indicating "15" in decimal. The encoding section ENC outputs the encoded hit way information LLHTW to the process determining section PDJb.

In the first stage, furthermore, the address match information ADMS is output from the snoop lock section SNPb to the process determining section PDJb, and address match information ADMM is output from the cache miss control section MIB to the process determining section PDJb. The address match information ADMM, for example, is a signal that is set to the logical value "1" in the case of a preceding process request causing the address of data requested with a process request input into the pipeline control section PLC to be a process target of the cache miss control section MIB.

In a second stage, the usage information updating section INFUPD and the condition match detecting section CONDb execute processes. The usage information updating section INFUPD outputs the update information UPDLRU to the process determining section PDJb based on the address RAD[18:7] of the requested data, the information RWAYID indicating the victim way WAY selected by the selection determining section SDJ, or the like.

The condition match detecting section CONDb executes preliminary determination at the time of determining whether or not a stop condition for stopping issuing of the eviction request MORP is satisfied. For example, the stop condition is satisfied in the case of a first condition or a second condition illustrated below is satisfied.

The first condition is that the state of the eviction target data is equal to "Invalid". The second condition is that the eviction target data is data stored at a local memory address in the ccNUMA configuration, that the state of the eviction target data is equal to a state other than "Modified", and that the eviction target data is not retained in the first cache memory L1.

The state of the eviction target data being equal to a state other than "Modified" (includes the state of the eviction target data being equal to "Invalid") is a state where the eviction target data does not have to be written back to the main storage device MEM connected to the second cache memory LLb.

The condition match detecting section CONDb detects whether or not data of each way WAY specified by the index address PA[18:7] included in the information SIN (hereinafter, may be referred to as a candidate of the eviction target data) satisfies the first condition or the second condition. The condition match detecting section CONDb outputs information MWAY indicating a detection result for each way WAY to the process determining section PDJb. Details of the condition match detecting section CONDb will be described in FIG. 12. In the second stage, data is output from the data retaining section DMEM.

In a third stage, the process determining section PDJb executes a process. For example, the process determining section PDJb, based on a process request input into the pipeline control section PLC, executes determination as to whether or not to stop the process request, determination as to whether or not to update the tag section TAGLLb, generation of update data of the tag section TAGLLb, generation of a request to the cache miss control section MIB, or the like. The process determining section PDJb, regardless of whether or not to stop the process request MORP, determines whether or not to perform a process of evicting data from the data retaining section DMEM. The process determining section PDJb, based on the victim way WAY selected by the selection determining section SDJ and the detection result of the condition match detecting section CONDb for each way WAY, determines whether or not the eviction target data satisfies the stop condition. The process determining section PDJb, in the case of the eviction target data satisfying the stop condition, notifies the cache miss control section MIB to stop issuing of the eviction request MORP by using the information NMORP.

That is, the process determining section PDJb is one example of a processing section that, in the case of a cache miss occurring in the second cache memory LLb with no enough space in the storage area to register the requested data, evicts data from any of the plurality of storage areas without issuing the eviction request MORP. Details of the process determining section PDJb will be described in FIG. 13.

In a fourth stage, the command control section CMDCL executes a process. For example, the command control section CMDCL issues a command CMD to the core CORE, the memory control section MCNTL, the communication interface section CIF, and the like based on the information SINF.

In the fourth stage, the tag section TAGLLb is updated with the write enable signal WE, update data WD, the address RAD[18:7], and the like. The tag section TAGL1*b* is updated with the information UPDL1*b*. The usage information retaining section LRULL is updated with the information UPDLRU. The snoop lock section SNPb is updated with the information UPDSNP. Furthermore, the cache miss control section MIB is controlled with the information VALID, BTC, NMORP, MORPCT, and WAYID and the like. Information IRPL that provides an instruction for replacement, information ISNP that provides an instruction for snooping, or the like is output to the core CORE.

Figure 10:
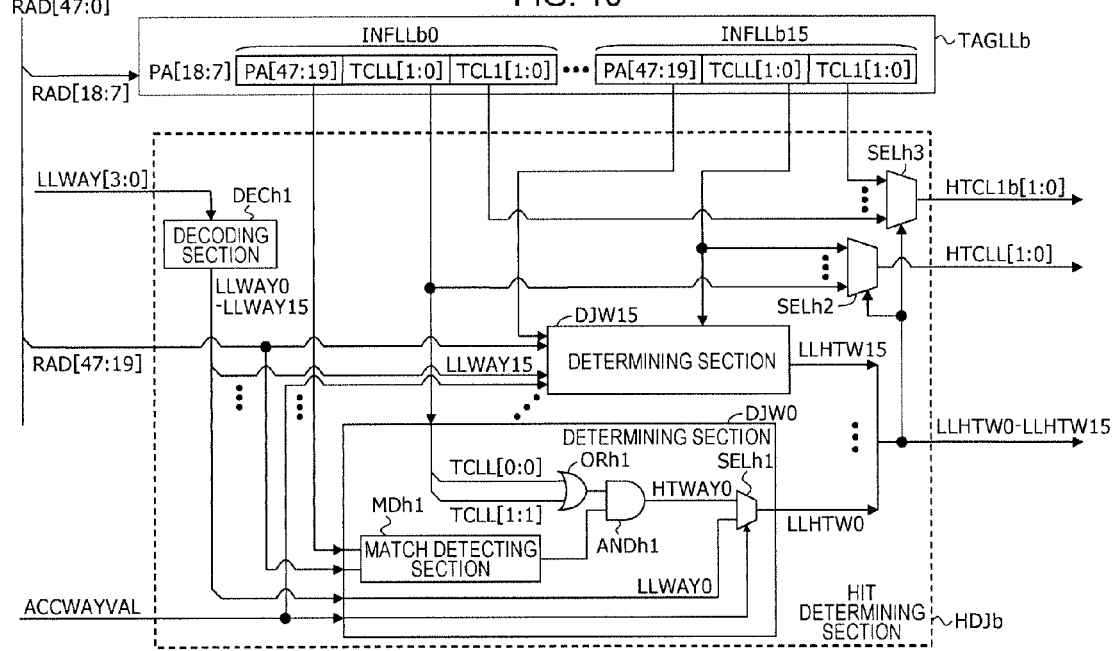
FIG. 10 is a diagram illustrating one example of a hit determining section illustrated in FIG. 9.

FIG. 10 illustrates one example of the hit determining section HDJb illustrated in FIG. 9. The hit determining section HDJb includes a decoding section DECh1, a plurality of determining sections DJW (DJW0 to DJW15), and selecting sections SELh2 and SELh3.

The decoding section DECh1, in the case of issuing the process request MORP, receives the information LLWAY[3:0] indicating the victim way WAY from the cache miss control section MIB. The decoding section DECh1 decodes a logical value indicated by the information LLWAY[3:0] to generate decoded information LLWAY0 to LLWAY15 that includes a bit indicating truth or falsity for each of the plurality of ways WAY0 to WAY15. The decoding section DECh1 respectively outputs the decoded information LLWAY0 to LLWAY15 decoded from the information LLWAY[3:0] to the determining sections DJW0 to DJW15. For example, the decoding section DECh1 outputs the decoded information LLWAY0 to the determining section DJW0.

The number appended to the reference sign of the determining section DJW corresponds to the number appended to the reference sign of the way WAY of the second cache memory LLb. The plurality of determining sections DJW is the same as or corresponds to each other. Thus, the determining section DJW0 will be described.

The determining section DJW0 includes a match detecting section MDh1, a logical sum circuit ORh1, a logical product circuit ANDh1, and a selecting section SELh1. The match detecting section MDh1 receives, from the tag section TAGLLb, the tag address PA[47:19] in the first management information INFLLb0 that corresponds to the index address PA[18:7] indicated by the address RAD[18:7] included in the information SIN. The match detecting section MDh1 compares the address RAD[47:19] received from the input section INPb with the tag address PA[47:19] in the first management information INFLLb0 and outputs a comparison result to the logical product circuit ANDh1. For example, in the case of the address RAD[47:19] matching the tag address PA[47:19], the match detecting section MDh1 outputs information indicating truth (for example, the logical value "1") as the comparison result to the logical product circuit ANDh1. In the case of the address RAD[47:19] not matching the tag address PA[47:19], the match detecting section MDh1 outputs information indicating falsity (for example, the logical value "0") as the comparison result to the logical product circuit ANDh1.

The logical sum circuit ORh1 receives, from the tag section TAGLLb, the type code TCLL[1:0] in the first management information INFLLb0 that corresponds to the index address PA[18:7] indicated by the address RAD[18:7]. The logical sum circuit ORh1 calculates the logical sum of the type code TCLL[0:0] and the type code TCLL[1:1] and outputs a calculation result (the result of the logical sum of TCLL[0:0] and TCLL[1:1]) to the logical product circuit ANDh1.

The logical product circuit ANDh1 calculates the logical product of the comparison result of the match detecting section MDh1 and the calculation result of the logical sum circuit ORh1 and outputs a calculation result as hit way information HTWAY0 to the selecting section SELh1. For example, in the case of access target data being retained in the way WAY0 of the data retaining section DMEM, the determining section DJW0 outputs the hit way information LLHTW0 indicating truth (for example, the logical value "1") to the selecting section SELh1.

The selecting section SELh1 receives the hit way information HTWAY0, the decoded information LLWAY0, and a selection signal ACCWAYVAL and outputs the information LLHTW0 to the selecting sections SELh2 and SELh3, the data control section DATACL, and the like. For example, the selecting section SELh1 selects any of the information HTWAY0 and LLWAY0 as the information LLHTW0 based on the selection signal ACCWAYVAL.

The selection signal ACCWAYVAL, for example, is set to the logical value "1" in the case of input of the process request MORP into the pipeline control section PLC. The selecting section SELh1 selects the information LLWAY0 in the case of the selection signal ACCWAYVAL being equal to the logical value "1". That is, the selecting section SELh1 selects the information LLWAY0 in the case of input of the process request MORP into the pipeline control section PLC. The selecting section SELh1 selects the information HTWAY0 in the case of input of the process request READ into the pipeline control section PLC. In the case of input of the process request MVIN into the pipeline control section PLC, the information HTWAY0 is selected in a request for the block type change process, and the information LLWAY0 is selected in a request other than the request for the block type change process.

The selecting section SELh2 receives, as an input signal from the tag section TAGLLb, the type code TCLL[1:0] in the first management information INFLLb0 to INFLLb15 that corresponds to the index address PA[18:7] indicated by the address RAD[18:7]. The selecting section SELh2 receives the hit way information LLHTW0 to LLHTW15 as a selection signal from the determining sections DJW0 to DJW15. The selecting section SELh2, as hit data information HTCLL[1:0], selects the type code TCLL[1:0], from the plurality of type codes TCLL[1:0] received from the tag section TAGLLb, that is specified by the hit way information LLHTW0 to LLHTW15.

For example, the selecting section SELh2, as the hit data information HTCLL[1:0], selects the type code TCLL[1:0] in the first management information INFLLb that corresponds to the hit way information LLHTW indicating truth. The selecting section SELh2 outputs the hit data information HTCLL[1:0] to the process determining section PDJb.

The selecting section SELh3 receives, as an input signal from the tag section TAGLLb, the type code TCL1[1:0] in the first management information INFLLb0 to INFLLb15 that corresponds to the index address PA[18:7] indicated by the address RAD[18:7]. The selecting section SELh3 receives the hit way information LLHTW0 to LLHTW15 as a selection signal from the determining sections DJW0 to DJW15. The selecting section SELh3, as information HTCL1$b$[1:0], selects the type code TCL1[1:0], from the plurality of type codes TCL1[1:0] received from the tag section TAGLLb, that is specified by the hit way information LLHTW0 to LLHTW15.

For example, the selecting section SELh3, as the information HTCL1$b$[1:0], selects the type code TCL1[1:0] in the first management information INFLLb that corresponds to the hit way information LLHTW indicating truth. The selecting section SELh3 outputs the information HTCL1$b$[1:0] to the core determining section CDJb.

Figure 11:
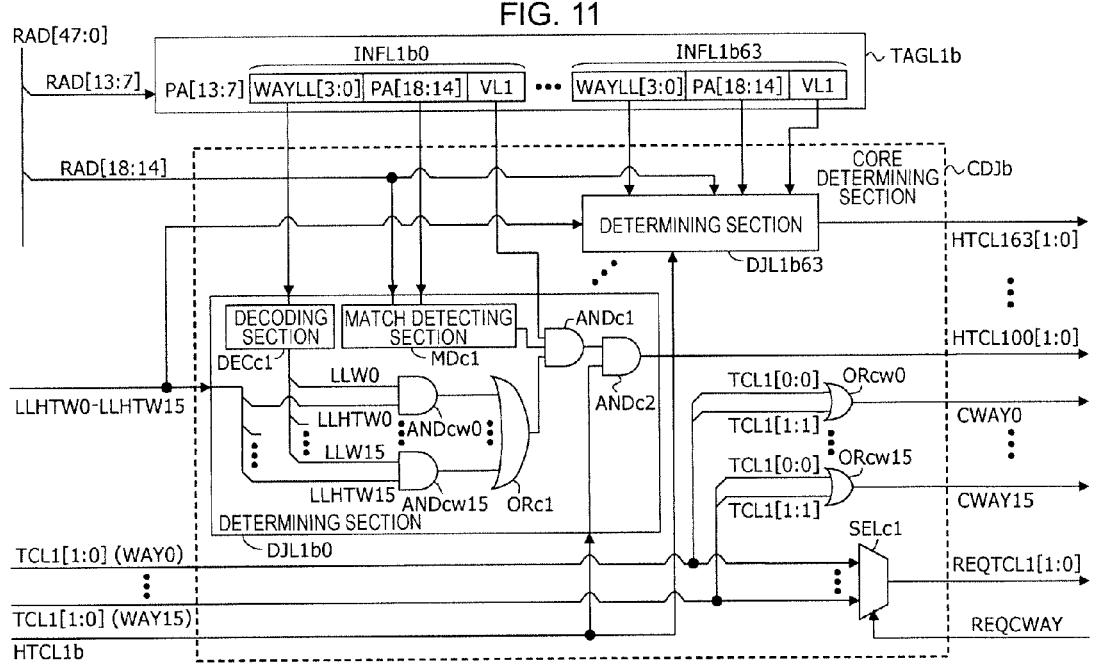
FIG. 11 is a diagram illustrating one example of a core determining section illustrated in FIG. 9.

FIG. 11 illustrates one example of the core determining section CDJb illustrated in FIG. 9. The core determining section CDJb includes a plurality of determining sections DJL1$b$ (DJL1$b$0 to DJL1$b$63), a plurality of logical sum circuits ORcw (ORcw0 to ORcw15), and a selecting section SELc1. The number appended to the reference sign of the determining section DJL1$b$ corresponds to the number appended to the reference sign of the second management information INFL1$b$. The plurality of determining sections DJL1$b$ is the same as or corresponds to each other. Thus, the determining section DJL1$b$0 will be described.

The determining section DJL1$b$0 includes a decoding section DECc1, a match detecting section MDc1, a logical sum circuit ORc1, and logical product circuits ANDc1, ANDc2, and ANDcw0 to ANDcw15. The number appended to the reference sign of the logical product circuit ANDcw corresponds to the number appended to the reference sign of the way WAY of the second cache memory LLb.

The decoding section DECc1 receives, from the tag section TAGL1$b$, the way information WAYLL[3:0] in the second management information INFL1$b$0 that corresponds to the index address PA[13:7] indicated by the address RAD[13:7]. The decoding section DECc1 decodes a logical value indicated by the way information WAYLL[3:0] to generate the decoded information LLW0 to LLW15 that includes a bit indicating truth or falsity for each of the plurality of ways WAY0 to WAY15. For example, in the case of the way information WAYLL[3:0] indicating "15" in decimal, the decoding section DECc1 sets the decoded information LLW15 to truth (for example, the logical value "1") and sets the decoded information LLW0 to LLW14 to falsity (for example, the logical value "0").

The decoding section DECc1 respectively outputs the decoded information LLW0 to LLW15 decoded from the way information WAYLL[3:0] to the logical product circuits ANDcw0 to ANDcw15. For example, the decoding section DECc1 outputs the decoded information LLW0 to the logical product circuit ANDcw0.

The logical product circuit ANDcw0 calculates the logical product of the hit way information LLHTW0 received from the determining section DJW0 of the hit determining section HDJb and the decoded information LLW0 received from the decoding section DECc1 and outputs a calculation result to the logical sum circuit ORc1. The logical product circuit ANDcw other than the logical product circuit ANDcw0 is described by replacing the number appended to the reference signs of the determining section DJW, the hit way information LLHTW, and the decoded information LLW in the description of the logical product circuit ANDcw0 with the number corresponding to the logical product circuit ANDcw.

The logical sum circuit ORc1 calculates the logical sum of the calculation results of the logical product circuits ANDcw0 to ANDcw15 and outputs a calculation result to the logical product circuit ANDc1.

The match detecting section MDc1 receives, from the tag section TAGL1$b$, the difference information PA[18:14] in the second management information INFL1$b$0 that corresponds to the index address PA[13:7] indicated by the address RAD[13:7]. The match detecting section MDc1 compares the address RAD[18:14] received from the input section INPb with the difference information PA[18:14] in the second management information INFL1$b$0 and outputs a comparison result to the logical product circuit ANDc1. For example, in the case of the address RAD[18:14] matching the difference information PA[18:14], the match detecting section MDc1 outputs information indicating truth (for example, the logical value "1") as the comparison result to the logical product circuit ANDc1. In the case of the address RAD[18:14] not matching the difference information PA[18:14], the match detecting section MDc1 outputs information indicating falsity (for example, the logical value "0") as the comparison result to the logical product circuit ANDc1.

That is, the match detecting section MDc1 is one example of a match flag generating section (also called a match-flag-generating circuit) that, for each way of the plurality of first cache memories L1, generates a match flag indicating truth in the case of the address RAD[18:14] matching the difference information PA[18:14].

The logical product circuit ANDc1 receives, from the tag section TAGL1$b$, the validity VL1 in the second management information INFL1$b$0 that corresponds to the index address PA[13:7] indicated by the address RAD[13:7].

The logical product circuit ANDc1 calculates the logical product of the comparison result of the match detecting section MDc1, the calculation result of the logical sum circuit ORc1, and the validity VL1 received from the tag section TAGL1$b$ and outputs a calculation result to the logical product circuit ANDc2.

The logical product circuit ANDc2 calculates the logical product of the information HTCL1$b$ received from the hit determining section HDJb and the calculation result of the logical product circuit ANDc1 and outputs a calculation result as core data information HTCL100[1:0].

The logical sum circuit ORcw0 receives, from the tag section TAGLLb, the type code TCL1[1:0] in the first management information INFLLb0 that corresponds to the index address PA[18:7] indicated by the address RAD[18:7]. The logical sum circuit ORcw0 calculates the logical sum of the type code TCL1[0:0] and the type code TCL1[1:1] received from the tag section TAGLLb and outputs a calculation result as possession information CWAY0 to the condition match detecting section CONDb. The number appended to the reference signs of the logical sum circuit ORcw and the possession information CWAY corresponds to the number appended to the reference sign of the way WAY of the second cache memory LLb. The logical sum circuit ORcw other than the logical sum circuit ORcw0 is described by replacing the number appended to the reference signs of the first management information INFLLb and the possession information CWAY in the description of the logical sum circuit ORcw0 with the number corresponding to the logical sum circuit ORcw. For example, the possession information CWAY that corresponds to the way WAY retaining data retained in the first cache memory L1 is set to the logical value "1".

The selecting section SELc1 receives, as an input signal from the tag section TAGLLb, the type code TCL1[1:0] in the first management information INFLLb0 to INFLLb15 that corresponds to the index address PA[18:7] indicated by the address RAD[18:7]. The selecting section SELc1 receives requested way information REQCWAY as a selection signal from the input section INPb. The selecting section SELc1, as requested data information REQTCL1[1:0], selects the type code TCL1[1:0], from the plurality of type codes TCL1[1:0] received from the tag section TAGLLb, that is specified by the requested way information REQCWAY. The requested data information REQTCL1[1:0] selected by the selecting section SELc1 is transferred to the process determining section PDJb.

Figure 12:
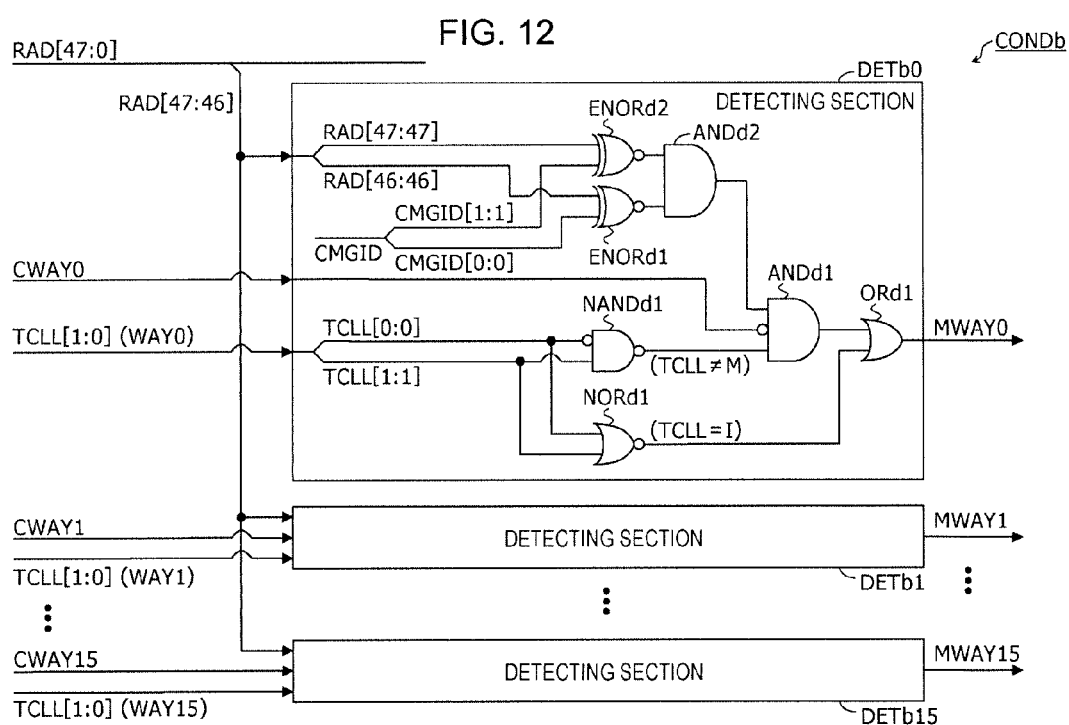
FIG. 12 is a diagram illustrating one example of a condition match detecting section illustrated in FIG. 9.

FIG. 12 illustrates one example of the condition match detecting section CONDb illustrated in FIG. 9. The condition match detecting section CONDb includes a plurality of detecting sections DETb (DETb0 to DETb15). The number appended to the reference sign of the detecting section DETb corresponds to the number appended to the reference sign of the way WAY of the second cache memory LLb. The plurality of detecting sections DETb is the same as or corresponds to each other. Thus, the detecting section DETb0 will be described.

The detecting section DETb0 detects whether or not the candidate of the eviction target data, of the data retained in the way WAY0, indicated by the index address PA[18:7] satisfies the stop condition.

For example, the detecting section DETb0 includes negated exclusive logical sum circuits ENORd1 and ENORd2, a negated logical product circuit NANDd1, logical product circuits ANDd1 and ANDd2, a negated logical sum circuit NORd1, and a logical sum circuit ORd1. Information CMGID illustrated in FIG. 12 is fixed information related to a node that constitutes ccNUMA and to which the second cache memory LLb belongs, and is assigned a unique number for each node constituting ccNUMA. The information CMGID is discriminated with the high-order bit of the address RAD[47:0]. Since four CMGs exist in the information processing apparatus IPEb illustrated in FIG. 2, the address RAD[47:46] of the high-order two bits of the address RAD[47:0] is assigned to the information CMGID.

The negated exclusive logical sum circuit ENORd2 calculates the negated exclusive logical sum of the address RAD[47:47] included in the information SIN and the information CMGID[1:1] and outputs a calculation result to the logical product circuit ANDd2. For example, the negated exclusive logical sum circuit ENORd2 outputs the logical value "1" to the logical product circuit ANDd2 in the case of the address RAD[47:47] matching the information CMGID[1:1].

The negated exclusive logical sum circuit ENORd1 calculates the negated exclusive logical sum of the address RAD[46:46] included in the information SIN and the information CMGID[0:0] and outputs a calculation result to the logical product circuit ANDd2. For example, the negated exclusive logical sum circuit ENORd1 outputs the logical value "1" to the logical product circuit ANDd2 in the case of the address RAD[46:46] matching the information CMGID[0:0].

The logical product circuit ANDd2 calculates the logical product of the calculation result of the negated exclusive logical sum circuit ENORd1 and the calculation result of the negated exclusive logical sum circuit ENORd2 and outputs a calculation result to the logical product circuit ANDd1. That is, the logical product circuit ANDd2 outputs the logical value "1" to the logical product circuit ANDd1 in the case of the candidate of the eviction target data of the data retained in the way WAY0 being stored at a local memory address in the ccNUMA configuration.

The negated logical product circuit NANDd1 receives, from the tag section TAGLLb, the type code TCLL[1:0] in the first management information INFLLb0 that corresponds to the index address PA[18:7] indicated by the address RAD[18:7]. The negated logical product circuit NANDd1 calculates the negated logical product of an inverted signal of the type code TCLL[0:0] and the type code TCLL[1:1] received from the tag section TAGLLb and outputs a calculation result to the logical product circuit ANDd1. That is, the negated logical product circuit NANDd1 outputs the logical value "1" to the logical product circuit ANDd1 in the case of the state of the candidate of the eviction target data of the data retained in the way WAY0 being equal to a state other than "Modified".

The logical product circuit ANDd1 calculates the logical product of the calculation result of the logical product circuit ANDd2, an inverted signal of the possession information CWAY0, and the calculation result of the negated logical product circuit NANDd1 and outputs a calculation result to the logical sum circuit ORd1. That is, the logical product circuit ANDd1 outputs the logical value "1" to the logical sum circuit ORd1 in the case of the candidate of the eviction target data of the data retained in the way WAY0 satisfying the second condition described in FIG. 11.

The negated logical sum circuit NORd1 receives, from the tag section TAGLLb, the type code TCLL[1:0] in the first management information INFLLb0 that corresponds to the index address PA[18:7] indicated by the address RAD[18:7]. The negated logical sum circuit NORd1 calculates the negated logical sum of the type code TCLL[0:0] and the type code TCLL[1:1] received from the tag section TAGLLb and outputs a calculation result to the logical sum circuit ORd1. That is, the negated logical sum circuit NORd1 outputs the logical value "1" to the logical sum circuit ORd1 in the case of the state of the candidate of the eviction target data of the data retained in the way WAY0 being equal to "Invalid" (in the case of satisfying the first condition described in FIG. 11).

The logical sum circuit ORd1 calculates the logical sum of the calculation result of the logical product circuit ANDd1 and the calculation result of the negated logical sum circuit NORd1 and outputs a calculation result as match way information MWAY0 to the process determining section PDJb. That is, the logical sum circuit ORd1 outputs the logical value "1" to the process determining section PDJb in the case of the candidate of the eviction target data of the data retained in the way WAY0 satisfying the first condition or the second condition described in FIG. 11.

Figure 13:
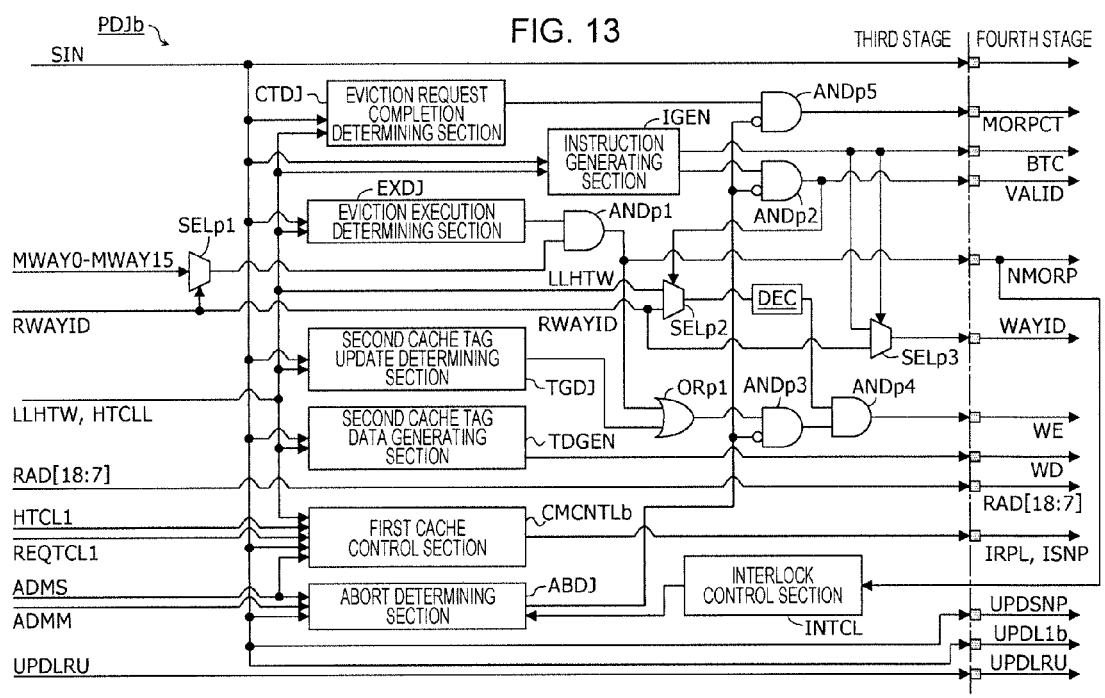
FIG. 13 is a diagram illustrating one example of a process determining section illustrated in FIG. 9.

FIG. 13 illustrates one example of the process determining section PDJb illustrated in FIG. 9. A dot-dashed line and a halftone rectangle illustrated in FIG. 13 have the same meaning as the dot-dashed line and the halftone rectangle illustrated in FIG. 8. The process determining section PDJb includes an eviction request completion determining section CTDJ, an eviction execution determining section EXDJ, an instruction generating section IGEN, a second cache tag update determining section TGDJ, a second cache tag data generating section TDGEN, and a first cache control section CMCNTLb. Furthermore, the process determining section PDJb includes an abort determining section ABDJ, an interlock control section INTCL, logical product circuits ANDp1, ANDp2, ANDp3, ANDp4, and ANDp5, a logical sum circuit ORp1, selecting sections SELp1, SELp2, and SELp3, and a decoding section DEC.

The selecting section SELp1 selects, from the match way information MWAY0 to MWAY15 of each way WAY indicating whether or not the candidate of the eviction target data of each way WAY satisfies the stop condition, the match way information MWAY that corresponds to the victim way WAY indicated by the information RWAYID. The selecting section SELp1 outputs, to the logical product circuit ANDp1, the match way information MWAY that is selected based on the information RWAYID. The match way information MWAY that is selected based on the information RWAYID indicates whether or not the eviction target data retained in the victim way WAY satisfies the stop condition. For example, in the case of the eviction target data satisfying the stop condition, a signal of the logical value "1" is output to the logical product circuit ANDp1. That is, the selecting section SELp1 and the condition match detecting section CONDb illustrated in FIG. 12 are one example of a condition determining section (also called a condition-determining circuit) that determines whether or not the stop condition is satisfied.

The eviction request completion determining section CTDJ, in the case of input of the eviction request MORP into the pipeline control section PLC, determines whether or not a process based on the eviction request MORP is completed based on the information SIN, LLHTW, and HTCLL and the like. For example, the eviction request completion determining section CTDJ outputs a signal of the logical value "1" to the logical product circuit ANDp5 in the case of completion of a process based on the eviction request MORP.

The eviction execution determining section EXDJ, regardless of whether or not to stop the process request MORP, determines whether or not to perform a process of evicting data from the data retaining section DMEM based on the information SIN, LLHTW, and HTCLL and the like. For example, in the case where a process of evicting data from the data retaining section DMEM has to be performed, a signal of the logical value "1" is output to the logical product circuit ANDp1.

The logical product circuit ANDp1 calculates the logical product of the output signal of the selecting section SELp1 and the output signal of the eviction execution determining section EXDJ and outputs a calculation result as the information NMORP to the logical sum circuit ORp1 and the cache miss control section MIB. For example, the information NMORP is set to the logical value "1" in the case where a process of evicting data from the data retaining section DMEM has to be performed with the eviction target data satisfying the stop condition. Accordingly, even in the case where a process of evicting data from the data retaining section DMEM has to be performed, issuing of the eviction request MORP is stopped. In this case, a process of evicting data from the data retaining section DMEM is executed in the read request READ. The information NMORP is transferred to the interlock control section INTCL in the fourth stage.

The instruction generating section IGEN generates a request to the cache miss control section MIB based on the information SIN, LLHTW, and HTCLL and the like. For example, the instruction generating section IGEN, in the case of a cache miss occurring in the second cache memory LLb, generates the information VALID for acquiring a resource of the cache miss control section MIB (for example, the control buffer section INCNTL illustrated in FIG. 7). The information VALID is transferred to the cache miss control section MIB through the logical product circuit ANDp2. The instruction generating section IGEN, in the case of acquiring a resource of the cache miss control section MIB, generates the information BTC indicating whether or not to request the block type change process and outputs the information BTC to the selecting section SELp3 and the cache miss control section MIB.

For example, in the case of the information VALID and BTC being equal to the logical value "1", the block type change process is subsequently executed. In the case of the information VALID being equal to the logical value "1" and the information BTC and NMORP to the logical value "0", the eviction request MORP is subsequently issued. In the case of the information NMORP being equal to the logical value "1", issuing of the eviction request MORP is stopped, and a process of evicting data from the data retaining section DMEM is executed in the read request READ.

The second cache tag update determining section TGDJ determines whether or not to update the tag section TAGLLb based on the information SIN, LLHTW, and HTCLL and the like. The second cache tag update determining section TGDJ outputs a determination result to the logical sum circuit ORp1. For example, the second cache tag update determining section TGDJ, in the case of the process request indicated by the information SIN being equal to the read request READ, determines the tag section TAGLLb not to be updated. The output signal of the second cache tag update determining section TGDJ corresponds to a control signal in the related art for updating the tag section TAGLLb.

The logical sum circuit ORp1 calculates the logical sum of the determination result of the second cache tag update determining section TGDJ and the output signal of the logical product circuit ANDp1 and outputs a calculation result to the logical product circuit ANDp3. Therefore, the logical sum circuit ORp1, even in the case of the second cache tag update determining section TGDJ determining the tag section TAGLLb not to be updated, outputs a signal of the logical value "1" to the logical product circuit ANDp3 in the case of the eviction target data satisfying the stop condition. The signal of the logical value "1" output from the logical sum circuit ORp1 means that the tag section TAGLLb is updated. Accordingly, adding the logical sum circuit ORp1 to a configuration in the related art allows the tag section TAGLLb to be updated in the read request READ.

The second cache tag data generating section TDGEN generates the update data WD of the tag section TAGLLb based on the information SIN, LLHTW, and HTCLL and the like and outputs the update data WD to the tag section TAGLLb.

The first cache control section CMCNTLb controls the first cache memory L1 based on the information SIN, LLHTW, HTCLL, HTCL1, REQTCL1, and ADMS and the like. For example, the first cache control section CMCNTLb outputs the information IRPL specifying replacement, the information ISNP specifying snooping, or the like to the core CORE.

The abort determining section ABDJ determines whether or not to stop the process request input into the pipeline control section PLC based on the information SIN, ADMS, and ADMM, an output signal of the interlock control section INTCL, and the like. The abort determining section ABDJ outputs a determination result to the logical product circuits ANDp2, ANDp3, and ANDp5. For example, the abort determining section ABDJ, in the case of stopping the process request input into the pipeline control section PLC, outputs a signal of the logical value "1" to the logical product circuits ANDp2, ANDp3, and ANDp5.

The interlock control section INTCL is a process mechanism that, when an update occurs on the content of the tag section TAGLLb, invalidates subsequent processes until completion of the update process. For example, a subsequent process request that references the same block as the update process of the tag section TAGLLb in the read request READ is locked (aborted). Accordingly, in the case of occurrence of a process request that updates the same block as a preceding process, the interlock control section INTCL locks the process request.

The logical product circuit ANDp5 calculates the logical product of an inverted signal of the determination result of the abort determining section ABDJ and the output signal of the eviction request completion determining section CTDJ and outputs a calculation result as the information MORPCT to the cache miss control section MIB. For example, the logical product circuit ANDp5, in the case of a process based on the process request MORP being normally ended without an abort, transfers the information MORPCT indicating completion of a process request based on the eviction request MORP from the eviction request completion determining section CTDJ to the cache miss control section MIB. The cache miss control section MIB that receives the information MORPCT inputs the process request MVIN into the pipeline control section PLC through the input section INPb.

The logical product circuit ANDp2 calculates the logical product of an inverted signal of the determination result of the abort determining section ABDJ and the output signal of the instruction generating section IGEN and outputs a calculation result as the information VALID to the selecting section SELp2 and the cache miss control section MIB.

The logical product circuit ANDp3 calculates the logical product of an inverted signal of the determination result of the abort determining section ABDJ and the output signal of the logical sum circuit ORp1 and outputs a calculation result to the logical product circuit ANDp4.

The selecting section SELp2 selects and outputs any of the information LLHTW and RWAYID based on the output signal of the logical product circuit ANDp2 to the decoding section DEC. The information LLHTW indicates the way WAY, in the plurality of pieces of first management information INFLLb retained in the tag section TAGLLb, that is accessed in the case of a hit occurring for the process request input into the pipeline control section PLC. The information RWAYID, as described in FIG. 9, indicates the way WAY that retains data evicted from the data retaining section DMEM (eviction target data).

For example, the selecting section SELp2, in the case of the information VALID being equal to the logical value "1", that is, in the case of a cache miss occurring in the second cache memory LLb, outputs the information RWAYID to the decoding section DEC. The selecting section SELh2 selects the information LLHTW in the case of input of the process request MORP into the pipeline control section PLC. In the case of input of the process request MVIN into the pipeline control section PLC, the information RWAYID is selected in a request for the block type change process, and the information LLHTW is selected in a request other than the request for the block type change process. Accordingly, adding the selecting section SELp2 to a configuration in the related art allows the tag section TAGLLb to be updated in the read request READ.

The decoding section DEC decodes the output signal of the selecting section SELp2 into a signal for each way WAY.

The logical product circuit ANDp4 calculates the logical product of the output signal of the decoding section DEC and the output signal of the logical product circuit ANDp3 and outputs a calculation result as the information WE to the tag section TAGLLb. That is, the logical product circuit ANDp4 outputs, to the tag section TAGLLb, the information WE that indicates the update target first management information INFLLb of the first management information INFLLb of the plurality of ways WAY retained in the tag section TAGLLb. Accordingly, the logical product circuit ANDp4, in the case of updating the tag section TAGLLb, outputs the information WE indicating the update target way WAY to the tag section TAGLLb.

The update target first management information INFLLb of the plurality of pieces of first management information INFLLb retained in the tag section TAGLLb is selected based on the information WE (write enable) and the address RAD[18:7]. The first management information INFLLb that is selected based on the information WE and the address RAD[18:7] is updated based on the update data WD. Accordingly, the content of the tag section TAGLLb is updated.

The selecting section SELp3 selects any of the information BTC and RWAYID as the information WAYID based on the information BTC. For example, the selecting section SELp3 selects the information RWAYID as the information WAYID in the case of the information BTC being equal to the logical value "0". The selecting section SELp3 selects the information BTC as the information WAYID in the case of the information BTC being equal to the logical value "1".

Figure 14:
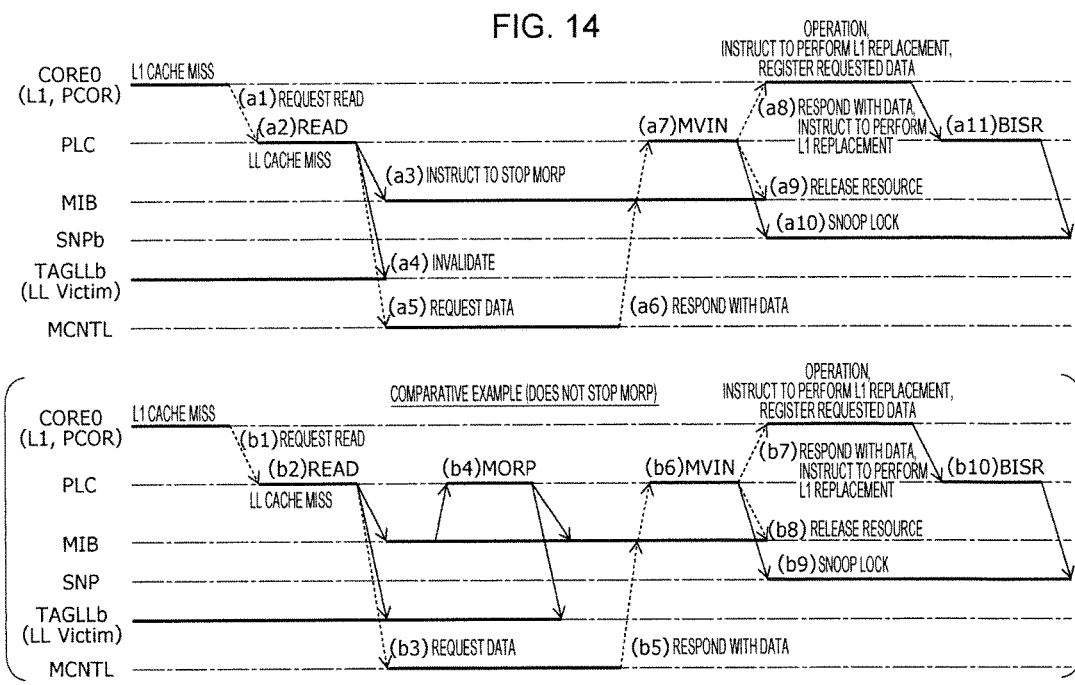
FIG. 14 is a diagram illustrating one example of operation of the operation processing device in the case of eviction target data satisfying a stop condition.

FIG. 14 illustrates one example of operation of the operation processing device PUb in the case of the eviction target data satisfying the stop condition. A comparative example that does not have a control to stop the eviction request MORP is illustrated in parentheses in FIG. 14. A solid line arrow illustrated in FIG. 14 indicates a process related to the eviction target data, and a dotted line arrow indicates a process related to the requested data requested by the first cache memory L1. "LL Victim" in FIG. 14 indicates the eviction target data.

In FIG. 14, the first cache memory L1 and the second cache memory LLb do not retain the requested data. The requested data is in "Local=Host" and is not output to another CMG. The eviction target data is in "Local=Host", has the state "Invalid" in the first cache memory L1, has the state "Exclusive" in the second cache memory LLb, and is retained in only CMG belonging to the requester core CORE0.

The core CORE0 issues the read request READ to the second cache memory LLb since a cache miss occurs for the requested data in the first cache memory L1 ((a1) in FIG. 14). Accordingly, the read request READ is input into the pipeline control section PLC. The pipeline control section PLC searches for whether or not the requested data requested with the read request READ by the first cache memory L1 is stored in the second cache memory LLb ((a2) in FIG. 14). While a cache miss occurs for the requested data in the second cache memory LLb, the eviction target data satisfies the stop condition. Thus, the pipeline control section PLC instructs the cache miss control section MIB to stop issuing of the eviction request MORP ((a3) in FIG. 14). Furthermore, the pipeline control section PLC updates the state of the eviction target data of the tag section TAGLLb to "Invalid" ((a4) in FIG. 14).

In the example illustrated in FIG. 14, the eviction target data is not retained in the first cache memory L1, and only the second cache memory LLb of CMG to which the requester core CORE0 belongs retains data that is not updated. Therefore, since the eviction target data does not have to be saved in the main storage device MEM0, a process of evicting the eviction target data from the second cache memory LLb is ended by only releasing the first management information INFLLb of the eviction target data. Accordingly, the pipeline control section PLC, in the case of the eviction target data satisfying the stop condition, may execute, in the read process READ, a process that corresponds to a process based on the eviction request MORP.

The pipeline control section PLC requests the requested data from the memory control section MCNTL ((a5) in FIG. 14). The memory control section MCNTL reads the requested data and responds with the requested data to the cache miss control section MIB ((a6) in FIG. 14). The cache miss control section MIB, in the case of a data response occurring from the memory control section MCNTL, inputs the process request MVIN into the pipeline control section PLC through the input section INPb ((a7) in FIG. 14). The process request MVIN is a request for storing the data of the response from the memory control section MCNTL in the second cache memory LLb.

The pipeline control section PLC, in the case of a process based on the process request MVIN being ended, responds with the requested data to the first cache memory L1 and instructs the first cache memory L1 to execute an L1 replacement process of evicting data from the first cache memory L1 ((a8) in FIG. 14). The pipeline control section PLC releases a resource of the cache miss control section MIB ((a9) in FIG. 14). Furthermore, the pipeline control section PLC executes snoop lock at a target address of the L1 replacement process in order for the first cache memory L1 to execute the L1 replacement process ((a10) in FIG. 14).

The core CORE0 issues the process request BISR to the second cache memory in the case of completion of the L1 replacement process in the first cache memory L1. The pipeline control section PLC that receives the process request BISR executes a process based on the process request BISR ((a11) in FIG. 14). The process based on the process request BISR, for example, is a replacement completion process that does not accompany write-back from the first cache memory L1 to the second cache memory LLb. For example, in the process request BISR, the type code TCL1 in the first management information INFLLb retained in the tag section TAGLLb, the second management information INFL1b, and the like are updated. The snoop lock is released by the end of the process based on the process request BISR.

In the comparative example, the pipeline control section PLC, in the case of a cache miss occurring in the second cache memory LL, acquires a resource of the cache miss control section MIB in order to evict the eviction target data from the second cache memory LL. The cache miss control section MIB, in the case of acquiring the resource, issues the eviction request MORP to the pipeline control section PLC ((b4) in FIG. 14). The pipeline control section PLC, in the case of receiving the eviction request MORP, evicts the eviction target data from the second cache memory LL by updating the state of the eviction target data of the tag section TAGLLb to "Invalid". Accordingly, in the comparative example, the eviction request MORP is issued in subsequence to the read request READ.

Meanwhile, issuing of the eviction request MORP is stopped in the second cache memory LLb illustrated in FIG. 3. Thus, the number of process requests input into the pipeline control section PLC is decreased compared with the comparative example. Thus, the throughput of the pipeline control section PLC may be improved.

Figure 15:
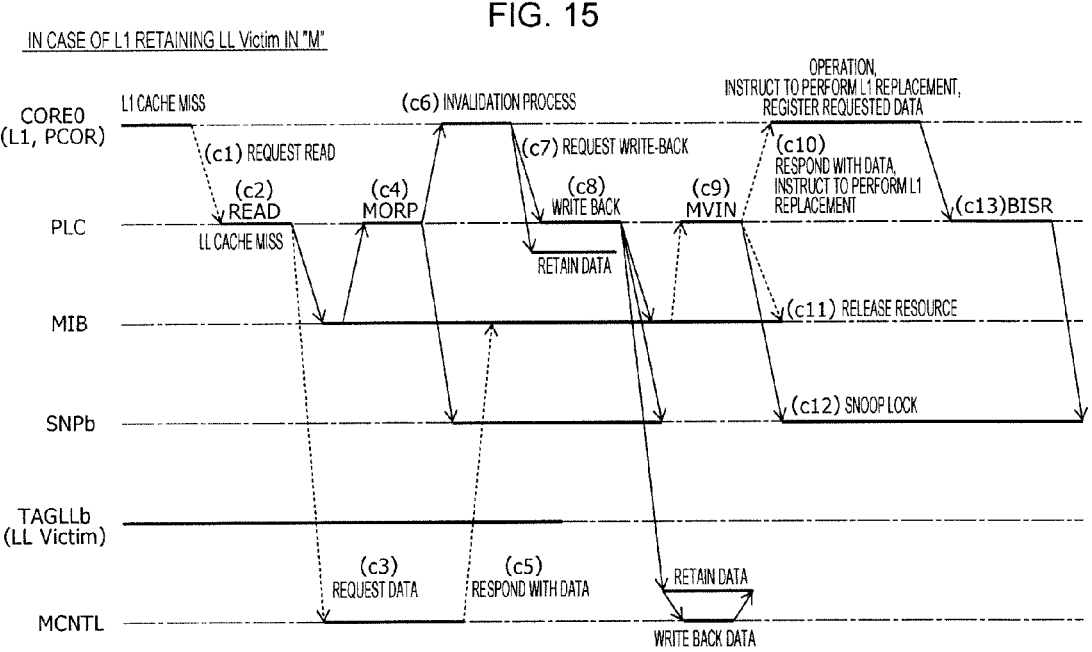
FIG. 15 is a diagram illustrating one example of operation of the operation processing device in the case of the eviction target data not satisfying the stop condition.

FIG. 15 illustrates one example of operation of the operation processing device PUb in the case of the eviction target data not satisfying the stop condition. A solid line arrow, a dotted line arrow, and "LL Victim" illustrated in FIG. 15 have the same meaning as FIG. 14. In FIG. 15, the first cache memory L1 and the second cache memory LLb do not retain the requested data. The requested data is in "Local=Host" and is not output to another CMG. The eviction target data is in "Local=Host", has the state "Modified" in the first cache memory L1, has the state "Exclusive" in the second cache memory LLb, and is retained in only CMG belonging to the requester core CORE0.

The core CORE0 issues the read request READ to the second cache memory LLb since a cache miss occurs for the requested data in the first cache memory L1 ((c1) in FIG. 15). The pipeline control section PLC searches for whether or not the requested data requested with the read request READ by the first cache memory L1 is stored in the second cache memory LLb ((c2) in FIG. 15). Since a cache miss occurs in the second cache memory LLb, the pipeline control section PLC requests the requested data from the memory control section MCNTL ((c3) in FIG. 15).

Since the eviction target data does not satisfy the stop condition, the pipeline control section PLC acquires a resource of the cache miss control section MIB. The cache miss control section MIB, in the case of acquiring the resource, issues the eviction request MORP to the pipeline control section PLC ((c4) in FIG. 15). Since the eviction target data is retained in the first cache memory L1, the pipeline control section PLC requests the first cache memory L1 to invalidate the eviction target data. The first cache memory L1, in the case of receiving an invalidation request from the second cache memory, executes an invalidation process of the eviction target data ((c6) in FIG. 15). For example, since the eviction target data is updated, the first cache memory L1 issues write-back of the eviction target data to the second cache memory LLb. The pipeline control section PLC that receives a write-back request writes the eviction target data back to the main storage device MEM0 ((c8) in FIG. 15). For example, the pipeline control section PLC acquires a resource of a write-back control section (not illustrated) and transfers the eviction target data to the memory control section MCNTL.

The cache miss control section MIB, in the case of a data response occurring from the memory control section MCNTL ((c5) in FIG. 15) with completion of saving of the eviction target data, inputs the process request MVIN into the pipeline control section PLC through the input section INPb ((c9) in FIG. 15). Operation after a process based on the process request MVIN is completed is the same as or corresponds to the operation illustrated in FIG. 14.

The second cache memory LLb determines the first cache memory L1 to retain the eviction target data in "Exclusive" but does not recognize whether or not the first cache memory L1 updates the eviction target data. Thus, the pipeline control section PLC, in the case of the first cache memory L1 retaining the eviction target data, does not stop issuing of the eviction request MORP.

The pipeline control section PLC may recognize the state of the eviction target data in the first cache memory L1 in detail. For example, the first cache memory L1 may report the state of data to the second cache memory LLb each time data is updated.

Figure 16:
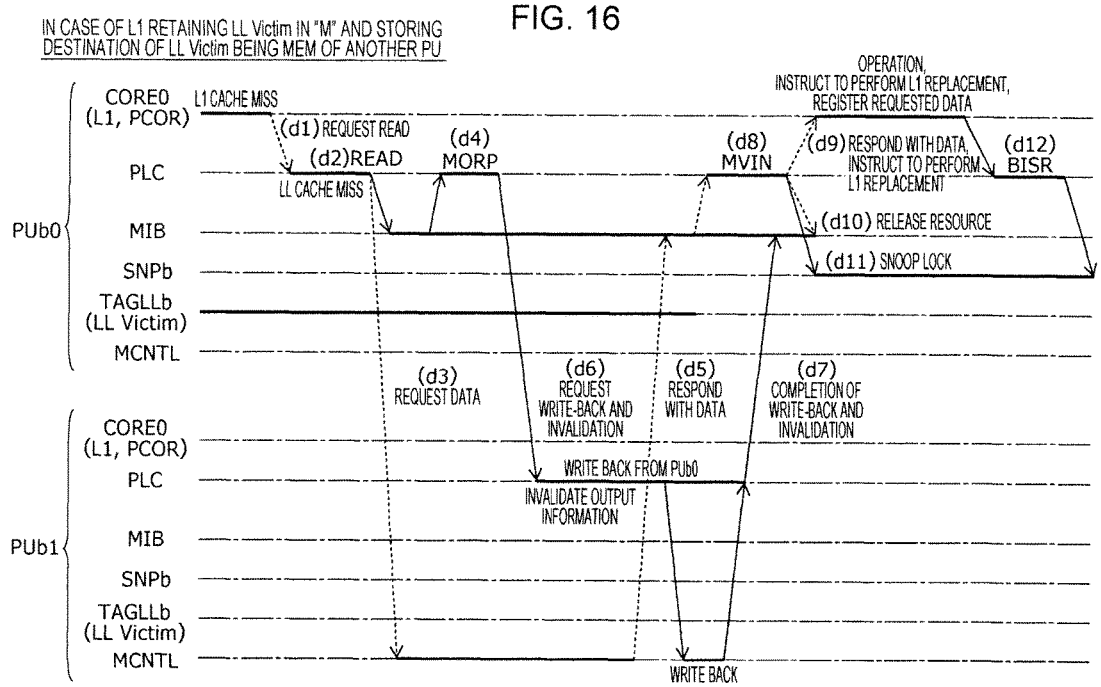
FIG. 16 is a diagram illustrating another example of operation of the operation processing device in the case of the eviction target data not satisfying the stop condition.

FIG. 16 illustrates another example of operation of the operation processing device PUb in the case of the eviction target data not satisfying the stop condition. A solid line arrow, a dotted line arrow, and "LL Victim" illustrated in FIG. 16 have the same meaning as FIG. 14. In FIG. 16, the first cache memory L1 and the second cache memory LLb do not retain the requested data. The requested data is in "Local≠Host" and is not output to another CMG. The eviction target data is in "Local≠Host", has the state "Invalid" in the first cache memory L1, has the state "Modified" in the second cache memory LLb, and is retained in only CMG belonging to the requester core CORE0. The storing destinations of the requested data and the eviction target data are the main storage device MEM1 connected to the operation processing device PUb1.

The core CORE0 issues the read request READ to the second cache memory LLb since a cache miss occurs for the requested data in the first cache memory L1 ((d1) in FIG. 16). The pipeline control section PLC searches for whether or not the requested data requested with the read request READ by the first cache memory L1 is stored in the second cache memory LLb ((d2) in FIG. 16). Since a cache miss occurs in the second cache memory LLb, the pipeline control section PLC requests the requested data from the memory control section MCNTL of the operation processing device PUb1 ((d3) in FIG. 16).

Since the eviction target data does not satisfy the stop condition, the pipeline control section PLC acquires a resource of the cache miss control section MIB. The cache miss control section MIB, in the case of acquiring the resource, issues the eviction request MORP to the pipeline control section PLC ((d4) in FIG. 16).

Since the eviction target data is updated, the pipeline control section PLC requests the operation processing device PUb1 belonging to the manager CMG of the eviction target data to write back and invalidate the eviction target data ((d6) in FIG. 16). The pipeline control section PLC of the operation processing device PUb1, in the case of completion of write-back and invalidation of the eviction target data, notifies a completion report to the cache miss control section MIB of the operation processing device PUb0 ((d7) in FIG. 16).

The cache miss control section MIB, in the case of completion of a write-back process and an invalidation process of the eviction target data in the operation processing device PUb1, inputs the process request MVIN into the pipeline control section PLC through the input section INPb ((d8) in FIG. 16). That is, the cache miss control section MIB, in the case of a data response occurring from the memory control section MCNTL ((d5) in FIG. 16) with completion of saving of the eviction target data, inputs the process request MVIN into the pipeline control section PLC through the input section INPb. Operation after a process based on the process request MVIN is completed is the same as or corresponds to the operation illustrated in FIG. 15.

Figure 17:
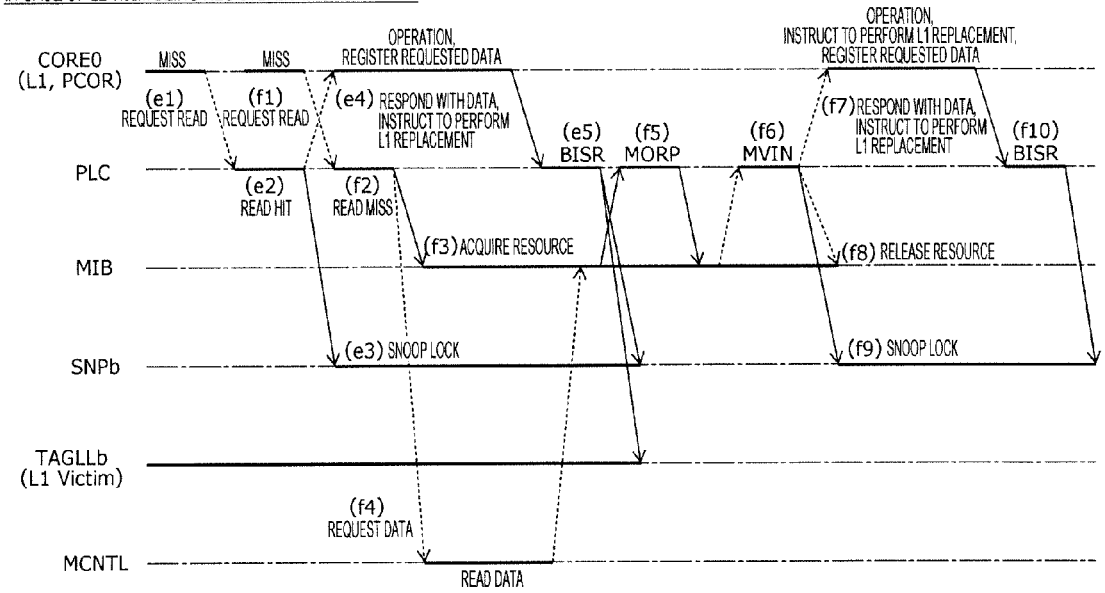
FIG. 17 is a diagram illustrating another example of operation of the operation processing device in the case of the eviction target data not satisfying the stop condition.

FIG. 17 illustrates another example of operation of the operation processing device PUb in the case of the eviction target data not satisfying the stop condition. A solid line arrow and a dotted line arrow illustrated in FIG. 17 have the same meaning as FIG. 14. "L1 Victim" in FIG. 17 indicates data that is evicted from the first cache memory L1. In FIG. 17, the requested data that is requested with the preceding read request READ is retained in the second cache memory LLb. Requested data that is requested with a subsequent read request is not retained in the first cache memory L1 and the second cache memory LLb. The requested data is in "Local=Host" and is not output to another CMG. The eviction target data is in "Local=Host", has the state "Invalid" in the first cache memory L1, has the state "Exclusive" in the second cache memory LLb, and is retained in only CMG belonging to the requester core CORE0. The eviction target data is registered in the snoop lock section SNPb.

The core CORE0 issues the read request READ to the second cache memory LLb since a cache miss occurs for the requested data in the first cache memory L1 ((e1) in FIG. 17). The pipeline control section PLC searches for whether or not the requested data requested with the read request READ (preceding read request READ) by the first cache memory L1 is stored in the second cache memory LLb ((e2) in FIG. 17). Since a cache hit occurs in the second cache memory LLb, the pipeline control section PLC responds with the requested data to the first cache memory L1 and instructs the first cache memory L1 to execute the L1 replacement process of evicting data from the first cache memory L1 ((e4) in FIG. 17). The pipeline control section PLC executes snoop lock at a target address of the L1 replacement process in order for the first cache memory L1 to execute the L1 replacement process ((e3) in FIG. 17). The pipeline control section PLC, in the case of receiving the process request BISR, executes a process based on the process request BISR ((e5) in FIG. 17).

The core CORE0 issues the read request READ to the second cache memory LLb since a cache miss occurs for the subsequent requested data in the first cache memory L1 ((f1) in FIG. 17). The pipeline control section PLC searches for whether or not the requested data requested with the read request READ (subsequent read request READ) by the first cache memory L1 is stored in the second cache memory LLb ((f2) in FIG. 17). Since a cache miss occurs in the second cache memory LLb, the eviction target data is determined. The eviction target data is registered in the snoop lock section SNPb by a process based on the preceding read request READ ((e1) to (e5) in FIG. 17). That is, the eviction target data does not satisfy the stop condition.

Thus, the pipeline control section PLC acquires a resource of the cache miss control section MIB ((f3) in FIG. 17) and requests the requested data from the memory control section MCNTL ((f4) in FIG. 17). The cache miss control section MIB, in the case of a response to the requested data occurring from the memory control section MCNTL, issues the eviction request MORP to the pipeline control section PLC ((f5) in FIG. 17). While a process based on the eviction request MORP is described as being executed after release of the snoop lock in FIG. 17, a first flow, a second flow, and a third flow below are executed in actuality until the release of the snoop lock.

In the first flow, the cache miss control section MIB, regardless of the snoop lock, issues the eviction request MORP to the pipeline control section PLC when an execution environment of the eviction request MORP is prepared.

In the second flow, the pipeline control section PLC, in the case of the eviction target data not being able to be evicted due to the snoop lock after execution of the process of the eviction request MORP, stops the process of the eviction request MORP. The pipeline control section PLC notifies the cache miss control section MIB that the process of the eviction request MORP is stopped.

In the third flow, the cache miss control section MIB re-executes the first flow in the case of being notified that the process of the eviction request MORP is stopped.

The cache miss control section MIB, in the case of completion of saving of the eviction target data, inputs the process request MVIN into the pipeline control section PLC through the input section INPb. Operation after a process based on the process request MVIN is completed is the same as or corresponds to the operation illustrated in FIG. 14.

Figure 18:
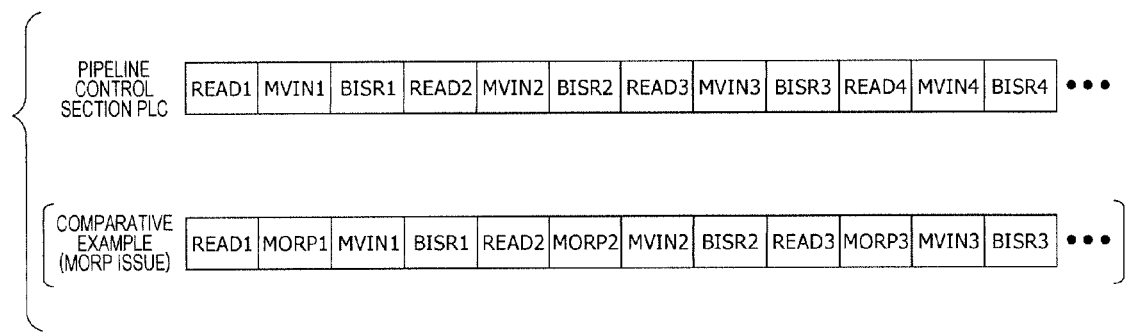
FIG. 18 is a diagram illustrating one example of a process request that is input into the pipeline control section illustrated in FIG. 3.

FIG. 18 illustrates one example of a process request that is input into the pipeline control section PLC illustrated in FIG. 3. A comparative example that does not have a control to stop the eviction request MORP is illustrated in parentheses in FIG. 18. In the case of all the eviction target data selected with the read request READ being clean, the three process requests READ, MVIN, and BISR are input into the pipeline control section PLC. Meanwhile, in the comparative example, the four process requests READ, MORP, MVIN, and BISR are input into the pipeline control section PLC. Hereinafter, performance improvement that is expected by executing a process corresponding to a process based on the eviction request MORP in the read request READ will be illustrated.

In the case of all the eviction target data selected with the read request READ being clean, a series of flows based on a read process is executed four times in 12 cycles in the second cache memory LLb. Meanwhile, in the comparative example, a series of flows based on the read process is executed three times in 12 cycles. In this case, the second cache memory LLb is considered to have an expected improvement of approximately 33% compared with the comparative example.

Figure 19:
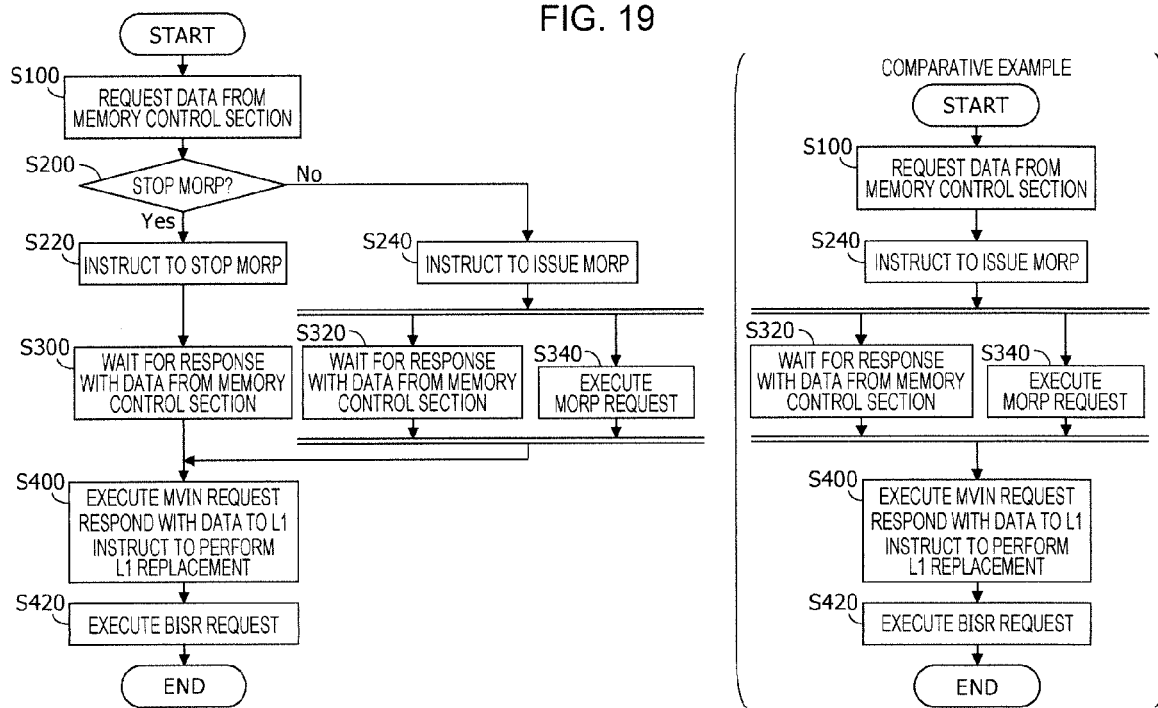
FIG. 19 is a diagram illustrating one example of operation of the pipeline control section illustrated in FIG. 3.

FIG. 19 illustrates one example of operation of the pipeline control section PLC illustrated in FIG. 3. A comparative example that does not have a control to stop the eviction request MORP is illustrated in parentheses in FIG. 19. FIG. 19 is one example of operation of the pipeline control section PLC in the case of a cache miss occurring in the second cache memory LLb for the requested data requested with the read request READ by the first cache memory L1. Therefore, before Step S100 illustrated in FIG. 19, the pipeline control section PLC searches for whether or not the requested data requested with the read request READ by the first cache memory L1 is stored in the second cache memory LLb, as described in FIG. 14 and the like. The pipeline control section PLC detects a cache miss occurring for the requested data in the second cache memory LLb and executes the process of Step S100.

In Step S100, the pipeline control section PLC requests the requested data from the memory control section MCNTL.

Next, in Step S200, the pipeline control section PLC determines whether or not to stop issuing of the eviction request MORP. Details of the determination process as to whether or not to stop issuing of the eviction request MORP will be described in FIG. 20. In the case of stopping issuing of the eviction request MORP, the operation of the pipeline control section PLC transitions to Step S220. Meanwhile, in the case of not stopping issuing of the eviction request MORP, that is, in the case of issuing the eviction request MORP, the operation of the pipeline control section PLC transitions to Step S240.

In Step S220, the pipeline control section PLC notifies and instructs the cache miss control section MIB to stop issuing of the eviction request MORP. After the end of the process of Step S220, the operation of the pipeline control section PLC transitions to Step S300.

In Step S300, the pipeline control section PLC waits for a data response from the memory control section MCNTL. In the case of a data response occurring from the memory control section MCNTL, the operation of the pipeline control section PLC transitions to Step S400.

In Step S240, the pipeline control section PLC notifies and instructs the cache miss control section MIB to issue the eviction request MORP. After execution of the process of Step S240, the operation of the pipeline control section PLC transitions to Step S320 and Step S340. Step S320 and Step S340 are executed in parallel.

In Step S320, the pipeline control section PLC waits for a data response from the memory control section MCNTL.

In Step S340, the pipeline control section PLC executes a process based on the eviction request MORP. Details of the process based on the eviction request MORP will be described in FIG. 21. In the case of a data response occurring from the memory control section MCNTL with the end of the process based on the eviction request MORP, the operation of the pipeline control section PLC transitions to Step S400.

In Step S400, the pipeline control section PLC, for example, executes a process based on the process request MVIN, responds with data to the first cache memory L1, and instructs the first cache memory L1 to execute the L1 replacement process as described in FIG. 14 and the like.

Next, in Step S420, the pipeline control section PLC executes a process based on the process request BISR as described in FIG. 14 and the like.

The comparative example does not include Steps S200, S220, and S300. That is, in the comparative example, in the case of a cache miss occurring in the second cache memory with no enough space in the way WAY storing the requested data, the eviction request MORP is issued regardless of the state of the eviction target data. Therefore, the throughput of a pipeline process in the comparative example is decreased compared with the pipeline control section PLC. In other words, the throughput of a pipeline process may be improved in the pipeline control section PLC compared with the comparative example. The operation of the pipeline control section PLC is not limited to the example illustrated in FIG. 19.

Figure 20:
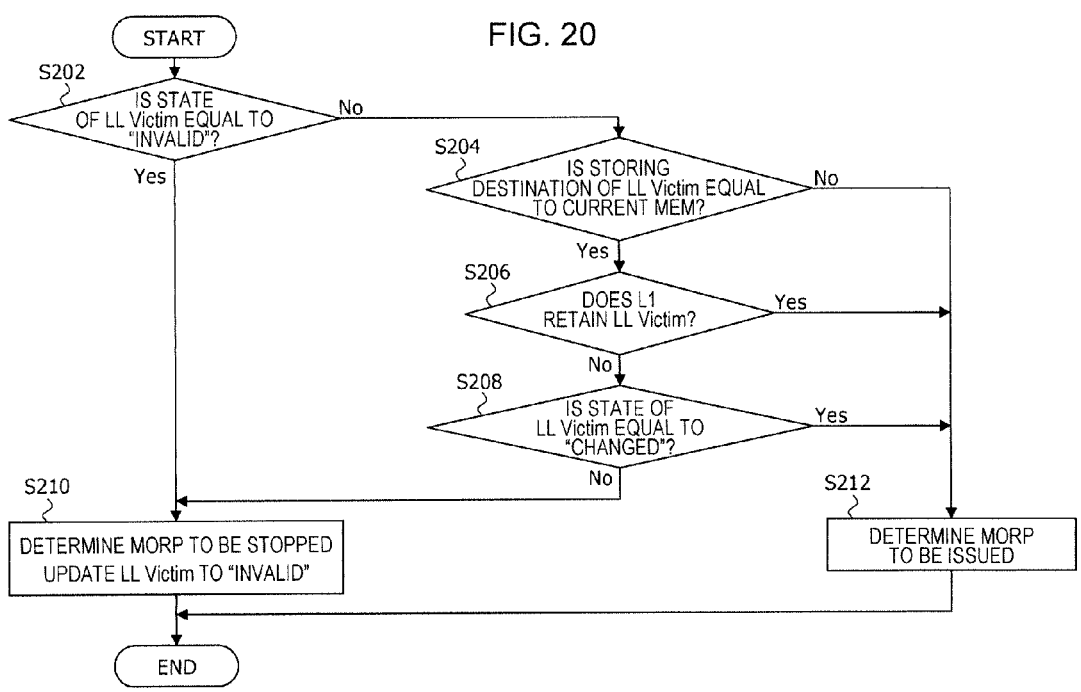
FIG. 20 is a diagram illustrating one example of a process of determining whether or not to stop issuing of an eviction request.

FIG. 20 illustrates one example of a process of determining whether or not to stop issuing of the eviction request MORP. That is, FIG. 20 illustrates one example of the determination process of Step S200 illustrated in FIG. 19. "LL Victim" in FIG. 20 has the same meaning as FIG. 14. That is, "LL Victim" in FIG. 20 indicates the eviction target data.

In Step S202, the pipeline control section PLC determines whether or not the state of the eviction target data (LL Victim) in the second cache memory LLb is equal to "Invalid". In the case of the state of the eviction target data being equal to "Invalid", the operation of the pipeline control section PLC transitions to Step S210. Meanwhile, in the case of the state of the eviction target data being equal to a state other than "Invalid", the operation of the pipeline control section PLC transitions to Step S204.

In Step S204, the pipeline control section PLC determines whether or not the storing destination of the eviction target data is the main storage device MEM that is connected to the operation processing device PUb including the pipeline control section PLC. That is, the pipeline control section PLC determines whether or not the eviction target data is in "Local=Host". The operation of the pipeline control section PLC transitions to Step S206 in the case of the storing destination of the eviction target data being the main storage device MEM that is connected to the operation processing device PUb including the pipeline control section PLC. Meanwhile, the operation of the pipeline control section PLC transitions to Step S212 in the case of the storing destination of the eviction target data being the main storage device MEM that is connected to the operation processing device PUb other than the operation processing device PUb including the pipeline control section PLC.

In Step S206, the pipeline control section PLC determines whether or not the first cache memory L1 retains the eviction target data. In the case of the first cache memory L1 retaining the eviction target data, the operation of the pipeline control section PLC transitions to Step S212. Meanwhile, in the case of the first cache memory L1 not retaining the eviction target data, the operation of the pipeline control section PLC transitions to Step S208.

In Step S208, the pipeline control section PLC determines whether or not the state of the eviction target data is equal to "Modified". In the case of the state of the eviction target data being equal to "Modified", the operation of the pipeline control section PLC transitions to Step S212. Meanwhile, in the case of the state of the eviction target data being equal to a state other than "Modified", the operation of the pipeline control section PLC transitions to Step S210.

Accordingly, the determinations of Steps S202, S204, S206, and S208 determine whether or not the eviction target data satisfies the stop condition.

In Step S210, the pipeline control section PLC determines issuing of an eviction request to be stopped and updates the state of the eviction target data to "Invalid". For example, the pipeline control section PLC updates, to "Invalid", the type code TCLL of the first management information INFLLb, of the first management information INFLLb retained in the tag section TAGLLb, that corresponds to the eviction target data. After execution of the process of Step S210, the operation of the pipeline control section PLC transitions to Step S220 illustrated in FIG. 19.

In Step S212, the pipeline control section PLC determines an eviction request to be issued, and the operation of the pipeline control section PLC transitions to Step S240 illustrated in FIG. 19. The process of determining whether or not to stop issuing of the eviction request MORP is not limited to the example illustrated in FIG. 20.

Figure 21:
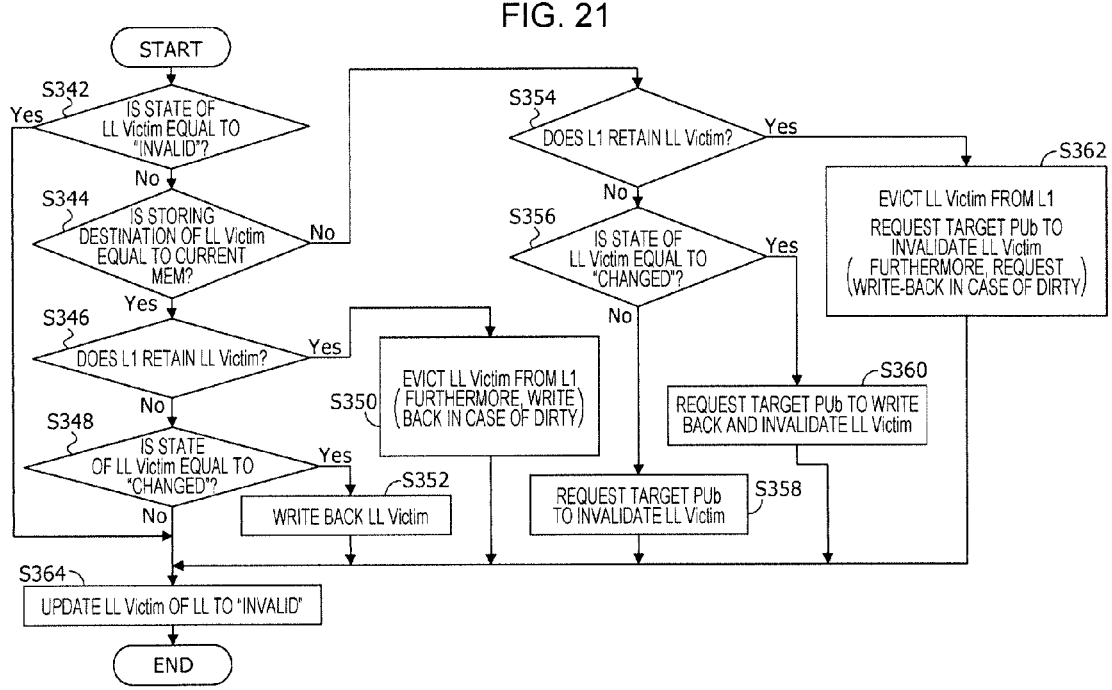
FIG. 21 is a diagram illustrating one example of a process based on the eviction request.

FIG. 21 illustrates one example of a process based on the eviction request MORP. That is, FIG. 21 illustrates one example of the process of Step S340 illustrated in FIG. 19. "LL Victim" in FIG. 21 has the same meaning as FIG. 14.

In Step S342, the pipeline control section PLC determines whether or not the state of the eviction target data in the second cache memory LLb is equal to "Invalid". In the case of the state of the eviction target data being equal to "Invalid", the operation of the pipeline control section PLC transitions to Step S364. Meanwhile, in the case of the state of the eviction target data being equal to a state other than "Invalid", the operation of the pipeline control section PLC transitions to Step S344.

In Step S344, the pipeline control section PLC determines whether or not the storing destination of the eviction target data is the main storage device MEM that is connected to the operation processing device PUb including the pipeline control section PLC. That is, the pipeline control section PLC determines whether or not the eviction target data is in "Local=Host". The operation of the pipeline control section PLC transitions to Step S346 in the case of the storing destination of the eviction target data being the main storage device MEM that is connected to the operation processing device PUb including the pipeline control section PLC. Meanwhile, the operation of the pipeline control section PLC transitions to Step S354 in the case of the storing destination of the eviction target data being the main storage device MEM that is connected to the operation processing device PUb other than the operation processing device PUb including the pipeline control section PLC.

In Step S346, the pipeline control section PLC determines whether or not the first cache memory L1 retains the eviction target data. In the case of the first cache memory L1 retaining the eviction target data, the operation of the pipeline control section PLC transitions to Step S350. Meanwhile, in the case of the first cache memory L1 not retaining the eviction target data, the operation of the pipeline control section PLC transitions to Step S348.

In Step S348, the pipeline control section PLC determines whether or not the state of the eviction target data is equal to "Modified". In the case of the state of the eviction target data being equal to "Modified", the operation of the pipeline control section PLC transitions to Step S352. Meanwhile, in the case of the state of the eviction target data being equal to a state other than "Modified", the operation of the pipeline control section PLC transitions to Step S364.

In Step S350, the pipeline control section PLC requests the first cache memory L1 to execute the L1 replacement process of evicting the eviction target data from the first cache memory L1. In the case of the eviction target data being dirty, the pipeline control section PLC writes the eviction target data back to the main storage device MEM.

In the case of completion of the L1 replacement process, the operation of the pipeline control section PLC transitions to Step S364.

In Step S352, the pipeline control section PLC writes the eviction target data back to the main storage device MEM. After execution of the process of Step S352, the operation of the pipeline control section PLC transitions to Step S364.

In Step S354, the pipeline control section PLC determines whether or not the first cache memory L1 retains the eviction target data. In the case of the first cache memory L1 retaining the eviction target data, the operation of the pipeline control section PLC transitions to Step S362. Meanwhile, in the case of the first cache memory L1 not retaining the eviction target data, the operation of the pipeline control section PLC transitions to Step S356.

In Step S356, the pipeline control section PLC determines whether or not the state of the eviction target data is equal to "Modified". In the case of the state of the eviction target data being equal to "Modified", the operation of the pipeline control section PLC transitions to Step S360. Meanwhile, in the case of the state of the eviction target data being equal to a state other than "Modified", the operation of the pipeline control section PLC transitions to Step S358.

In Step S358, the pipeline control section PLC request the operation processing device PUb managing the eviction target data to invalidate the eviction target data. After execution of the process of Step S358, the operation of the pipeline control section PLC transitions to Step S364.

In Step S360, the pipeline control section PLC request the operation processing device PUb managing the eviction target data to write back and invalidate the eviction target data. After execution of the process of Step S360, the operation of the pipeline control section PLC transitions to Step S364.

In Step S362, the pipeline control section PLC requests the first cache memory L1 to execute the L1 replacement process of evicting the eviction target data from the first cache memory L1. Furthermore, the pipeline control section PLC request the operation processing device PUb managing the eviction target data to invalidate the eviction target data. In the case of the eviction target data being dirty, the pipeline control section PLC request the operation processing device PUb managing the eviction target data to write back and invalidate the eviction target data. After execution of the process of Step S362, the operation of the pipeline control section PLC transitions to Step S364.

In Step S364, the pipeline control section PLC updates the state of the eviction target data to "Invalid". Accordingly, the process based on the eviction request MORP is ended. The process based on the eviction request MORP is not limited to the example illustrated in FIG. 21.

The embodiment illustrated in FIG. 2 to FIG. 21 may achieve the same effect as the embodiment illustrated in FIG. 1. For example, the pipeline control section PLC, in the case of the eviction target data satisfying the stop condition (a first condition or a second condition below), executes a process of evicting data from any of the plurality of ways WAY without issuing the eviction request MORP.

The first condition is that the state of the eviction target data is equal to "Invalid". The second condition is that the eviction target data is data stored at a local memory address in the ccNUMA configuration, that the state of the eviction target data is equal to a state other than "Modified", and that the eviction target data is not retained in the first cache memory L1.

In the case of the stop condition being satisfied, a process of evicting data from the data retaining section DMEM may be executed without issuing the eviction request MORP. Thus, the number of process requests input into the pipeline control section PLC may be decreased compared with the case of issuing the eviction request MORP. Accordingly, the throughput of the pipeline control section PLC at the time of executing a series of processes for one read request READ from the first cache memory L1 may be improved. Consequently, the throughput of the second cache memory LLb may be improved.

Figure 22:
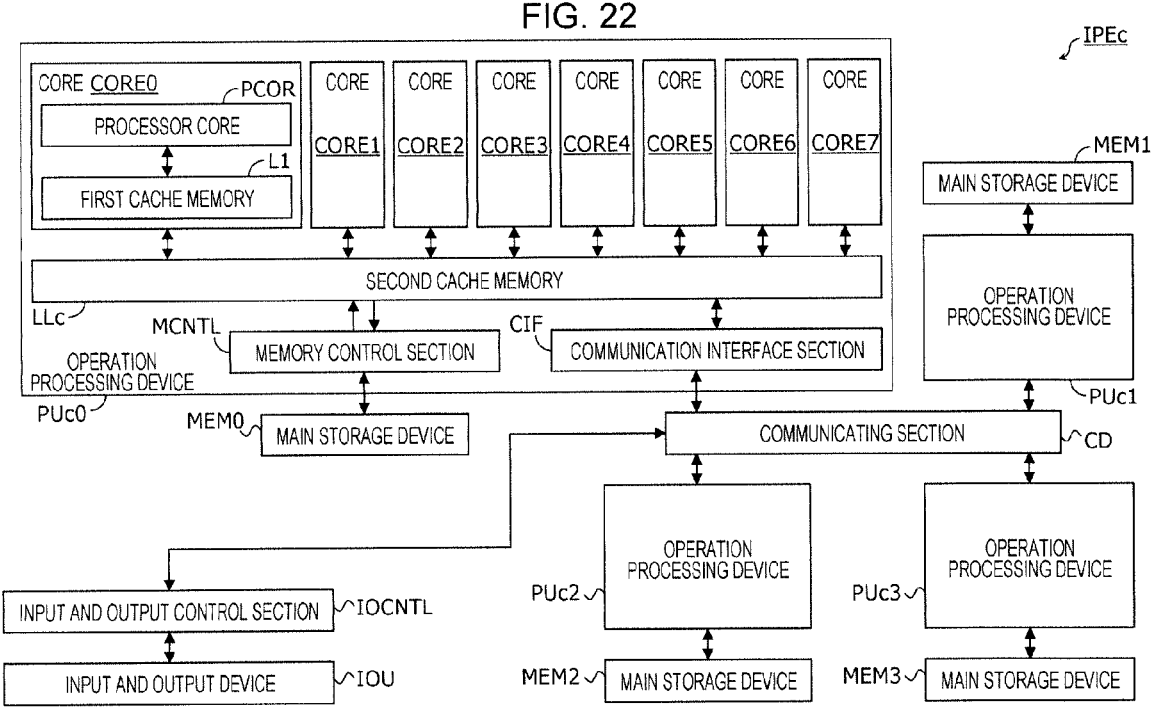
FIG. 22 is a diagram illustrating another embodiment of an operation processing device, an information processing apparatus, and a control method for the operation processing device.

FIG. 22 illustrates another embodiment of an operation processing device, an information processing apparatus, and a control method for the operation processing device. The same or corresponding elements as the elements described in FIG. 1 to FIG. 21 will be designated by the same or corresponding reference signs and will not be described in detail. An information processing apparatus IPEc illustrated in FIG. 22 is a computer apparatus such as a server. The information processing apparatus IPEc is the same as or corresponds to the information processing apparatus IPEb illustrated in FIG. 2 except for including an operation processing device PUc instead of the operation processing device PUb illustrated in FIG. 2. For example, the information processing apparatus IPEc includes a plurality of operation processing devices PUc (PUc0, PUc1, PUc2, and PUc3), the plurality of main storage devices MEM (MEM0, MEM1, MEM2, and MEM3), the communicating section CD, the input and output control section IOCNTL, and the input and output device IOU.

The operation processing device PUc is the same as or corresponds to the operation processing device PUb illustrated in FIG. 2 except for including a second cache memory LLc instead of the second cache memory LLb illustrated in FIG. 2. For example, the operation processing device PUc includes the plurality of cores CORE (CORE0, CORE1, . . . , CORE7), the second cache memory LLc, the memory control section MCNTL, and the communication interface section CIF.

The configurations of the operation processing device PUc and the information processing apparatus IPEc are not limited to the example illustrated in FIG. 22. The number of the operation processing devices PUc and the number of main storage devices MEM are not limited to the example illustrated in FIG. 22.

Figure 23:
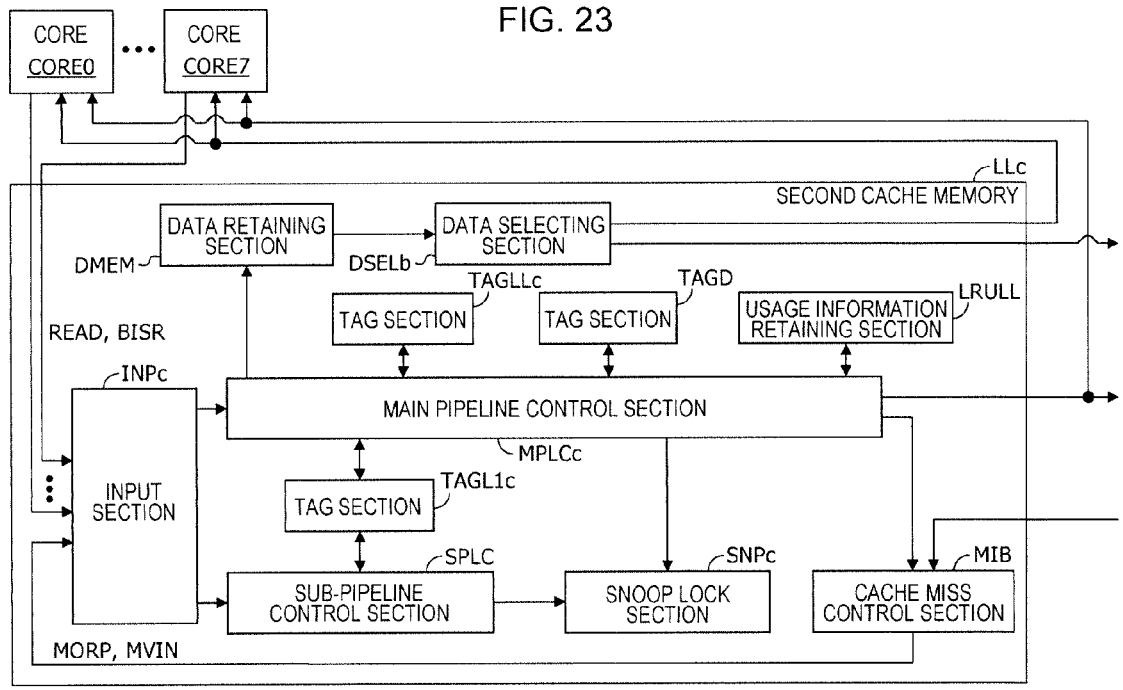
FIG. 23 is a diagram illustrating one example of a second cache memory illustrated in FIG. 22.

FIG. 23 illustrates one example of the second cache memory LLc illustrated in FIG. 22. The configuration of the second cache memory LLc is not limited to the example illustrated in FIG. 23. The second cache memory LLc includes a main pipeline control section MPLCc and a sub-pipeline control section SPLC instead of the pipeline control section PLC illustrated in FIG. 3. The second cache memory LLc includes an input section INPc, tag sections TAGLLc and TAGL1c, and a snoop lock section SNPc instead of the input section INPb, the tag sections TAGLLb and TAGL1b, and the snoop lock section SNPb illustrated in FIG. 3. Other configurations of the second cache memory LLc are the same as or correspond to the second cache memory LLb illustrated in FIG. 3.

For example, the second cache memory LLc includes the input section INPc, the main pipeline control section MPLCc, and the sub-pipeline control section SPLC. Furthermore, the second cache memory LLc includes the data retaining section DMEM, the data selecting section DSELb, the tag sections TAGLLc, TAGL1c, and TAGD, the usage information retaining section LRULL, the snoop lock section SNPc, and the cache miss control section MIB.

The data retaining section DMEM, the data selecting section DSELb, the tag section TAGD, and the usage information retaining section LRULL are the same as or correspond to the data retaining section DMEM, the data selecting section DSELb, the tag section TAGD, and the usage information retaining section LRULL illustrated in FIG. 3. The cache miss control section MIB is the same as or corresponds to the cache miss control section MIB illustrated in FIG. 3.

Figure 24:
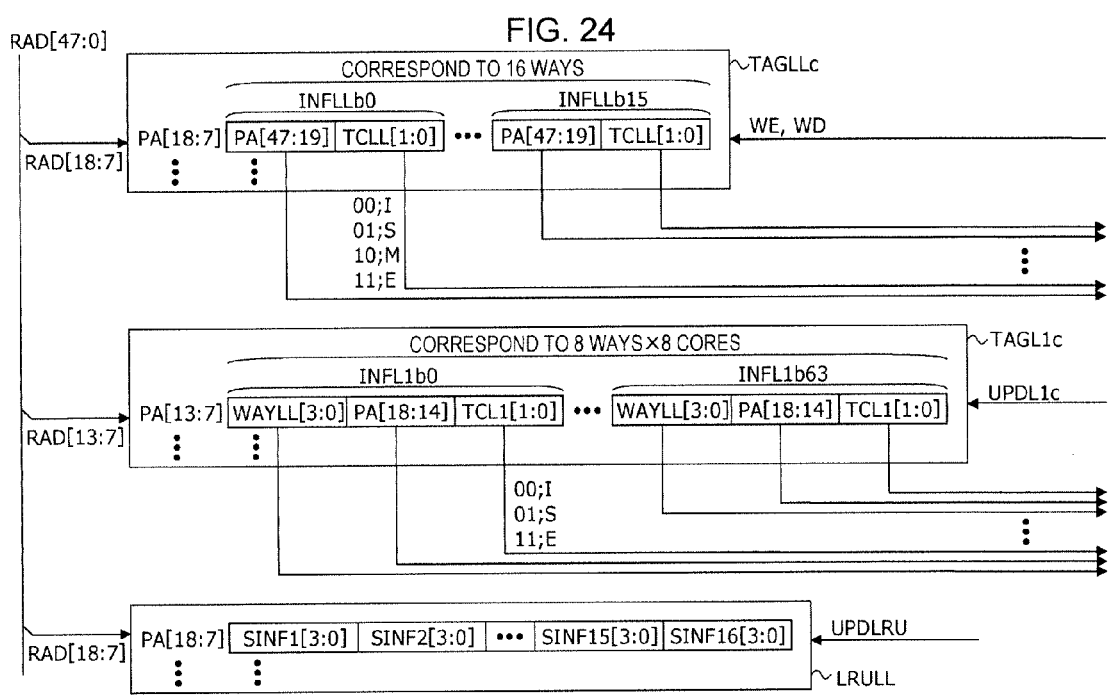
FIG. 24 is a diagram illustrating one example of a tag section and a usage information retaining section illustrated in FIG. 23.

The tag section TAGLLc is the same as or corresponds to the tag section TAGLLb illustrated in FIG. 3 except for retaining first management information INFLLc illustrated in FIG. 24 instead of the first management information INFLLb illustrated in FIG. 5. The tag section TAGL1c is the same as or corresponds to the tag section TAGL1b illustrated in FIG. 3 except for retaining second management information INFL1c illustrated in FIG. 24 instead of the second management information INFL1b illustrated in FIG. 5. In the example illustrated in FIG. 24, the type code TCL1 is removed from the first management information INFLLc and is included in the second management information INFL1c.

The input section INPc is the same as or corresponds to the input section INPb illustrated in FIG. 3 except for classifying a plurality of process requests into process requests input into the main pipeline control section MPLCc and process requests input into the sub-pipeline control section SPLC. The process request that is input into the main pipeline control section MPLCc is a request for a process that is executed by referencing at least the first management information INFLLc of the first management information INFLLc and the second management information INFL1c. The process request that is input into the sub-pipeline control section SPLC is a request for a process that is executed by referencing the second management information INFL1c without referencing the first management information INFLLc. In the case of using the tag sections TAGLLc and TAGL1c illustrated in FIG. 24, the process request input into the sub-pipeline control section SPLC is the process request BISR described in FIG. 14 and the like. Process requests other than the process request BISR are input into the main pipeline control section MPLCc.

The input section INPc outputs the memory address or the like of process target data to the main pipeline control section MPLCc, the sub-pipeline control section SPLC, and the like.

The main pipeline control section MPLCc, based on information retained in the tag section TAGLLc or TAGL1c or the like, executes a process that is based on a process request (for example, the process request READ) received from the input section INPc. Details of the main pipeline control section MPLCc will be described in FIG. 26 and thereafter.

The sub-pipeline control section SPLC executes a process based on a process request (for example, the process request BISR) received from the input section INPc by referencing the second management information without referencing the first management information. The sub-pipeline control section SPLC may be operated in parallel with the main pipeline control section MPLCc.

The snoop lock section SNPc includes an information retaining section that retains the third management information for managing, for each first cache memory L1, data of a target of a process of evicting data from the first cache memory L1. Details of the snoop lock section SNPc will be described in FIG. 25.

FIG. 24 illustrates one example of the tag sections TAGLLc and TAGL1c and the usage information retaining section LRULL illustrated in FIG. 23. The tag section TAGLLc illustrated in FIG. 24 is one example in the case of the second cache memory LLc including 16 ways. The tag section TAGL1c illustrated in FIG. 24 is one example in the case of the first cache memory L1 including eight ways. For example, the size of the cache lines of the first cache memory L1 and the second cache memory LLc is 128 bytes.

The tag section TAGLLc is the same as or corresponds to the tag section TAGLLb illustrated in FIG. 3 except for retaining the first management information INFLLc instead of the first management information INFLLb illustrated in FIG. 5. The first management information INFLLc is the same as or corresponds to the first management information INFLLb illustrated in FIG. 5 except that the type code TCL1[1:0] is removed from the first management information INFLLb illustrated in FIG. 5.

The tag section TAGL1c is the same as or corresponds to the tag section TAGL1b illustrated in FIG. 3 except for retaining second management information INFL1c instead of the second management information INFL1b illustrated in FIG. 5. The second management information INFL1c is the same as or corresponds to the second management information INFL1b illustrated in FIG. 5 except for including the type code TCL1[1:0] instead of the validity VL1 illustrated in FIG. 3. That is, the type code TCL1[1:0], though being stored in the tag section TAGLLb in the example illustrated in FIG. 3, is stored in the tag section TAGL1c in the example illustrated in FIG. 24.

The usage information retaining section LRULL is the same as or corresponds to the usage information retaining section LRULL illustrated in FIG. 5. The configurations of the tag sections TAGLLc and TAGL1c and the usage information retaining section LRULL are not limited to the example illustrated in FIG. 24.

Figure 25:
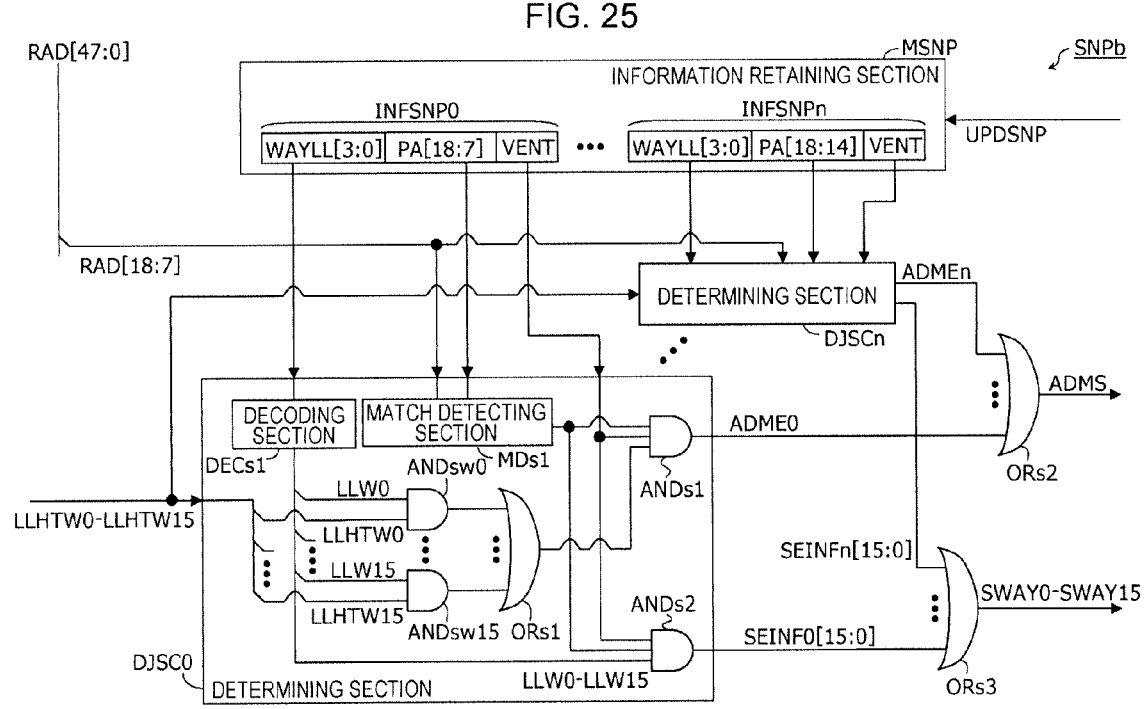
FIG. 25 is a diagram illustrating one example of a snoop lock section illustrated in FIG. 23.

FIG. 25 illustrates one example of the snoop lock section SNPc illustrated in FIG. 23. The snoop lock section SNPc includes determining sections DJSC (DJSC0 to DJSCn) instead of the determining sections DJSB (DJSB0 to DJSBn) illustrated in FIG. 6. In addition, the snoop lock section SNPc is configured by adding a logical sum circuit ORs3 to the snoop lock section SNPb illustrated in FIG. 6. Other configurations of the snoop lock section SNPc are the same as or correspond to the snoop lock section SNPb illustrated in FIG. 6. For example, the snoop lock section SNPc includes the information retaining section MSNP, the plurality of determining sections DJSC (DJSC0 to DJSCn), and the logical sum circuits ORs2 and ORs3.

The information retaining section MSNP and the logical sum circuit ORs2 are the same as or correspond to the information retaining section MSNP and the logical sum circuit ORs2 illustrated in FIG. 6. The plurality of determining sections DJSC is the same as or corresponds to each other. Thus, the determining section DJSC0 will be described.

The determining section DJSC0 is the same as or corresponds to the determining section DJSB0 illustrated in FIG. 6 except that a logical product circuit ANDs2 is added to the determining section DJSB illustrated in FIG. 6. For example, the determining section DJSC0 includes the decoding section DECs1, the match detecting section MDs1, the logical sum circuit ORs1, and the logical product circuits ANDs1, ANDs2, and ANDsw0 to ANDsw15.

The decoding section DECs1, the match detecting section MDs1, the logical sum circuit ORs1, and the logical product circuit ANDs1 are the same as or correspond to the decoding section DECs1, the match detecting section MDs1, the logical sum circuit ORs1, and the logical product circuit ANDs1 illustrated in FIG. 6. The logical product circuits ANDsw0 to ANDsw15 are the same as or correspond to the logical product circuits ANDsw0 to ANDsw15 illustrated in FIG. 6. The match detecting section MDs1 is one example of a match flag generating section that, for each third management information INFSNP, generates a match flag indicating truth in the case of the address RAD[18:7] matching the index address PA[18:7].

The logical product circuit ANDs2 receives the validity VENT in the third management information INFSNP0, the comparison result of the match detecting section MDs1, and the decoded information LLW0 to LLW15 decoded by the decoding section DECs1. The logical product circuit ANDs2 calculates the logical product of each of the decoded information LLW0 to LLW15, the validity VENT, and the comparison result of the match detecting section MDs1 and outputs a calculation result as information SINF0[15:0] to the logical sum circuit ORs3. For example, the information SINF0[0:0] indicates the result of the logical product of the decoded information LLW0, the validity VENT, and the comparison result of the match detecting section MDs1. For example, the information SINF0[15:15] indicates the result of the logical product of the decoded information LLW15, the validity VENT, and the comparison result of the match detecting section MDs1.

The logical sum circuit ORs3 receives the information SINF0[15:0] to SINFn[15:0] respectively from the determining sections DJSC0 to DJSCn and calculates the logical sum of the information SINF0[15:0] to SINFn[15:0] for each bit of the information SINF. The logical sum circuit ORs3 outputs the result of the logical sum of the information SINF0[15:0] to SINFn[15:0] for each bit to the main pipeline control section MPLCc as information SWAY0 to SWAY15. For example, the information SWAY0 indicates the result of the logical sum of the information SINF0[0:0] to SINFn[0:0]. The number appended to the reference sign of the information SWAY corresponds to the number appended to the reference sign of the way WAY of the second cache memory LLc.

The information SWAY indicates whether or not data of each way WAY specified by the address [18:7] of the requested data is registered in the snoop lock section SNPc. For example, in the case of data of the ways WAY0 and WAY15 of the plurality of pieces of data specified by the address [18:7] of the requested data being registered in the snoop lock section SNPc, the information SWAY0 and the information SWAY15 are set to the logical value "1". The configuration of the snoop lock section SNPc is not limited to the example illustrated in FIG. 25.

Figure 26:
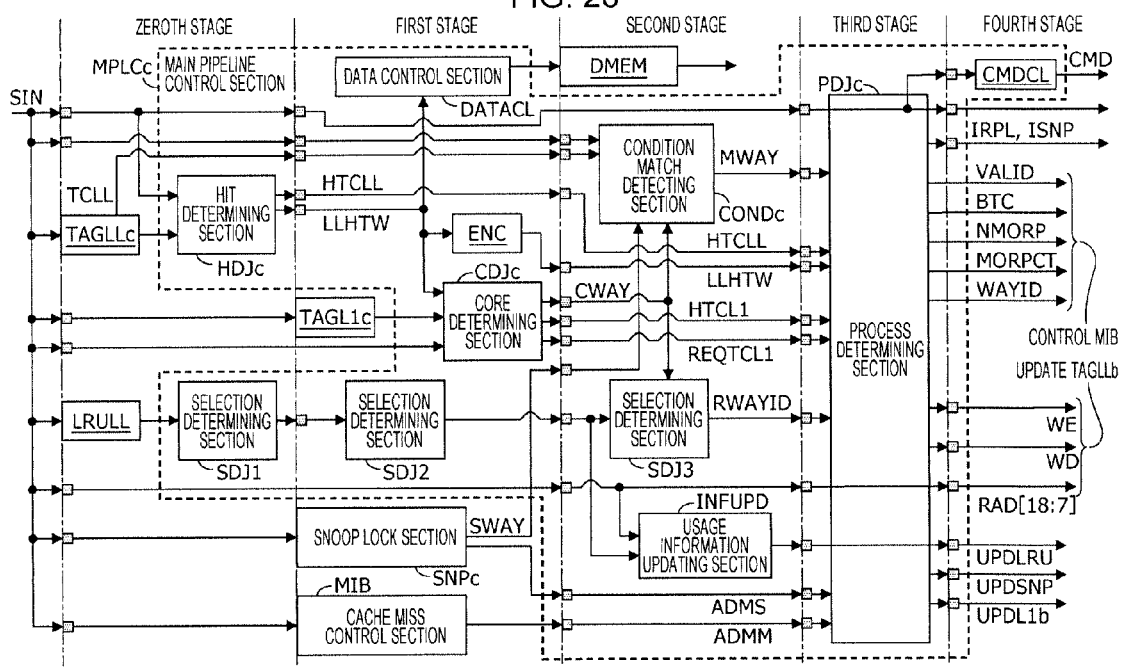
FIG. 26 is a diagram illustrating one example of a main pipeline control section illustrated in FIG. 23.

FIG. 26 illustrates one example of the main pipeline control section MPLCc illustrated in FIG. 23. A dot-dashed line and a halftone rectangle illustrated in FIG. 26 have the same meaning as the dot-dashed line and the halftone rectangle illustrated in FIG. 8. The main pipeline control section MPLCc includes a hit determining section HDJc, a core determining section CDJc, a condition match detecting section CONDc, and a process determining section PDJc instead of the hit determining section HDJb, the core determining section CDJb, the condition match detecting section CONDb, and the process determining section PDJb illustrated in FIG. 9. The main pipeline control section MPLCc includes selection determining sections SDJ1, SDJ2, and SDJ3 instead of the selection determining section SDJ illustrated in FIG. 9. Other configurations of the main pipeline control section MPLCc are the same as or correspond to the pipeline control section MPLC illustrated in FIG. 9.

For example, the main pipeline control section MPLCc includes the selection determining section SDJ, the hit determining section HDJc, the encoding section ENC, the core determining section CDJc, the data control section DATACL, the condition match detecting section CONDc, the usage information updating section INFUPD, and the process determining section PDJc. Furthermore, the main pipeline control section MPLCc includes the command control section CMDCL. In FIG. 26, differences from the pipeline control section PLC illustrated in FIG. 9 will be mainly described.

In the main pipeline control section MPLCc illustrated in FIG. 26, the way WAY that retains data retained in the first cache memory L1 is specified by the core determining section CCU in the first stage. Thus, the selection determining section SDJ (SDJ1, SDJ2, and SDJ3) executes a process of selecting the victim way WAY in the zeroth stage to the third stage. The selection determining section SW (SDJ1, SDJ2, and SDJ3) is the same as or corresponds to the selection determining section SDJ illustrated in FIG. 9 except for receiving, from the core determining section CDJc, the information CWAY that indicates the way WAY retaining data retained in the first cache memory L1.

The hit determining section HDJc, based on the first management information INFLLc retained in the tag section TAGLLc, determines whether or not a cache hit occurs in the second cache memory LLc. The hit determining section HDJc outputs the information HTCLL and LLHTW as a determination result. That is, the hit determining section HDJc is one example of a state determining section that, based on the first management information INFLLc, determines whether or not requested data requested with the read request READ from the first cache memory L1 is retained in the data retaining section DMEM. Details of the hit determining section HDJc will be described in FIG. 27.

The core determining section CDJc, based on the second management information INFL1c retained in the tag section TAGL1c, determines whether or not a cache hit occurs in any of the plurality of first cache memories L1. Details of the core determining section CDJc will be described in FIG. 28.

The condition match detecting section CONDc executes preliminary determination at the time of determining whether or not a stop condition for stopping issuing of the eviction request MORP is satisfied. The stop condition is the same as the stop condition described in FIG. 9. In the second cache memory LLc, the type code TCL1 includes the second management information INFL1c. Thus, when the eviction target data not being retained in the first cache memory L1 is detected, the information SWAY from the snoop lock section SNPc is used in addition to the information CWAY. Details of the condition match detecting section CONDc will be described in FIG. 29.

The process determining section PDJc is the same as or corresponds to the process determining section PDJb illustrated in FIG. 9 except for not executing a process that is based on a process request such as the process request BISR input into the sub-pipeline control section SPLC. For example, the process determining section PDJc includes the eviction request completion determining section CTDJ, the eviction execution determining section EXDJ, the instruction generating section IGEN, the second cache tag update determining section TGDJ, and the second cache tag data generating section TDGEN illustrated in FIG. 13. Furthermore, the process determining section PDJc includes the first cache control section CMCNTLb, the abort determining section ABDJ, the interlock control section INTCL, and the logical product circuits ANDp1, ANDp2, ANDp3, ANDp4, and ANDp5 illustrated in FIG. 13. The process determining section PDJc includes the logical sum circuit ORp1, the selecting sections SELp1, SELp2, and SELp3, and the decoding section DEC illustrated in FIG. 13.

The process determining section PDJc is one example of a processing section that, in the case of a cache miss occurring in the second cache memory LLc with no enough space in the storage area to register the requested data, evicts data from any of the plurality of storage areas without issuing the eviction request MORP.

Figure 27:
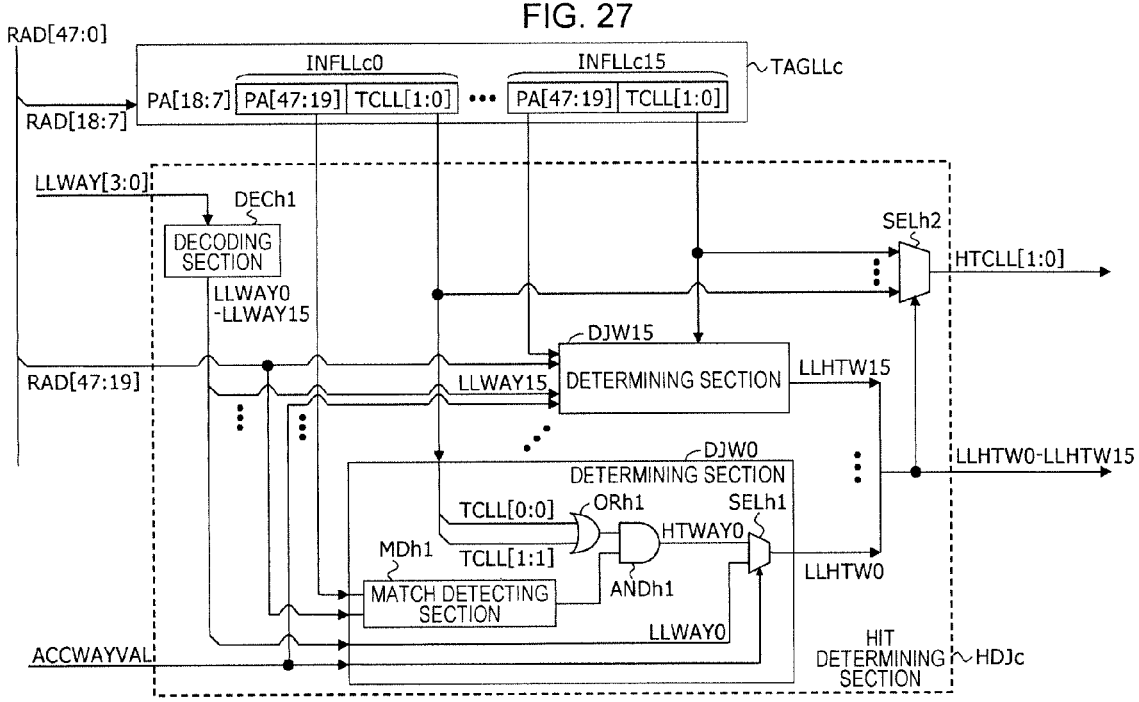
FIG. 27 is a diagram illustrating one example of a hit determining section illustrated in FIG. 26.

FIG. 27 illustrates one example of the hit determining section HDJc illustrated in FIG. 26. The hit determining section HDJc is the same as or corresponds to the hit determining section HDJb illustrated in FIG. 10 except that the selecting section SELh3 illustrated in FIG. 10 is removed from the hit determining section HDJb. For example, the hit determining section HDJc includes the decoding section DECh1, the plurality of determining sections DJW (DJW0 to DJW15), and the selecting section SELh2.

Figure 28:
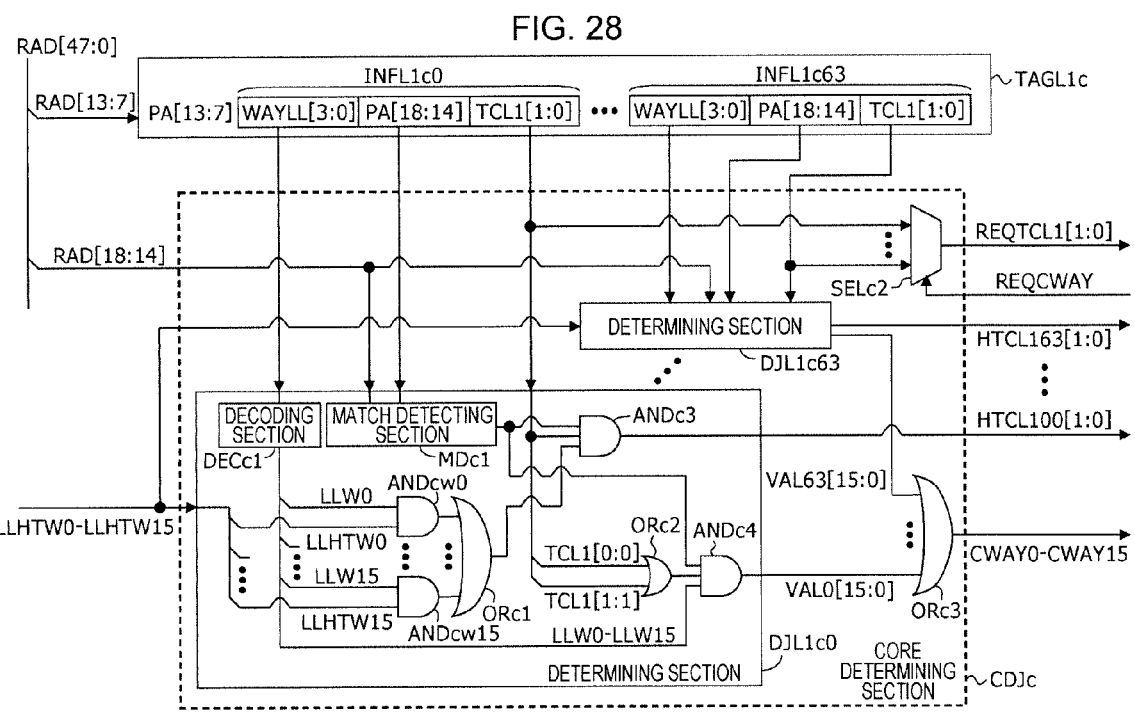
FIG. 28 is a diagram illustrating one example of a core determining section illustrated in FIG. 26.

FIG. 28 illustrates one example of the core determining section CDJc illustrated in FIG. 26. The core determining section CDJc includes a plurality of determining sections DJL1c (DJL1c0 to D3L1c63), a logical sum circuit ORc3, and a selecting section SELc2. The number appended to the reference sign of the determining section DJL1c corresponds to the number appended to the reference sign of the second management information INFL1c. The plurality of determining sections DJL1c is the same as or corresponds to each other. Thus, the determining section DJL1c0 will be described.

The determining section DJL1c0 includes a logical product circuit ANDc3 instead of the logical product circuits ANDc1 and ANDc2 illustrated in FIG. 11. In addition, the determining section DJL1c0 is configured by adding a logical sum circuit ORc2 and a logical product circuit ANDc4 to the determining section DJL1b0 illustrated in FIG. 11. Other configurations of the determining section DJL1c0 are the same as or correspond to the determining section DJL1b0 illustrated in FIG. 11.

For example, the determining section DJL1c0 includes the decoding section DECc1, the match detecting section MDc1, the logical sum circuits ORc1 and ORc2, and the logical product circuits ANDc3, ANDc4, and ANDcw0 to ANDcw15.

The decoding section DECc1, the match detecting section MDc1, and the logical sum circuit ORc1 are the same as or correspond to the decoding section DECc1, the match detecting section MDc1, and the logical sum circuit ORc1 illustrated in FIG. 11. The logical product circuits ANDcw0 to ANDcw15 are the same as or correspond to the logical product circuits ANDcw0 to ANDcw15 illustrated in FIG. 11.

The logical product circuit ANDc3 receives, from the tag section TAGL1c, the typecode TCL1[1:0] in the second management information INFL1c0 that corresponds to the index address PA[13:7] indicated by the address RAD[13:7]. The logical product circuit ANDc3 receives the comparison result of the match detecting section MDc1 and the calculation result of the logical sum circuit ORc1. The logical product circuit ANDc3 calculates the logical product of the comparison result of the match detecting section MDc1, the calculation result of the logical sum circuit ORc1, and the type code TCL1[1:0] received from the tag section TAGL1c and outputs a calculation result as the core data information HTCL100[1:0].

The logical sum circuit ORc2 receives, from the tag section TAGL1c, the type code TCL1[1:0] in the second management information INFL1c0 that corresponds to the index address PA[13:7] indicated by the address RAD[13:7]. The logical sum circuit ORc2 calculates the logical sum of the type code TCL1[0:0] and the type code TCL1[1:1] received from the tag section TAGL1c and outputs a calculation result to the logical product circuit ANDc4.

The logical product circuit ANDc4 receives the decoded information LLW0 to LLW15 decoded by the decoding section DECc1, the comparison result of the match detecting section MDc1, and the calculation result of the logical sum circuit ORc2. The logical product circuit ANDc4 calculates the logical product of each of the decoded information LLW0 to LLW15, the comparison result of the match detecting section MDc1, and the calculation result of the logical sum circuit ORc2 and outputs a calculation result as individual possession information VAL0[15:0] to the logical sum circuit ORc3. The 0th to 15th bits of the individual possession information VAL0[15:0] respectively correspond to the ways WAY0 to WAY15 of the second cache memory LLc.

For example, in the case of data retained in the zeroth way in the first cache memory L1 of the core CORE0 being retained in the way WAY0 of the second cache memory LLc, the individual possession information VAL0[0:0] is set to truth (for example, the logical value "1"). In the case of data retained in the zeroth way in the first cache memory L1 of the core CORE0 being retained in the way WAY15 of the second cache memory LLc, the individual possession information VAL0[15:15] is set to truth (for example, the logical value "1").

The logical sum circuit ORc3 calculates the logical sum of the individual possession information VAL0[15:0] to VAL63[15:0] received from the determining sections DJL1c0 to DJL1c63 for each bit and outputs a calculation result for each bit as 16 pieces of possession information CWAY0 to CWAY15. For example, the possession information CINF0 is the result of the logical sum of the individual possession information VAL0[0:0] to VAL63[0:0]. The possession information CINF15 is the result of the logical sum of the individual possession information VAL0[15:15] to VAL63[15:15]. The possession information CWAY (CWAY0 to CWAY15) is transferred to the condition match detecting section CONDc and the selection determining section SDJ3.

The selecting section SELc2 receives, as an input signal from the tag section TAGL1c, the type code TCL1[1:0] in the second management information INFL1c0 to INFL1c63 that corresponds to the index address PA[13:7] indicated by the address RAD[13:7]. The selecting section SELc2 receives the requested way information REQCWAY as a selection signal from the input section INPc. The selecting section SELc2, as the requested data information REQTCL1 [1:0], selects the type code TCL1[1:0], from the plurality of type codes TCL1[1:0] received from the tag section TAGL1c, that is specified by the requested way information REQCWAY. The requested data information REQTCL1[1: 0] selected by the selecting section SELc2 is transferred to the process determining section PDJc.

Figure 29:
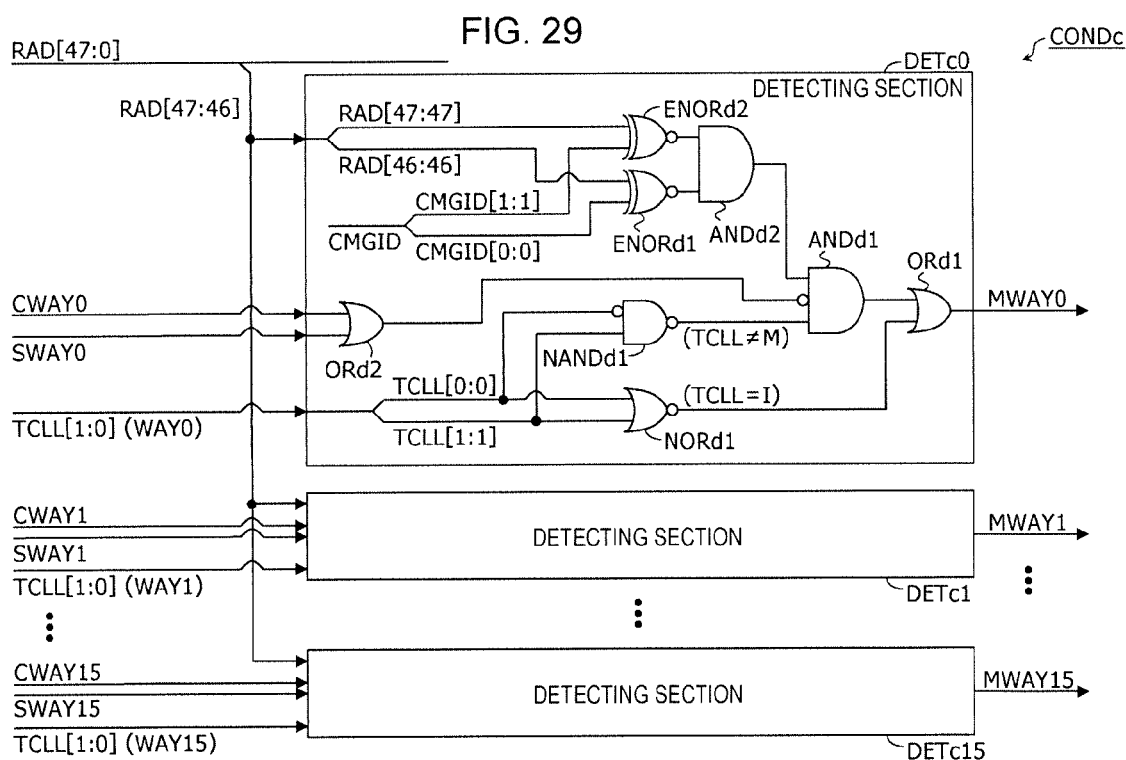
FIG. 29 is a diagram illustrating one example of a condition match detecting section illustrated in FIG. 26.

FIG. 29 illustrates one example of the condition match detecting section CONDc illustrated in FIG. 26. The condition match detecting section CONDc is the same as or corresponds to the condition match detecting section CONDb illustrated in FIG. 12 except for including a detecting section DETc (DETc0 to DETc15) instead of the detecting section DETb (DETb0 to DETb15) illustrated in FIG. 12. For example, the condition match detecting section CONDc includes a plurality of detecting sections DETc (DETc0 to DETc15). The number appended to the reference sign of the detecting section DETc corresponds to the number appended to the reference sign of the way WAY of the second cache memory LLc. The plurality of detecting sections DETc is the same as or corresponds to each other. Thus, the detecting section DETc0 will be described.

The detecting section DETc0 is the same as or corresponds to the detecting section DETb0 illustrated in FIG. 12 except that a logical sum circuit ORd2 is added to the detecting section DETb0 illustrated in FIG. 12. That is, the detecting section DETc0 detects whether or not the candidate of the eviction target data, of the data retained in the way WAY0, indicated by the index address PA[18:7] satisfies the stop condition.

For example, the detecting section DETc0 includes the negated exclusive logical sum circuits ENORd1 and ENORd2, the negated logical product circuit NANDd1, the logical product circuits ANDd1 and ANDd2, the negated logical sum circuit NORd1, and the logical sum circuits ORd1 and ORd2. The logical sum circuit ORd2 calculates the logical sum of the possession information CWAY0 and the information SWAY0 and outputs a calculation result to the logical product circuit ANDd1. In the case of the result of the logical sum of the possession information CWAY0 and the information SWAY0 being equal to the logical value "1", this indicates that the candidate of the eviction target data is retained in the first cache memory L1.

The negated exclusive logical sum circuits ENORd1 and ENORd2 and the logical product circuits ANDd1 and ANDd2 are the same as or correspond to the negated exclusive logical sum circuits ENORd1 and ENORd2 and the logical product circuits ANDd1 and ANDd2 illustrated in FIG. 12. The logical product circuit ANDd1 calculates the logical product of the calculation result of the logical product circuit ANDd2, an inverted signal of the calculation result of the logical sum circuit ORd2, and the calculation result of the negated logical product circuit NANDd1 and outputs a calculation result to the logical sum circuit ORd1. The negated logical sum circuit NORd1, the negated logical product circuit NANDd1, and the logical sum circuit ORd1 are the same as or correspond to the negated logical sum circuit NORd1, the negated logical product circuit NANDd1, and the logical sum circuit ORd1 illustrated in FIG. 12. For example, the logical sum circuit ORd1 calculates the logical sum of the calculation result of the logical product circuit ANDd1 and the calculation result of the negated logical sum circuit NORd1 and outputs a calculation result as the match way information MWAY0 to the process determining section PDJc.

Figure 30:
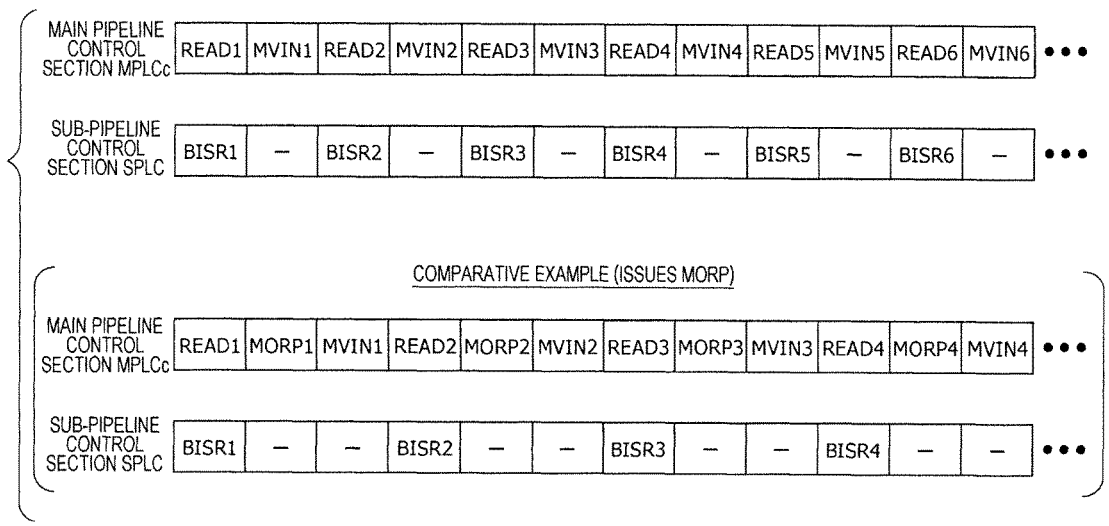
FIG. 30 is a diagram illustrating one example of a process request that is input into a pipeline control section illustrated in FIG. 23.

FIG. 30 illustrates one example of a process request that is input into the pipeline control sections MPLCc and SPLC illustrated in FIG. 23. A comparative example that does not have a control to stop the eviction request MORP is illustrated in parentheses in FIG. 23. The process request BISR is input into the sub-pipeline control section SPLC. In the case of all the eviction target data selected with the read request READ being clean, the two process requests READ and MVIN are input into the main pipeline control section MPLCc. Meanwhile, in the comparative example, the three process requests READ, MORP, and MVIN are input into the main pipeline control section MPLCc. Hereinafter, performance improvement that is expected by executing a process corresponding to a process based on the eviction request MORP in the read request READ will be illustrated.

In the case of all the eviction target data selected with the read request READ being clean, a series of flows based on a read process is executed six times in 12 cycles in the second cache memory LLc. Meanwhile, in the comparative example, a series of flows based on the read process is executed four times in 12 cycles. In this case, the second cache memory LLb is considered to have an expected improvement of approximately 50% compared with the comparative example.

In the case of assuming that the probability of the eviction target data being dirty is equal to 10%, 90% of the eviction target data that is selected with the read request READ is clean. In the case of the eviction target data being dirty, the main pipeline control section MPLCc executes a process based on four process requests READ, MORP, MVIN, and WRBK. The process request WRBK is a request for a process of writing the eviction target data back.

In this case, a series of flows based on 10 read processes is divided into one flow in the case of the eviction target data being dirty and nine flows in the case of the eviction target data being clean. Therefore, in the case of executing a series of flows based on 10 read processes, 22 (=4×1+2×9) process requests are input into the second cache memory LLc. Meanwhile, in the comparative example, 31 (=4×1+3×9) process requests are input. In this case, the second cache memory LLc is considered to have an expected improvement of approximately 29% compared with the comparative example.

Figure 31:
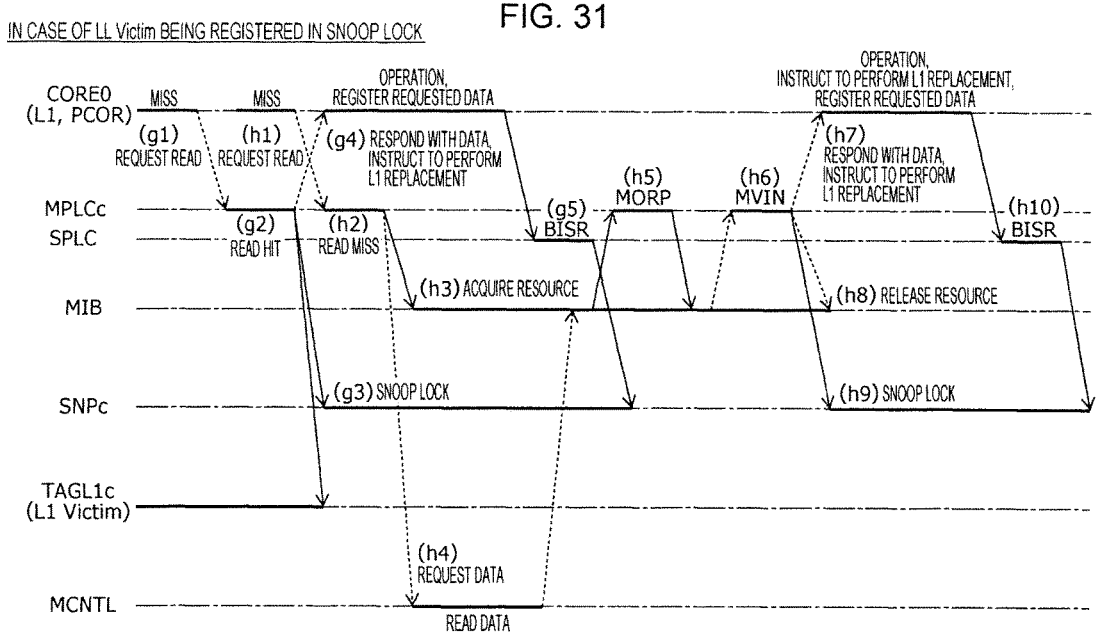
FIG. 31 is a diagram illustrating one example of operation of the operation processing device in the case of the eviction target data not satisfying the stop condition.

FIG. 31 illustrates one example of operation of the operation processing device PUc in the case of the eviction target data not satisfying the stop condition. A solid line arrow, a dotted line arrow, and "L1 Victim" illustrated in FIG. 31 have the same meaning as FIG. 17. The states of the requested data and the eviction target data (conditions) in FIG. 31 are the same as those in FIG. 17. For example, the eviction target data is registered in the snoop lock section SNPc. In FIG. 31, the differences between the operation in FIG. 17 and the operation in FIG. 31 in the case of replacing the pipeline control section PLC in FIG. 17 with the main pipeline control section MPLCc will be mainly described.

In the operation illustrated in FIG. 31, the process request BISR is input into the sub-pipeline control section SPLC. Retaining information that indicates that "L1 Victim" is retained in the first cache memory L1 is retained in the tag section TAGL1c until the main pipeline control section MPLCc requests the first cache memory L1 to invalidate "L1 Victim". After the main pipeline control section MPLCc requests the first cache memory L1 to invalidate "L1 Victim", the retaining information is retained in the snoop lock section SNPc until the process request BISR is executed in the sub-pipeline control section SPLC. Thus, the second cache memory LLc illustrated in FIG. 23 detects the eviction target data not being retained in the first cache memory L1 by using information retained in the snoop lock section SNPc.

For example, the main pipeline control section MPLCc overwrites information of new data of a response to the read request READ with the second management information INFL1c that includes the second management information INFL1c of "L1 Victim" retained in the tag section TAGL1c. The main pipeline control section MPLCc registers information of "L1 Victim" in the snoop lock section SNPc ((g3) in FIG. 31). Snoop lock is released by completion of the L1 replacement process by the first cache memory L1 and execution of the process request BISR by the sub-pipeline control section SPLC ((g5) in FIG. 31).

Meanwhile, in the operation illustrated in FIG. 17, the retaining information is retained in both of the tag section TAGL1b and the snoop lock section SNPb until the process request BISR is executed in the pipeline control section PLC. That is, information retained in the snoop lock section SNPb is included in information acquired from the tag section TAGL1b. Thus, the second cache memory LLb illustrated in FIG. 3 may detect the eviction target data not being retained in the first cache memory L1 without referencing information of the snoop lock section SNPb.

Operation of the operation processing device PUc that corresponds to the operation illustrated in FIG. 14, FIG. 15, and FIG. 16 is described by replacing the pipeline control section PLC with the main pipeline control section MPLCc and the input destination of the process request BISR with the sub-pipeline control section SPLC.

Figure 32:
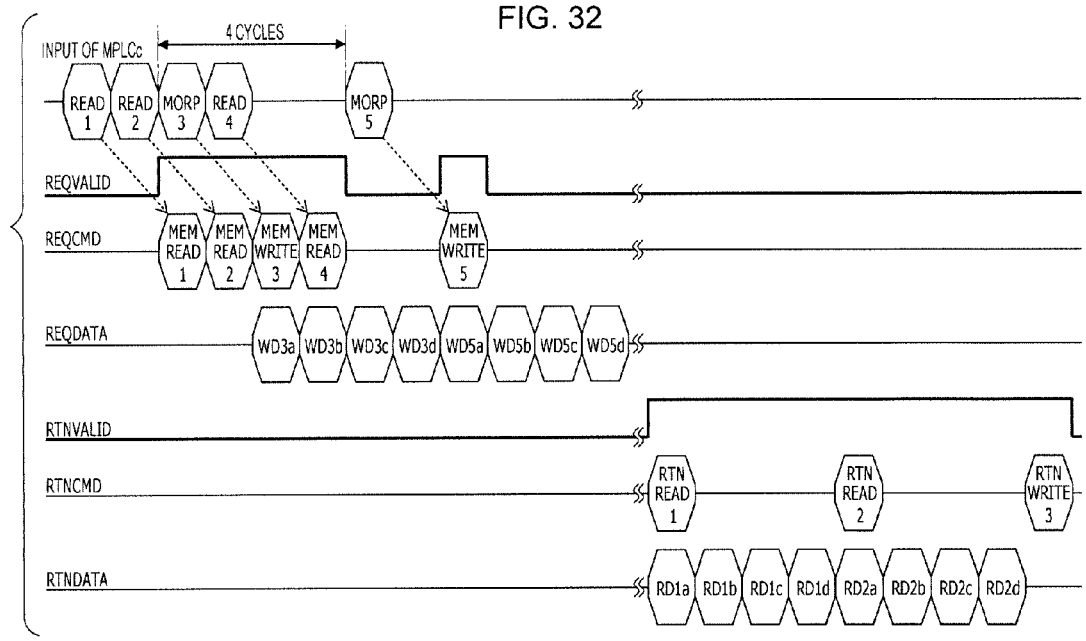
FIG. 32 is a diagram illustrating one example of data access to the second cache memory illustrated in FIG. 22.

FIG. 32 illustrates one example of data access to the second cache memory LLc illustrated in FIG. 22. The main pipeline control section MPLCc requests data from the memory control section MCNTL or the like in the case of input of a read request READ1 with a cache miss occurring in the second cache memory LLc. In this case, the main pipeline control section MPLCc sends a signal indicating that the request is valid to the memory control section MCNTL or the like through a signal line REQVALID after a fixed cycle from the input of the read request READ1. Furthermore, the main pipeline control section MPLCc sends a signal indicating a requested content, a requested address, or the like to the memory control section MCNTL or the like by using a signal line REQCMD. The requested content is, for example, a request MEMREAD1 for requesting a read of data.

A read request READ2 is input into the main pipeline control section MPLCc in succession after the read request READ1, and a request MEMREAD2 is also sent in succession from the main pipeline control section MPLCc to the memory control section MCNTL or the like.

In the case of an eviction request MORP3 being input into the main pipeline control section MPLCc subsequently after the read request READ2, a request MEMWRITE for requesting the memory control section MCNTL or the like to write data WD3 may be executed. The data WD3 is transferred after being divided into four pieces of data WD3a, WD3b, WD3c, and WD3d as described in FIG. 8. In this case, a data bus REQDATA occupies four cycles. Thus, a process request that may execute the request MEMWRITE after the eviction request MORP3 is controlled to be input after at least four cycles from input of the eviction request MORP3 into the main pipeline control section MPLCc.

A process request that does not execute write to the main storage device MEM does not cause contentions in the data bus REQDATA even if being input into the main pipeline control section MPLCc. Thus, for example, a read request READ4 is input into the main pipeline control section MPLCc subsequently after the eviction request MORP3, and the request MEMREAD2 is sent to the memory control section MCNTL or the like after a fixed cycle.

A response from the memory control section MCNTL to the main pipeline control section MPLCc, for example, is executed by using signal lines RTNVALID, RTNCMD, and RTNDATA that are different from the signal lines REQVALID, REQCMD, and REQDATA.

For example, the memory control section MCNTL responds with a response RTNREAD1 and data RD1 to the main pipeline control section MPLCc after a certain amount of time from reception of the request MEMREAD1 from the main pipeline control section MPLCc. The data RD1, for example, is divided into four pieces of data RD1a, RD1b, RD1c, and RD1d and is sent in four cycles in the same manner as the data WD3.

A response to the request MEMREAD2 is executed in the same manner as the response to the request MEMREAD1. There is no data to respond in a response to a request MEMWRITE3. Thus, the memory control section MCNTL responds with a response RTNWRITE3 to the main pipeline control section MPLCc by using the signal line RTNCMD.

The embodiment illustrated in FIG. 22 to FIG. 32 may achieve the same effect as the embodiment illustrated in FIG. 2 to FIG. 21. For example, the main pipeline control section MPLCc, in the case of the eviction target data satisfying the stop condition, executes a process of evicting data from any of the plurality of ways WAY without issuing the eviction request MORP. Accordingly, the throughput of the pipeline control section PLC at the time of executing a series of processes for one read request READ from the first cache memory L1 may be improved. Consequently, the throughput of the second cache memory LLc may be improved.

Furthermore, the second cache memory LLc includes the main pipeline control section MPLCc and the sub-pipeline control section SPLC. The main pipeline control section MPLCc may be operated in parallel with the sub-pipeline control section SPLC that executes the process request BISR or the like. Accordingly, for example, the throughput of the second cache memory LLc may be improved compared with a cache memory that may not execute the process request BISR and another process request in parallel.

Figure 33:
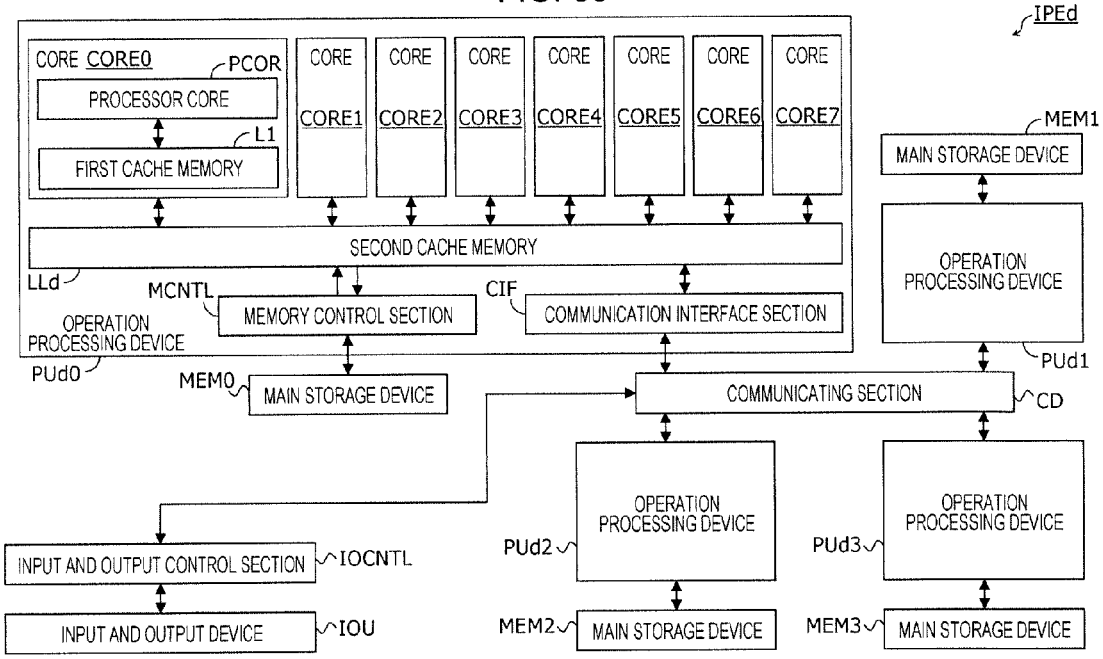
FIG. 33 is a diagram illustrating another embodiment of an operation processing device, an information processing apparatus, and a control method for the operation processing device.

FIG. 33 illustrates another embodiment of an operation processing device, an information processing apparatus, and a control method for the operation processing device. The same or corresponding elements as the elements described in FIG. 1 to FIG. 31 will be designated by the same or corresponding reference signs and will not be described in detail. An information processing apparatus IPEd illustrated in FIG. 33 is a computer apparatus such as a server. The information processing apparatus IPEd is the same as or corresponds to the information processing apparatus IPEc illustrated in FIG. 22 except for including an operation processing device PUd instead of the operation processing device PUc illustrated in FIG. 22. For example, the information processing apparatus IPEd includes a plurality of operation processing devices PUd (PUd0, PUd1, PUd2, and PUd3), the plurality of main storage devices MEM (MEM0, MEM1, MEM2, and MEM3), the communicating section CD, the input and output control section IOCNTL, and the input and output device IOU.

The operation processing device PUd is the same as or corresponds to the operation processing device PUc illustrated in FIG. 22 except for including a second cache memory LLd instead of the second cache memory LLc illustrated in FIG. 22. For example, the operation processing device PUd includes the plurality of cores CORE (CORE0, CORE1, CORE7), the second cache memory LLd, the memory control section MCNTL, and the communication interface section CIF.

The configurations of the operation processing device PUd and the information processing apparatus IPEd are not limited to the example illustrated in FIG. 33. The number of the operation processing devices PUd and the number of main storage devices MEM are not limited to the example illustrated in FIG. 33.

Figure 34:
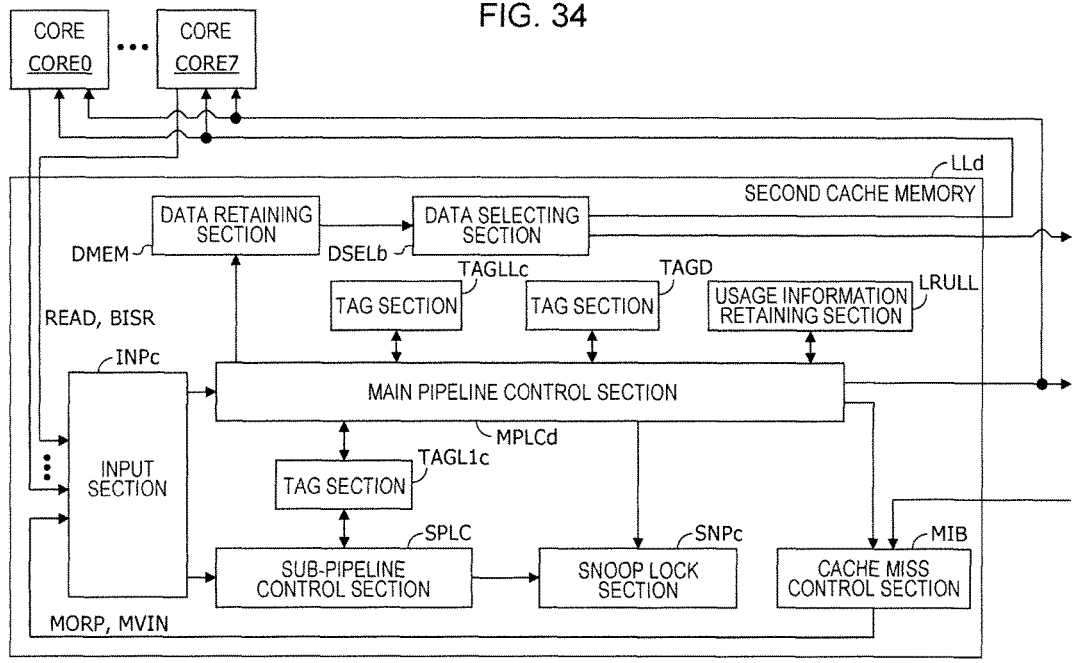
FIG. 34 is a diagram illustrating one example of a second cache memory illustrated in FIG. 33.

FIG. 34 illustrates one example of the second cache memory LLd illustrated in FIG. 33. The second cache memory LLd is the same as or corresponds to the second cache memory LLc illustrated in FIG. 23 except for including a main pipeline control section MPLCd instead of the main pipeline control section MPLCc illustrated in FIG. 23.

For example, the second cache memory LLd includes the input section INPc, the main pipeline control section MPLCd, and the sub-pipeline control section SPLC. Furthermore, the second cache memory LLd includes the data retaining section DMEM, the data selecting section DSELb, the tag sections TAGLLc, TAGL1c, and TAGD, the usage information retaining section LRULL, the snoop lock section SNPc, and the cache miss control section MIB.

The second cache memory LLd illustrated in FIG. 34 has a different second condition of a stop condition for stopping issuing of the eviction request MORP from the second cache memory LLc illustrated in FIG. 23. For example, the condition that the eviction target data is not retained in the first cache memory L1 is removed from the second condition described in FIG. 9. A condition that a process of evicting the eviction target data from any of the plurality of first cache memories L1 is not being executed is added to the second condition described in FIG. 9. That is, the second condition is that the eviction target data is in "Local=Host", that the state of the eviction target data is equal to a state other than "Modified", and that a process of evicting the eviction target data from any of the plurality of first cache memories L1 is not being executed. A first condition is the same as the first condition described in FIG. 9.

Thus, the main pipeline control section MPLCd is different from the main pipeline control section MPLCc illustrated in FIG. 23. Details of the main pipeline control section MPLCd will be described in FIG. 35 and thereafter. A block of the input section INPc or the like other than the main pipeline control section MPLCd is the same as or corresponds to the corresponding block in the second cache memory LLc illustrated in FIG. 23.

The configuration of the second cache memory LLd is not limited to the example illustrated in FIG. 34. For example, in the information processing apparatus IPEd that is configured of one CMG, the second cache memory LLd may determine the stop condition to be satisfied in the case of the state of the eviction target data being equal to a state not desiring write-back to the main storage device MEM (for example, a state other than "Modified").

Figure 35:
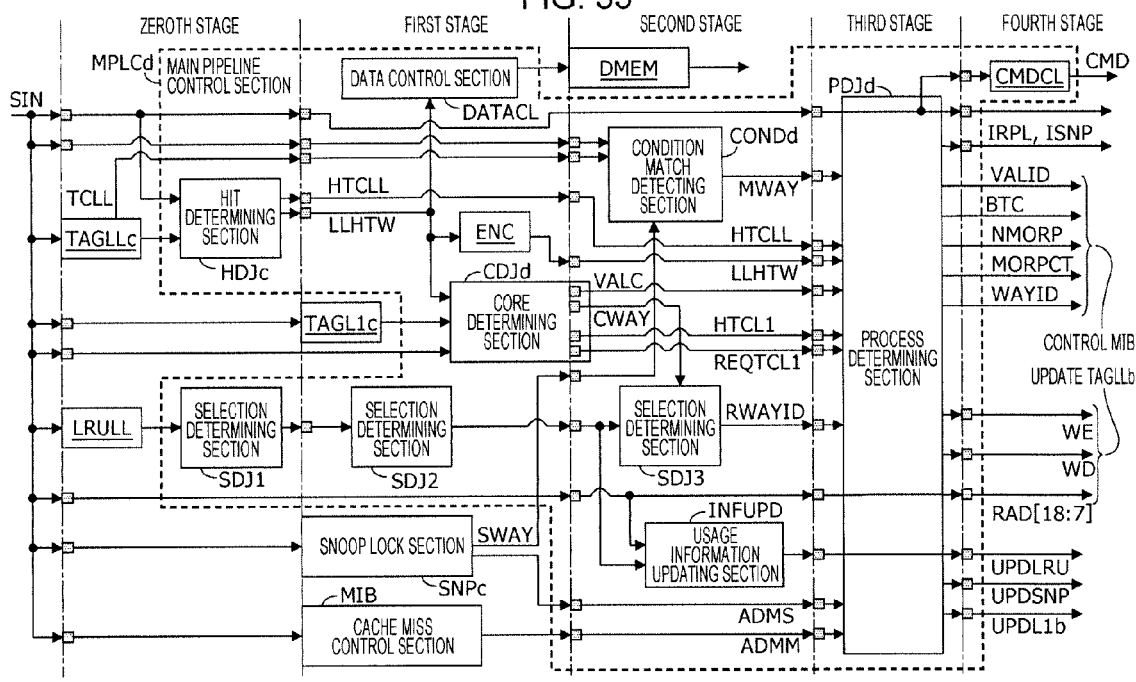
FIG. 35 is a diagram illustrating one example of a main pipeline control section illustrated in FIG. 34.

FIG. 35 illustrates one example of the main pipeline control section MPLCd illustrated in FIG. 34. A dot-dashed line and a halftone rectangle illustrated in FIG. 35 have the same meaning as the dot-dashed line and the halftone rectangle illustrated in FIG. 8.

The main pipeline control section MPLCd, even in the case of the first cache memory L1 retaining the eviction target data, executes, in the read request READ, a process that corresponds to a process based on the eviction request MORP. In this case, the main pipeline control section MPLCd has a function of sending an invalidation instruction for invalidating the eviction target data to the first cache memory L1 in the read request READ and updating the tag section TAGL1c with a response to the invalidation instruction. Furthermore, the main pipeline control section MPLCd has a function of responding with the eviction target data to the memory control section MCNTL or another CMG.

For example, the main pipeline control section MPLCd includes a core determining section CDJd, a condition match detecting section CONDd, and a process determining section PDJd instead of the core determining section CDJc, the condition match detecting section CONDc, and the process determining section PDJc illustrated in FIG. 26. Other configurations of the main pipeline control section MPLCd are the same as or correspond to the main pipeline control section MPLCc illustrated in FIG. 26.

For example, the main pipeline control section MPLCd includes the selection determining section SDJ, the hit determining section HDJc, the encoding section ENC, the core determining section CDJd, the data control section DATACL, the condition match detecting section CONDd, the usage information updating section INFUPD, and the process determining section PDJd. Furthermore, the main pipeline control section MPLCd includes the command control section CMDCL. In the main pipeline control section MPLCd, the core determining section CDJd, the condition match detecting section CONDd, and the process determining section PDJd are different from the core determining section CDJc, the condition match detecting section CONDc, and the process determining section PDJc illustrated in FIG. 26.

The core determining section CDJd, in order to send an invalidation instruction to the first cache memory L1 in the read request READ, generates core possession information VALC for specifying the core CORE that possesses the eviction target data. The core possession information VALC is transmitted to the process determining section PDJd that is operated in the third stage. Details of the core determining section CDJd will be described in FIG. 36.

The condition match detecting section CONDc detects the candidate of the eviction target data not being registered in the snoop lock section SNPc instead of detecting the candidate of the eviction target data not being retained in the first cache memory L1. For example, in the case of the eviction target data being registered in the snoop lock section SNPc, the main pipeline control section MPLCd stops the read request READ, subsequently executes the eviction request MORP, and re-executes the read request READ after release of snoop lock. In this case, the throughput of a pipeline process is decreased. Thus, the condition that the eviction target data is not registered in the snoop lock section SNPc is included in the stop condition so that issuing of the eviction request MORP is not stopped in the case of the eviction target data being registered in the snoop lock section SNPc. Details of the condition match detecting section CONDd will be described in FIG. 37.

The process determining section PDJd, for example, in the case of the eviction target data satisfying the stop condition with the first cache memory L1 retaining the eviction target data, notifies an instruction for the L1 replacement process to the first cache memory L1 that retains the eviction target data. The process determining section PDJd, after receiving response information that indicates completion of the L1 replacement process, executes a process of evicting the eviction target data from the data retaining section DMEM without issuing the eviction request MORP. Details of the process determining section PDJd will be described in FIG. 38.

Figure 36:
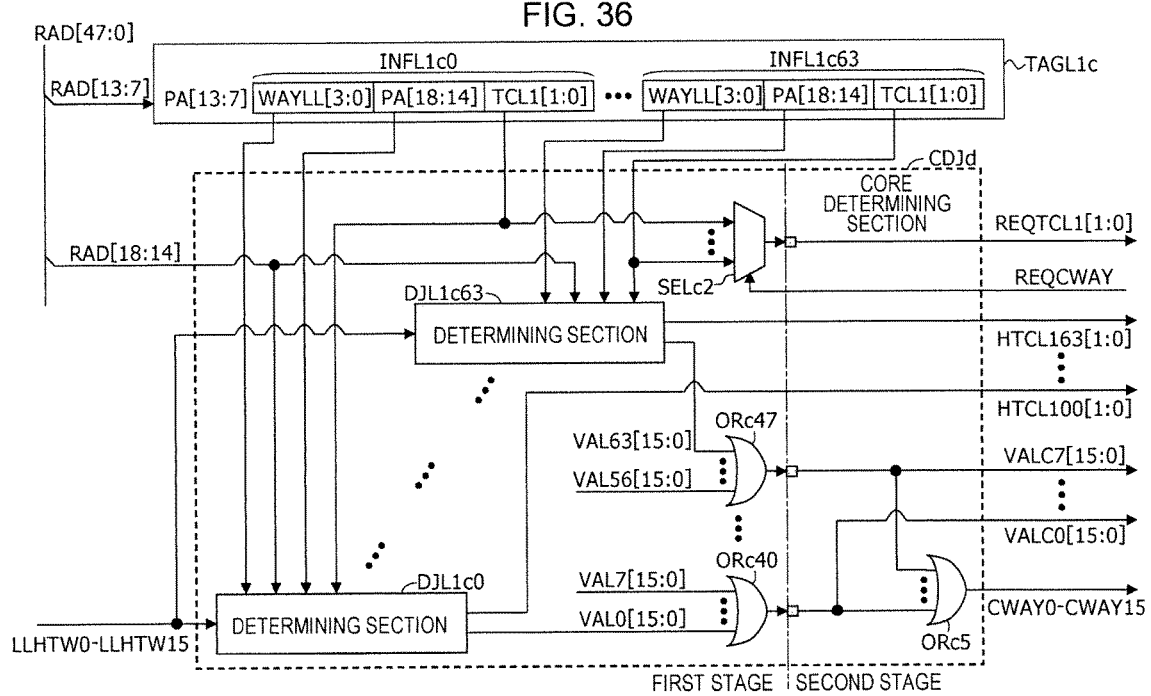
FIG. 36 is a diagram illustrating one example of a core determining section illustrated in FIG. 35.

FIG. 36 illustrates one example of the core determining section CDJd illustrated in FIG. 35. A dot-dashed line and a halftone rectangle illustrated in FIG. 36 have the same meaning as the dot-dashed line and the halftone rectangle illustrated in FIG. 8. The core determining section CDJd includes logical sum circuits ORc4 (ORc40 to ORc47) and ORc5 instead of the logical sum circuit ORc3 illustrated in FIG. 28. Other configurations of the core determining section CDJd are the same as or correspond to the core determining section CDJc illustrated in FIG. 28.

For example, the core determining section CDJd includes the plurality of determining sections DJL1c (DJL1c0 to DJL1c63), the logical sum circuits ORc40 to ORc47 and ORc5, and the selecting section SELc2. The determining section DJL1c and the selecting section SELc2 are the same as or correspond to the determining section DJL1c and the selecting section SELc2 illustrated in FIG. 28.

The number in first digit appended to the reference sign of the logical sum circuit ORc4 (ORc40 to ORc47) corresponds to the number appended to the reference sign of the core CORE. Each logical sum circuit ORc4 (ORc40 to ORc47) receives the individual possession information VAL of the corresponding core CORE, calculates the logical sum of the individual possession information VAL of each way of the core CORE for each bit, and outputs a calculation result as the core information VALC. The core information VALC is transferred to the logical sum circuit ORc5 and the process determining section PDJd.

A number appended to the reference sign of the core possession information VALC corresponds to the number appended to the reference sign of the core CORE. The 0th to 15th bits of the core possession information VALC respectively correspond to the ways WAY0 to WAY15 of the second cache memory LLd. For example, in the case of data retained in the first cache memory L1 of the core CORE0 being retained in the way WAY0 of the second cache memory LLd, the core possession information VALC0[0:0] is set to truth (for example, the logical value "1").

For example, the logical sum circuit ORc40 receives the individual possession information VAL0[15:0] to VAL7[15:0] corresponding to each way of the core CORE0 respectively from the determining sections DJL1c0 to DJL1c7. The logical sum circuit ORc40 calculates the logical sum of the individual possession information VAL0[15:0] to VAL7[15:0] for each bit and outputs a calculation result as the core possession information VALC0[15:0] to the logical sum circuit ORc5 and the process determining section PDJd. The core possession information VALC0[0:0] is the result of the logical sum of the individual possession information VAL0[0:0] to VAL7[0:0]. The core possession information VALC0[15:15] is the result of the logical sum of the individual possession information VAL0[15:15] to VAL7[15:15].

For example, the logical sum circuit ORc47 receives the individual possession information VAL56[15:0] to VAL63[15:0] corresponding to each way of the core CORE7 respectively from the determining sections DJL1c56 to DJL1c63. The logical sum circuit ORc47 calculates the logical sum of the individual possession information VAL56[15:0] to VAL63[15:0] for each bit and outputs a calculation result as the core possession information VALC7[15:0] to the logical sum circuit ORc5 and the process determining section PDJd. The core possession information VALC7[0:0] is the result of the logical sum of the individual possession information VAL56[0:0] to VAL63[0:0]. The core possession information VALC7[15:15] is the result of the logical sum of the individual possession information VAL56[15:15] to VAL63[15:15].

The logical sum circuit ORc5 calculates the logical sum of the core possession information VALC0[15:0] to VALC7[15:0] received from the logical sum circuits ORc40 to ORc47 for each bit and outputs a calculation result for each bit as the 16 pieces of possession information CWAY0 to CWAY15. For example, the possession information CINF0 is the result of the logical sum of the core possession information VALC0[0:0] to VALC7[0:0]. The possession information CINF15 is the result of the logical sum of the core possession information VALC0[15:15] to VALC7[15:15]. The possession information CWAY (CWAY0 to CWAY15) is transferred to the selection determining section SDJ3.

In the example illustrated in FIG. 36, the logical sum circuit ORc4 (ORc40 to ORc47) executes a process in the first stage of a pipeline process, and the logical sum circuit ORc5 executes a process in the second stage thereof. The logical sum circuit ORc5 may execute a process in the first stage.

Accordingly, the logical sum circuits ORc40 to ORc47 and the like for specifying the core CORE that retains the eviction target data are added in the second cache memory LLd compared with the second cache memory LLc illustrated in FIG. 23. Thus, circuit size may be increased. In other words, the second cache memory LLc illustrated in FIG. 23 may improve the throughput of a pipeline process with reduction of increase in circuit size.

Figure 37:
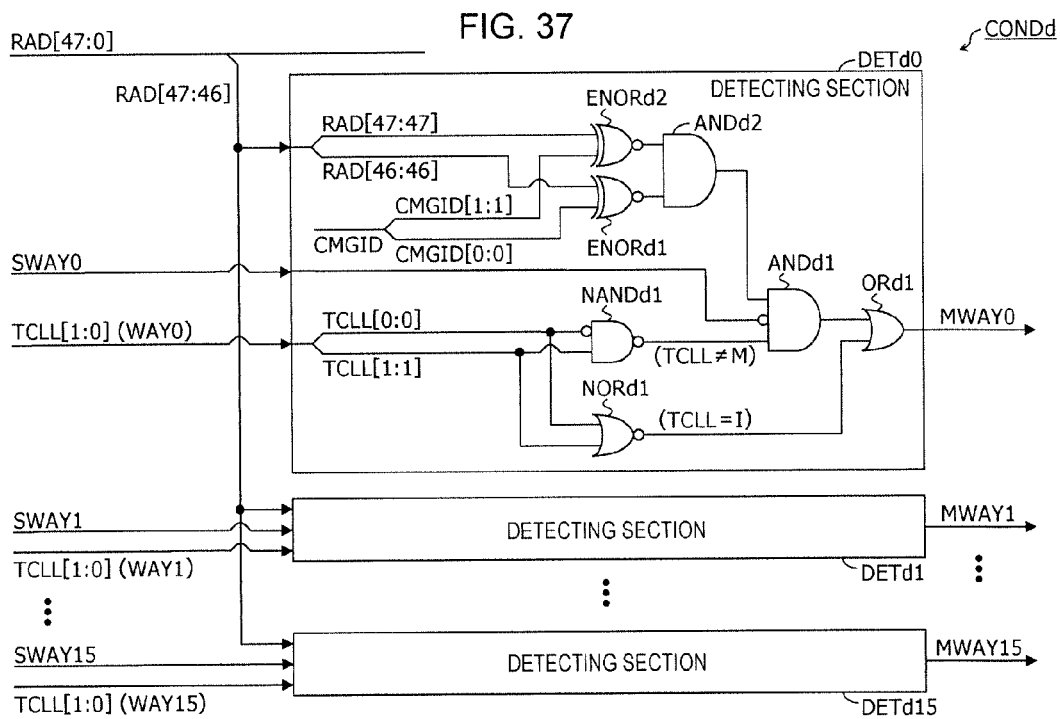
FIG. 37 is a diagram illustrating one example of a condition match detecting section illustrated in FIG. 35.

FIG. 37 illustrates one example of the condition match detecting section CONDd illustrated in FIG. 35. The condition match detecting section CONDd is the same as or corresponds to the condition match detecting section CONDc illustrated in FIG. 29 except for including a detecting section DETd (DETd0 to DETd15) instead of the detecting section DETc (DETc0 to DETc15) illustrated in FIG. 29. For example, the condition match detecting section CONDd includes a plurality of detecting sections DETd (DETd0 to DETd15). The number appended to the reference sign of the detecting section DETd corresponds to the number appended to the reference sign of the way WAY of the second cache memory LLd. The plurality of detecting sections DETd is the same as or corresponds to each other. Thus, the detecting section DETd0 will be described.

The detecting section DETd0 is the same as or corresponds to the detecting section DETc0 illustrated in FIG. 29 except that the logical sum circuit ORd2 illustrated in FIG. 29 is removed from the detecting section DETc0. That is, the detecting section DETd0 detects whether or not the candidate of the eviction target data, of the data retained in the way WAY0, indicated by the index address PA[18:7] satisfies the stop condition.

For example, the detecting section DETd0 includes the negated exclusive logical sum circuits ENORd1 and ENORd2, the negated logical product circuit NANDd1, the logical product circuits ANDd1 and ANDd2, the negated logical sum circuit NORd1, and the logical sum circuit ORd1.

The negated exclusive logical sum circuits ENORd1 and ENORd2 and the logical product circuits ANDd1 and ANDd2 are the same as or correspond to the negated exclusive logical sum circuits ENORd1 and ENORd2 and the logical product circuits ANDd1 and ANDd2 illustrated in FIG. 29. The logical product circuit ANDd1 calculates the logical product of the calculation result of the logical product circuit ANDd2, an inverted signal of the information SWAY0, and the calculation result of the negated logical product circuit NANDd1 and outputs a calculation result to the logical sum circuit ORd1. The negated logical sum circuit NORd1, the negated logical product circuit NANDd1, and the logical sum circuit ORd1 are the same as or correspond to the negated logical sum circuit NORd1, the negated logical product circuit NANDd1, and the logical sum circuit ORd1 illustrated in FIG. 29.

Figure 38:
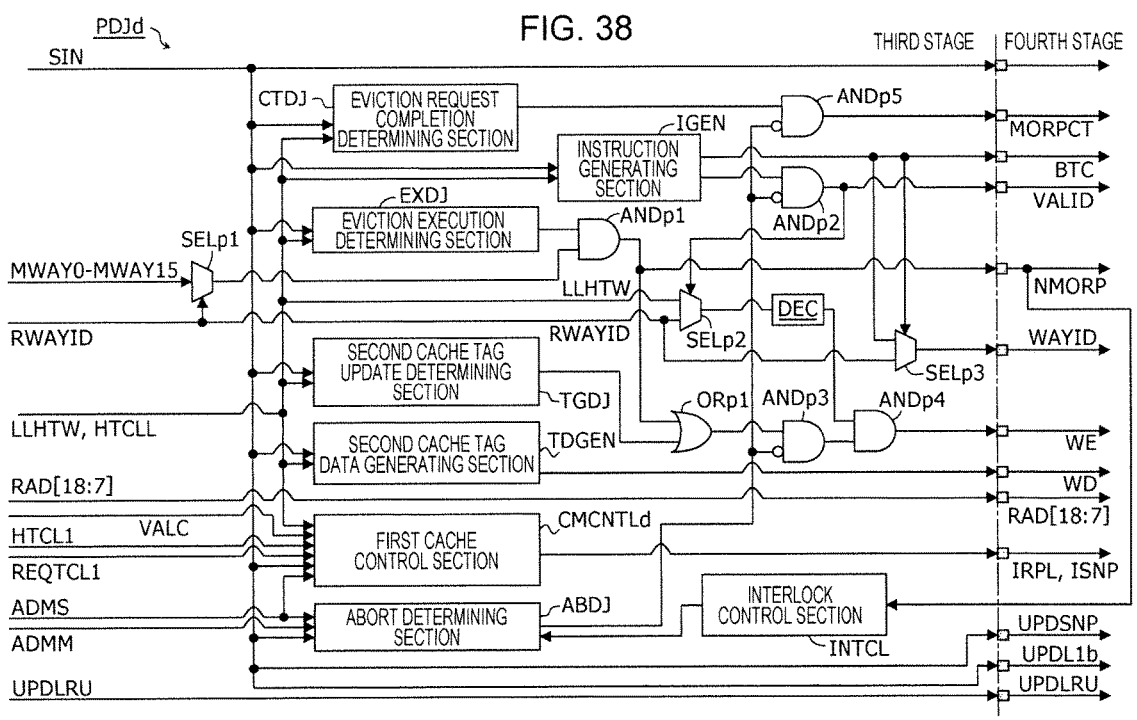
FIG. 38 is a diagram illustrating one example of a process determining section illustrated in FIG. 35.

FIG. 38 illustrates one example of the process determining section PDJd illustrated in FIG. 35. A dot-dashed line and a halftone rectangle illustrated in FIG. 38 have the same meaning as the dot-dashed line and the halftone rectangle illustrated in FIG. 8. The process determining section PDJd includes a first cache control section CMCNTLd instead of the first cache control section CMCNTLb illustrated in FIG. 13. Other configurations of the process determining section PDJd are the same as or correspond to the process determining section PDJb illustrated in FIG. 13.

For example, the process determining section PDJd includes the eviction request completion determining section CTDJ, the eviction execution determining section EXDJ, the instruction generating section IGEN, the second cache tag update determining section TGDJ, the second cache tag data generating section TDGEN, and the first cache control section CMCNTLd. Furthermore, the process determining section PDJd includes the abort determining section ABDJ, the interlock control section INTCL, the logical product circuits ANDp1, ANDp2, ANDp3, ANDp4, and ANDp5, the logical sum circuit ORp1, the selecting sections SELp1, SELp2, and SELp3, and the decoding section DEC. In FIG. 38, the first cache control section CMCNTLd that is the difference from the process determining section PDJb illustrated in FIG. 13 will be described.

The first cache control section CMCNTLd, in the case of instructing the first cache memory L1 to snoop, determines the first cache memory L1 of the destination of a snoop instruction INSP based on the core possession information VALC. The first cache control section CMCNTLd sends the snoop instruction INSP to the core CORE that retains the eviction target data.

The embodiment illustrated in FIG. 33 to FIG. 38 may achieve the same effect as the embodiment illustrated in FIG. 1. For example, the main pipeline control section MPLCd, in the case of the eviction target data satisfying the stop condition (a first condition or a second condition below), executes a process of evicting data from any of the plurality of ways WAY without issuing the eviction request MORP.

The first condition is that the state of the eviction target data is equal to "Invalid". The second condition is that all of conditions 2a, 2b, and 2c below are satisfied. The condition 2a is that the eviction target data is data that is stored at a local memory address in the ccNUMA configuration. The condition 2b is that the state of the eviction target data is equal to a state other than "Modified". The condition 2c is that a process of evicting the eviction target data from any of the plurality of first cache memories L1 is not being executed.

In the case of the stop condition being satisfied, a process that corresponds to a process based on the eviction request MORP may be executed without issuing the eviction request MORP. Thus, the number of process requests input into the pipeline control section PLC may be decreased compared with the case of issuing the eviction request MORP. Accordingly, the throughput of the pipeline control section PLC at the time of executing a series of processes for one read request READ from the first cache memory L1 may be improved. Consequently, the throughput of the second cache memory LLd may be improved.

Figure 39:
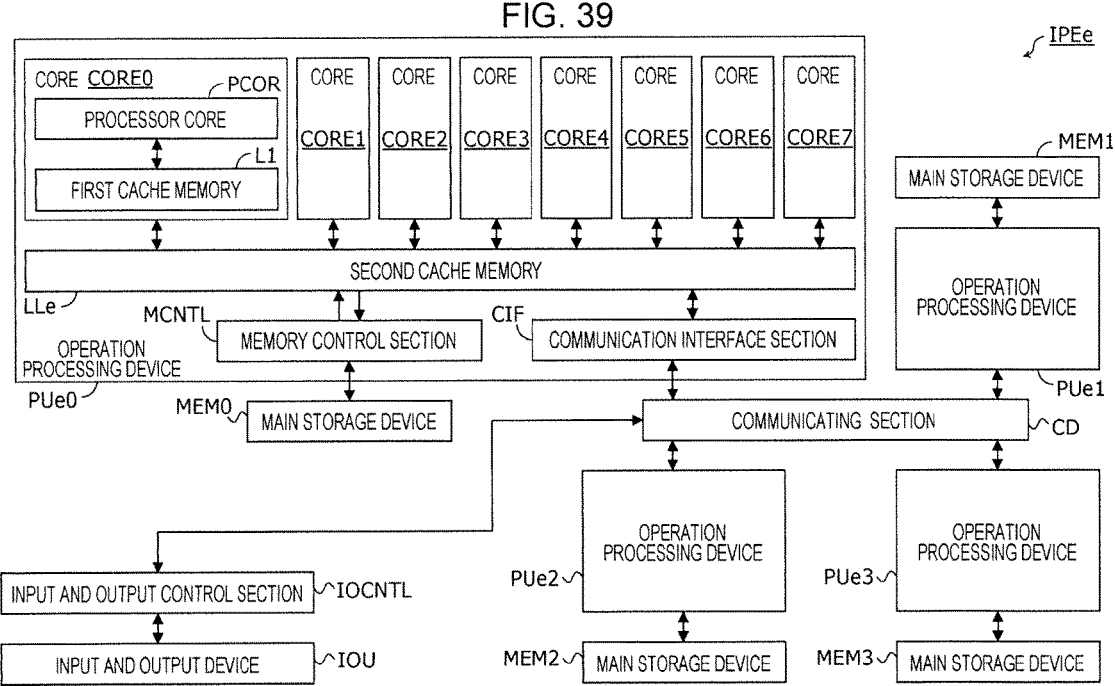
FIG. 39 is a diagram illustrating another embodiment of an operation processing device, an information processing apparatus, and a control method for the operation processing device.

FIG. 39 illustrates another embodiment of an operation processing device, an information processing apparatus, and a control method for the operation processing device. The same or corresponding elements as the elements described in FIG. 1 to FIG. 38 will be designated by the same or corresponding reference signs and will not be described in detail. An information processing apparatus IPEe illustrated in FIG. 39 is a computer apparatus such as a server. The information processing apparatus IPEe is the same as or corresponds to the information processing apparatus IPEc illustrated in FIG. 22 except for including an operation processing device PUe instead of the operation processing device PUc illustrated in FIG. 22. For example, the information processing apparatus IPEe includes a plurality of operation processing devices PUe (PUe0, PUe1, PUe2, and PUe3), the plurality of main storage devices MEM (MEM0, MEM1, MEM2, and MEM3), the communicating section CD, the input and output control section IOCNTL, and the input and output device IOU.

The operation processing device PUe is the same as or corresponds to the operation processing device PUc illustrated in FIG. 22 except for including a second cache memory LLe instead of the second cache memory LLc illustrated in FIG. 22. For example, the operation processing device PUe includes the plurality of cores CORE (CORE0, CORE1, . . . , CORE7), the second cache memory LLe, the memory control section MCNTL, and the communication interface section CIF.

The configurations of the operation processing device PUe and the information processing apparatus IPEe are not limited to the example illustrated in FIG. 39. The number of the operation processing devices PUe and the number of main storage devices MEM are not limited to the example illustrated in FIG. 39.

Figure 40:
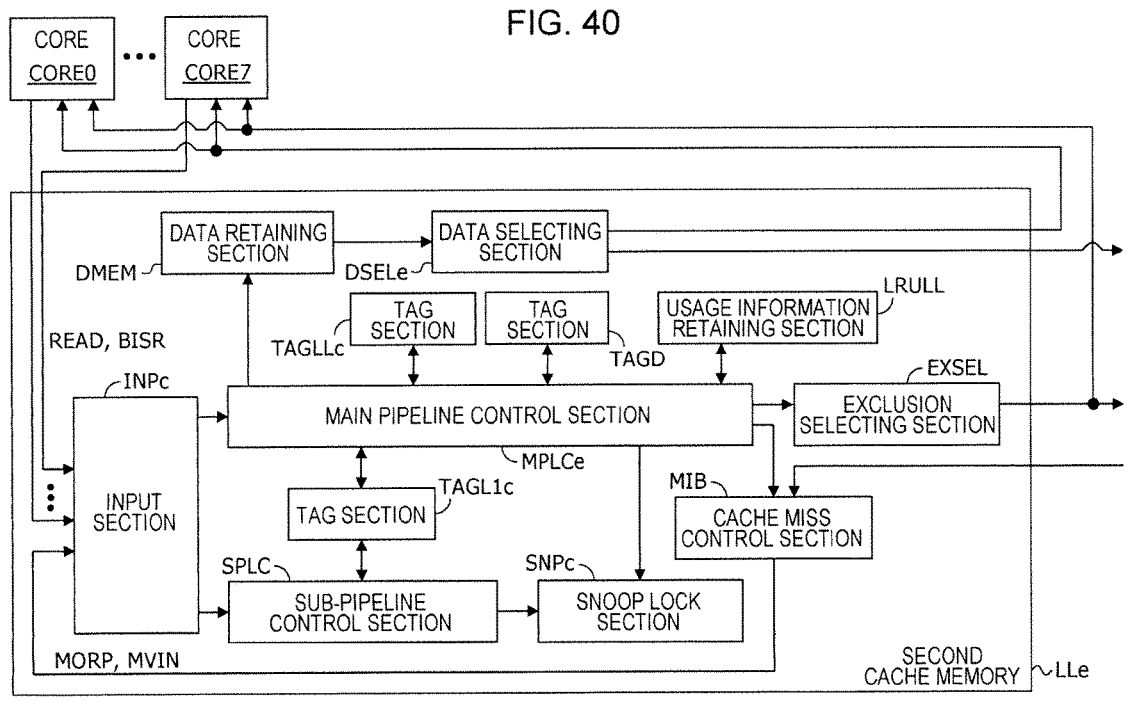
FIG. 40 is a diagram illustrating one example of a second cache memory illustrated in FIG. 39.

FIG. 40 illustrates one example of the second cache memory LLe illustrated in FIG. 39. The second cache memory LLe includes a main pipeline control section MPLCe and a data selecting section DSELe instead of the main pipeline control section MPLCc and the data selecting section DSELb illustrated in FIG. 23. In addition, the second cache memory LLe is configured by adding an exclusive selecting section EXSEL to the second cache memory LLc illustrated in FIG. 23. Other configurations of the second cache memory LLe are the same as or correspond to the second cache memory LLc illustrated in FIG. 23.

For example, the second cache memory LLe includes the input section INPc, the main pipeline control section MPLCe, the sub-pipeline control section SPLC, and the exclusive selecting section EXSEL. Furthermore, the second cache memory LLe includes the data retaining section DMEM, the data selecting section DSELe, the tag sections TAGLLc, TAGL1c, and TAGD, the usage information retaining section LRULL, the snoop lock section SNPc, and the cache miss control section MIB.

The second cache memory LLe illustrated in FIG. 40 has a different second condition of a stop condition for stopping issuing of the eviction request MORP from the second cache memory LLc illustrated in FIG. 23. For example, the condition that the state of the eviction target data is equal to a state other than "Modified" is removed from the second condition described in FIG. 9. That is, the second condition is that the eviction target data is data stored at a local memory address in the ccNUMA configuration and that the eviction target data is not retained in the first cache memory L1. A first condition is the same as the first condition described in FIG. 9. Accordingly, in the second cache memory LLe, a process of evicting the eviction target data from any of the plurality of ways WAY (a process that corresponds to a process based on the eviction request MORP) includes a process of writing the eviction target data back to the main storage device MEM.

When a process that corresponds to a process based on the eviction request MORP is executed in the read request READ in the case of the state of the eviction target data being equal to "Modified", two requests for the memory control section MCNTL may occur at the same time. The two requests, for example, include a request for data in response to the first cache memory L1 and a request for write-back of the eviction target data. Thus, the exclusive selecting section EXSEL that exclusively selects two requests is added to the second cache memory LLc illustrated in FIG. 23. Details of the exclusive selecting section EXSEL will be described in FIG. 42.

Since the stop condition is different from that of the second cache memory LLc illustrated in FIG. 23, the main pipeline control section MPLCe is different from the main pipeline control section MPLCc illustrated in FIG. 23. Details of the main pipeline control section MPLCe will be described in FIG. 43 and thereafter. Furthermore, in the example illustrated in FIG. 40, the data selecting section DSELe is different from the data selecting section DSELb illustrated in FIG. 23. Details of the data selecting section DSELe will be described in FIG. 41. Other blocks (for example, the input section INPc and the like) in the second cache memory LLe are the same as or correspond to the corresponding blocks in the second cache memory LLc illustrated in FIG. 23.

The configuration of the second cache memory LLe is not limited to the example illustrated in FIG. 39. For example, the second cache memory LLe, in the case of the eviction target data being data that is stored at a local memory address in the ccNUMA configuration, may determine the stop condition to be satisfied. In this case, for example, the main pipeline control section MPLCe described in FIG. 43 and the like includes the core determining section CDJd and the first cache control section CMCNTLd described in FIG. 36 and FIG. 38 instead of the core determining section CDJc and the first cache control section CMCNTLb.

Figure 41:
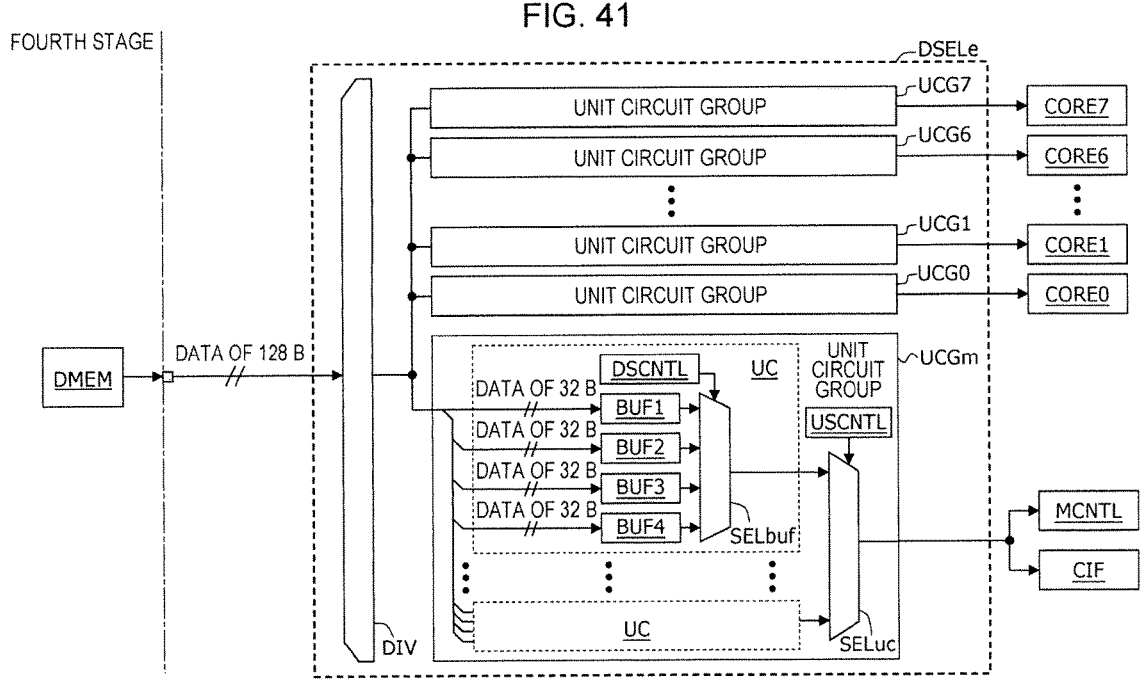
FIG. 41 is a diagram illustrating one example of a data selecting section illustrated in FIG. 40.

FIG. 41 illustrates one example of the data selecting section DSELe illustrated in FIG. 40. A dot-dashed line and a halftone rectangle illustrated in FIG. 41 have the same meaning as the dot-dashed line and the halftone rectangle illustrated in FIG. 8. In the example illustrated in FIG. 41, the data retaining section DMEM is operated in the fourth stage of a pipeline process as described in FIG. 43. The width of data output from the data retaining section DMEM is 128 bytes, and data transfer to the memory control section MCNTL or the like is executed in 32 bytes×4 cycles.

The data selecting section DSELe includes the dividing section DIV and a plurality of unit circuit groups UCG (UCG0 to UCG7 and UCGm). The dividing section DIV divides data of 128 bytes transferred from the data retaining section DMEM into data of 32 bytes and transfers four pieces of data of 32 bytes to each unit circuit group UCG.

The unit circuit groups UCG0 to UCG7 are disposed in respective correspondence with the cores CORE0 to CORE7. The number appended to the reference signs of the unit circuit groups UCG0 to UCG7 corresponds to the number appended to the reference signs of the cores CORE0 to CORE7. For example, the core CORE0 receives data from the data retaining section DMEM through the unit circuit group UCG0. The unit circuit group UCGm is disposed in correspondence with the memory control section MCNTL and the communication interface section CIF. The plurality of unit circuit groups UCG is the same as or corresponds to each other. Thus, the unit circuit group UCGm will be described.

The unit circuit group UCGm includes the plurality of unit circuit sections UC, a selecting section SELuc, and a selection control section USCNTL. The unit circuit section UC is the same as or corresponds to the unit circuit section UC illustrated in FIG. 8. For example, each unit circuit section UC includes the four buffer sections BUF (BUF1, BUF2, BUF3, and BUF4) respectively retaining the four pieces of data of 32 bytes transferred from the dividing section DIV, the selection control section DSCNTL, and the selecting section SELbuf.

The selection control section USCNTL selects any of the plurality of unit circuit sections UC and outputs, through the selecting section SELuc, data that is output from the selected unit circuit section UC. That is, the selecting section SELuc transfers, to the memory control section MCNTL or the like, data that is output from the unit circuit section UC of the plurality of unit circuit sections UC selected by the selection control section USCNTL.

Figure 46:
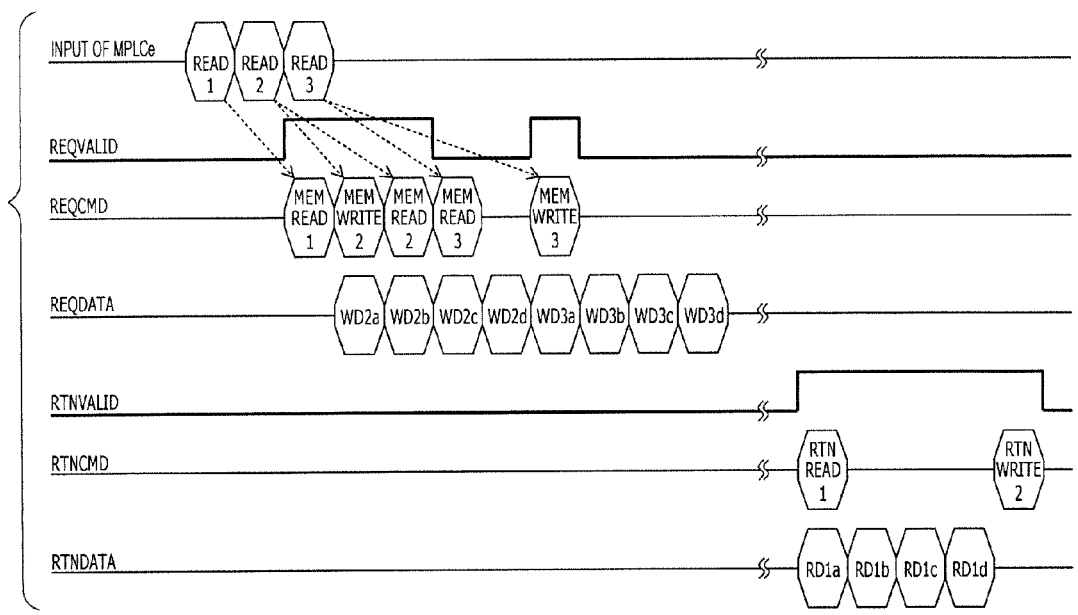
FIG. 46 is a diagram illustrating one example of data access to the second cache memory illustrated in FIG. 39.

Accordingly, each unit circuit group UCG includes the plurality of unit circuit sections UC. Accordingly, the main pipeline control section MPLCe may execute appropriate control even in the case of successive requests MEMWRITE as illustrated in FIG. 46. For example, the main pipeline control section MPLCe, in the case of input of a process request that may execute the request MEMWRITE, aborts the input process request in the case of all of the unit circuit sections UC being used.

Figure 42:
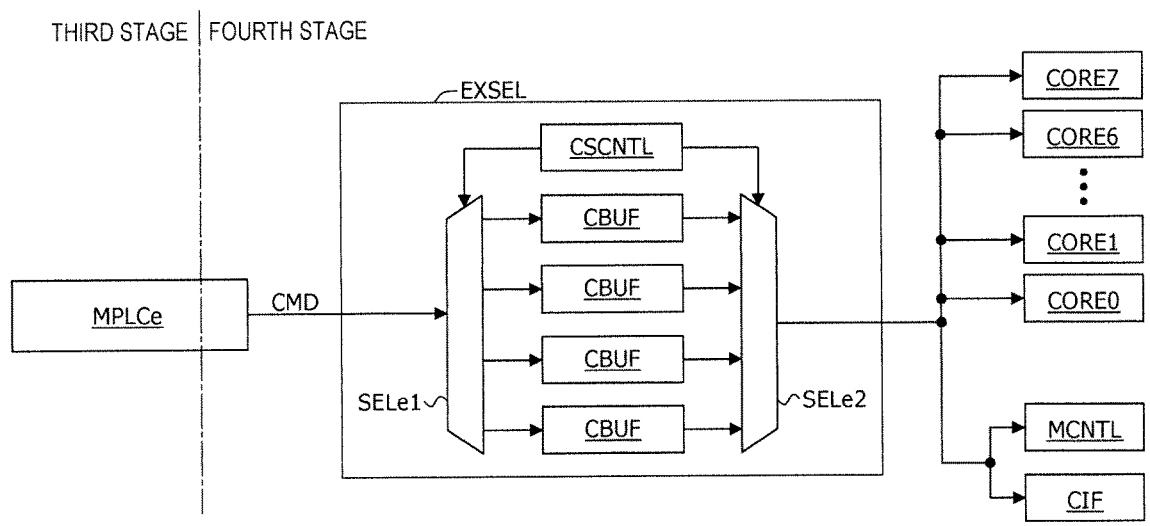
FIG. 42 is a diagram illustrating one example of an exclusive selecting section illustrated in FIG. 40.

FIG. 42 illustrates one example of the exclusive selecting section EXSEL illustrated in FIG. 40. A dot-dashed line and a halftone rectangle illustrated in FIG. 42 have the same meaning as the dot-dashed line and the halftone rectangle illustrated in FIG. 8. For example, the exclusive selecting section EXSEL executes a process in the fourth stage of a pipeline process.

The exclusive selecting section EXSEL includes a plurality of buffer sections CBUF that retains the command CMD such as a command output from the main pipeline control section MPLCe, a selection control section CSCNTL, and selecting sections SELe1 and SELe2.

The selection control section CSCNTL selects the output destination of the selecting section SELe1. The selecting section SELe1 transfers the command CMD output from the main pipeline control section MPLCe to the buffer section CBUF selected by the selection control section CSCNTL. The selection control section CSCNTL selects any of the plurality of buffer sections CBUF and outputs, through the selecting section SELe2, the command CMD retained in the selected buffer section CBUF. That is, the selecting section SELe2 transfers, to the memory control section MCNTL or the like, the command CMD that is retained in the buffer section CBUF of the plurality of buffer sections CBUF selected by the selection control section CSCNTL.

Figure 43:
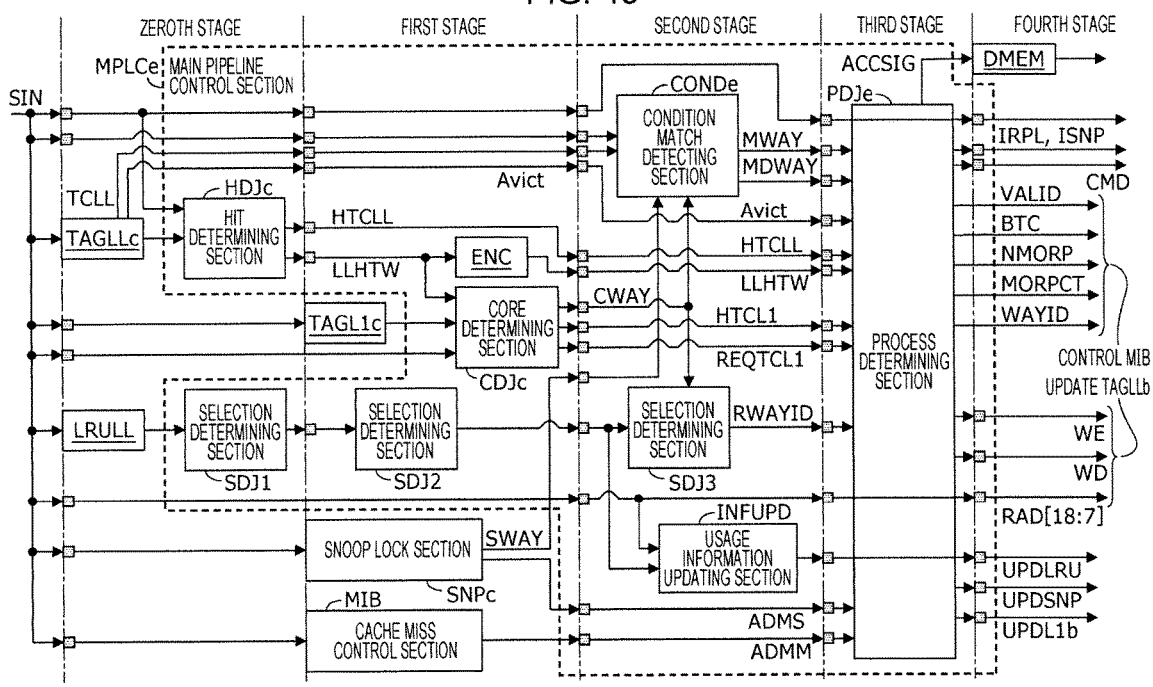
FIG. 43 is a diagram illustrating one example of a main pipeline control section illustrated in FIG. 40.

FIG. 43 illustrates one example of the main pipeline control section MPLCe illustrated in FIG. 40. A dot-dashed line and a halftone rectangle illustrated in FIG. 43 have the same meaning as the dot-dashed line and the halftone rectangle illustrated in FIG. 8.

The main pipeline control section MPLCe, even in the case of the state of the eviction target data being equal to "Modified", executes, in the read request READ, a process that corresponds to a process based on the eviction request MORP. In this case, the data retaining section DMEM is accessed by using the way WAY that is selected by determination of the eviction target data. The eviction target data is determined in the third stage. Thus, access to the data retaining section DMEM is executed in the fourth stage. Thus, the main pipeline control section MPLCe is configured by adding, to the main pipeline control section MPLCc illustrated in FIG. 26, a function of transmitting the address of the way WAY used in access to the data retaining section DMEM to the third stage in number corresponding to the number of ways WAY. For example, an address Avict of the candidate (data retained in the ways WAY0 to WAY15) of the eviction target data is transferred from the tag section TAGLLc to a process determining section PDJe.

Access to the data retaining section DMEM is executed in the third stage in the main pipeline control section MPLCe. Thus, the timing of access to the data retaining section DMEM is delayed compared with the main pipeline control section MPLCc illustrated in FIG. 26. For example, even the timing of access to the data retaining section DMEM in the main pipeline control section MPLCe in the case of a cache hit occurring for data requested with the read request READ is delayed compared with the main pipeline control section MPLCc illustrated in FIG. 26. In other words, the second cache memory LLc illustrated in FIG. 23 does not delay the timing of access to the data retaining section DMEM and thus may improve the throughput of a pipeline process. The timing of access being delayed degrades latency and performance.

The main pipeline control section MPLCe illustrated in FIG. 43 includes a condition match detecting section CONDe and the process determining section PDJe instead of the condition match detecting section CONDc and the process determining section PDJc illustrated in FIG. 26. In addition, the main pipeline control section MPLCe is configured by removing the data control section DATACL and the command control section CMDCL illustrated in FIG. 26 from the main pipeline control section MPLCc. Other configurations of the main pipeline control section MPLCe are the same as or correspond to the main pipeline control section MPLCc illustrated in FIG. 26.

The main pipeline control section MPLCe, for example, includes the selection determining section SDJ, the hit determining section HDJc, the encoding section ENC, the core determining section CDJc, the condition match detecting section CONDe, the usage information updating section INFUPD, and the process determining section PDJe. The condition match detecting section CONDe and the process determining section PDJe in the main pipeline control section MPLCe are different from the condition match detecting section CONDc and the process determining section PDJc illustrated in FIG. 26.

The condition match detecting section CONDe detects the candidate of the eviction target data being data stored at a local memory address in the ccNUMA configuration and the candidate of the eviction target data not being retained in the first cache memory L1. The information MWAY that indicates a detection result is transferred to the process determining section PDJe.

Furthermore, the condition match detecting section CONDe detects whether or not the state of the candidate of the eviction target data is equal to "Modified", and transfers information MDWAY indicating a detection result to the process determining section PDJe. Details of the condition match detecting section CONDe will be described in FIG. 44. Details of the process determining section PDJe will be described in FIG. 45.

Figure 44:
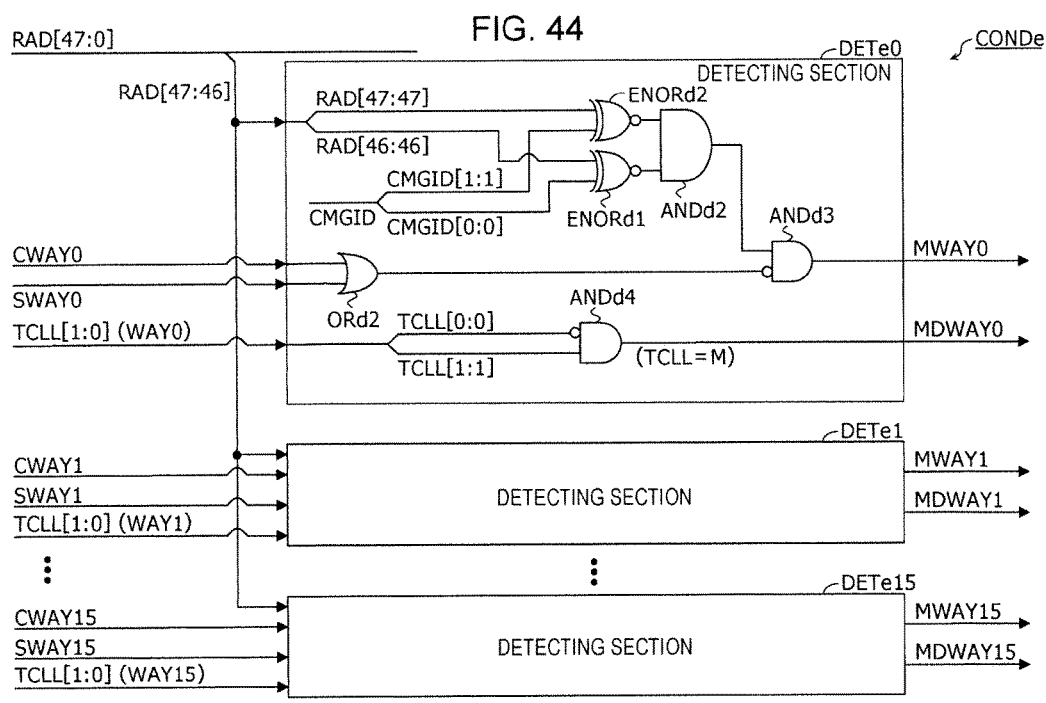
FIG. 44 is a diagram illustrating one example of a condition match detecting section illustrated in FIG. 43.

FIG. 44 illustrates one example of the condition match detecting section CONDe illustrated in FIG. 43. The condition match detecting section CONDe is the same as or corresponds to the condition match detecting section CONDc illustrated in FIG. 29 except for including a detecting section DETe (DETe0 to DETe15) instead of the detecting section DETc (DETc0 to DETc15) illustrated in FIG. 29. For example, the condition match detecting section CONDe includes a plurality of detecting sections DETe (DETe0 to DETe15). The number appended to the reference sign of the detecting section DETe corresponds to the number appended to the reference sign of the way WAY of the second cache memory LLe. The plurality of detecting sections DETe is the same as or corresponds to each other. Thus, the detecting section DETe0 will be described.

The detecting section DETe0 includes a logical product circuit ANDd3 instead of the logical product circuit ANDd1 illustrated in FIG. 29. In addition, the detecting section DETe0 is configured by removing the negated logical sum circuit NORd1, the negated logical product circuit NANDd1, and the logical sum circuit ORd1 illustrated in FIG. 29 from the detecting section DETc0 and adding a logical product circuit ANDd4 to the detecting section DETc0. Other configurations of the detecting section DETe0 are the same as or correspond to the detecting section DETc0 illustrated in FIG. 29.

For example, the detecting section DETe0 includes the negated exclusive logical sum circuits ENORd1 and ENORd2, the logical sum circuit ORd2, and the logical product circuits ANDd2, ANDd3, and ANDd4. The negated exclusive logical sum circuits ENORd1 and ENORd2, the logical product circuit ANDd2, and the logical sum circuit ORd2 are the same as or correspond to the negated exclusive logical sum circuits ENORd1 and ENORd2, the logical product circuit ANDd2, and the logical sum circuit ORd2 illustrated in FIG. 29.

The logical product circuit ANDd3 calculates the logical product of the calculation result of the logical product circuit ANDd2 and an inverted signal of the calculation result of the logical sum circuit ORd2 and outputs a calculation result as the match way information MWAY0 to the process determining section PDJe.

The logical product circuit ANDd4 receives, from the tag section TAGLLc, the type code TCLL[1:0] in the first management information INFLLc0 that corresponds to the index address PA[18:7] indicated by the address RAD[18:7]. The logical product circuit ANDd4 calculates the logical product of an inverted signal of the type code TCLL[0:0] and the type code TCLL[1:1] received from the tag section TAGLLc and outputs a calculation result as the information MDWAY0 to the process determining section PDJe. That is, the logical product circuit ANDd4 outputs the logical value "1" to the process determining section PDJe in the case of the state of the candidate of the eviction target data of the data retained in the way WAY0 being equal to "Modified".

Accordingly, the detecting section DETe0 detects whether or not the candidate of the eviction target data, of the data retained in the way WAY0, indicated by the index address PA[18:7] satisfies the stop condition. In addition, the detecting section DETe0 detects whether or not the state of the candidate of the eviction target data is equal to "Modified".

Figure 45:
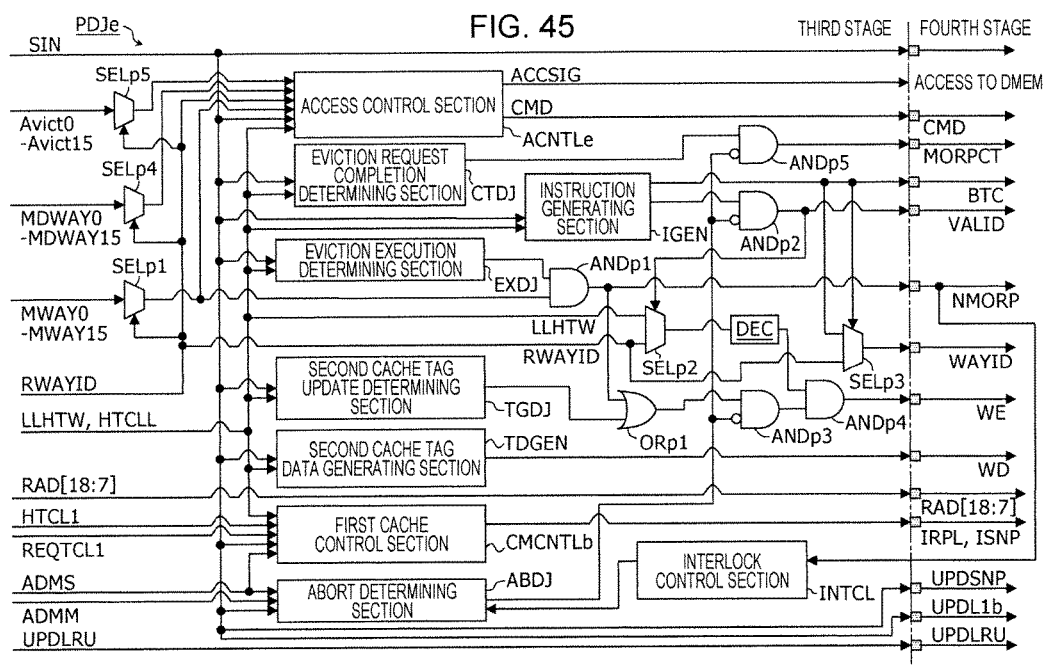
FIG. 45 is a diagram illustrating one example of a process determining section illustrated in FIG. 43.

FIG. 45 illustrates one example of the process determining section PDJe illustrated in FIG. 43. A dot-dashed line and a halftone rectangle illustrated in FIG. 45 have the same meaning as the dot-dashed line and the halftone rectangle illustrated in FIG. 8. The process determining section PDJe is configured by adding selecting sections SELp4 and SELp5 and an access control section ACNTLe to the process determining section PDJb illustrated in FIG. 13. Other configurations of the process determining section PDJe are the same as or correspond to the process determining section PDJb illustrated in FIG. 13.

For example, the process determining section PDJe includes the selecting sections SELp1, SELp2, SELp3, SELp4, and SELp5, the decoding section DEC, the access control section ACNTLe, the eviction request completion determining section CTDJ, the eviction execution determining section EXDJ, and the instruction generating section IGEN. Furthermore, the process determining section PDJe includes the second cache tag update determining section TGDJ, the second cache tag data generating section TDGEN, the first cache control section CMCNTLb, the abort determining section ABDJ, and the interlock control section INTCL. In addition, the process determining section PDJe includes the logical product circuits ANDp1, ANDp2, ANDp3, ANDp4, and ANDp5 and the logical sum circuit ORp1. In FIG. 45, the selecting sections SELp4 and SELp5 and the access control section ACNTLe added to the process determining section PDJb illustrated in FIG. 13 will be described.

The selecting section SELp4 selects, from the information MDWAY0 to MDWAY15 of each way WAY indicating whether or not the state of the candidate of the eviction target data of each way WAY is equal to "Modified," the information MDWAY that corresponds to the victim way WAY indicated by the information RWAYID. The selecting section SELp4 outputs, to the access control section ACNTLe, the information MDWAY that is selected based on the information RWAYID. The information MDWAY that is selected based on the information RWAYID indicates whether or not the state of the eviction target data retained in the victim way WAY is equal to "Modified".

The selecting section SELp5 selects, from the addresses Avict0 to Avict15 of the candidates of the eviction target data of each way WAY, the address Avict that corresponds to the victim way WAY indicated by the information RWAYID. The selecting section SELp5 outputs, to the access control section ACNTLe, the address Avict that is selected based on the information RWAYID. The address Avict that is selected based on the information RWAYID indicates the address of the eviction target data retained in the victim way WAY.

The access control section ACNTLe receives the match way information MWAY, the information MDWAY, and the address Avict selected by the selecting sections SELp1, SELp4, and SELp5. In addition, the access control section ACNTLe receives the information SIN, LLHTW, HTCLL, and RWAYID. The access control section ACNTLe generates a signal ACCSIG, the command CMD, and the like based on the information SIN, LLHTW, HTCLL, RWAYID, MWAY, and MDWAY, the address Avict, and the like. The signal ACCSIG is a signal for accessing the data retaining section DMEM. The command CMD is transferred to the memory control section MCNTL or the like through the exclusive selecting section EXSEL as described in FIG. 42.

For example, the access control section ACNTLe, in the case of a cache hit occurring for the requested data requested with the read request READ, accesses the data retaining section DMEM by using the signal ACCSIG in order to read the requested data.

For example, the access control section ACNTLe, in the case of a cache miss occurring for the requested data requested with the read request READ with the state of the eviction target data being equal to a state other than "Modified", requests, by using the command CMD, the memory control section MCNTL to transfer the requested data. In this case, the data retaining section DMEM is not accessed.

For example, the access control section ACNTLe, in the case of a cache miss occurring for the requested data requested with the read request READ with the state of the eviction target data being equal to "Modified", requests, by using the command CMD, the memory control section MCNTL to transfer the requested data. Furthermore, the access control section ACNTLe instructs, by using the signal ACCSIG, the data retaining section DMEM to read the eviction target data.

FIG. 46 illustrates one example of data access to the second cache memory LLe illustrated in FIG. 39. FIG. 46 illustrates one example of data access in the case of a cache miss occurring for the requested data requested with read requests READ2 and READ3 with the state of the eviction target data being equal to "Modified".

The main pipeline control section MPLCe sends the request MEMREAD1 to the memory control section MCNTL in the case of input of the read request READ1 with a cache miss occurring in the second cache memory LLe.

The read request READ2 is input into the main pipeline control section MPLCe in succession after the read request READ1. Since the state of the eviction target data is equal to "Modified", two requests MEMWRITE2 and MEMREAD2 occur in the same cycle for the memory control section MCNTL. The request MEMWRITE2 is a request for write-back of the eviction target data to the main storage device MEM. The request MEMREAD2 is a request for reading the requested data requested with the read request READ2 from the main storage device MEM.

Since the two requests MEMWRITE2 and MEMREAD2 occur in the same cycle, the second cache memory LLe controls any of the requests to be delayed by one cycle. In the example illustrated in FIG. 46, the second cache memory LLe delays the request MEMREAD2 by one cycle.

The read request READ3 is input into the main pipeline control section MPLCe in succession after the read request READ2. Since the state of the eviction target data is equal to "Modified", two requests MEMWRITE2 and MEMREAD2 occur in the same cycle for the memory control section MCNTL. In this case, the second cache memory LLe executes a request MEMREAD3 after execution of the requests MEMWRITE2 and MEMREAD2 that occur by the preceding read request READ2. In addition, the second cache memory LLe executes the request MEMWRITE3 after release of the data bus REQDATA that is occupied by the request MEMWRITE2.

A control method that holds input of the subsequent read request READ for four cycles after input of the read request READ into the main pipeline control section MPLCe is considered. However, throughput and latency are decreased in the case of a cache hit. Consequently, since the process performance of the operation processing device PU is decreased, the control method that holds input of the subsequent read request READ is not suitable.

The second cache memory LLe that uses the control method illustrated in FIG. 46 may cause degradation in performance of the operation processing device PU and have high implementation cost compared with the second cache memory LLc that uses the control method illustrated in FIG. 32. Thus, the second cache memory LLe exhibits effect by being employed in the case of determining performance advantage to be greater than increase of implementation cost. For example, the second cache memory LLe is effective in the case of, for example, a high ratio of writes compared with reads with the throughput of a pipeline process more prioritized than the latency at the time of a cache hit in the second cache memory LLe.

The embodiment illustrated in FIG. 39 to FIG. 46 may achieve the same effect as the embodiment illustrated in FIG. 1. For example, the main pipeline control section MPLCe, in the case of the eviction target data satisfying the stop condition below, executes a process of evicting data from any of the plurality of ways WAY without issuing the eviction request MORP.

The stop condition is that the eviction target data is data stored at a local memory address in the ccNUMA configuration and that the eviction target data is not retained in the first cache memory L1.

In the case of the stop condition being satisfied, a process that corresponds to a process based on the eviction request MORP may be executed without issuing the eviction request MORP. Thus, the number of process requests input into the pipeline control section PLC may be decreased compared with the case of issuing the eviction request MORP. Accordingly, the throughput of the pipeline control section PLC at the time of executing a series of processes for one read request READ from the first cache memory L1 may be improved. Consequently, the throughput of the second cache memory LLe may be improved.

Figure 47:
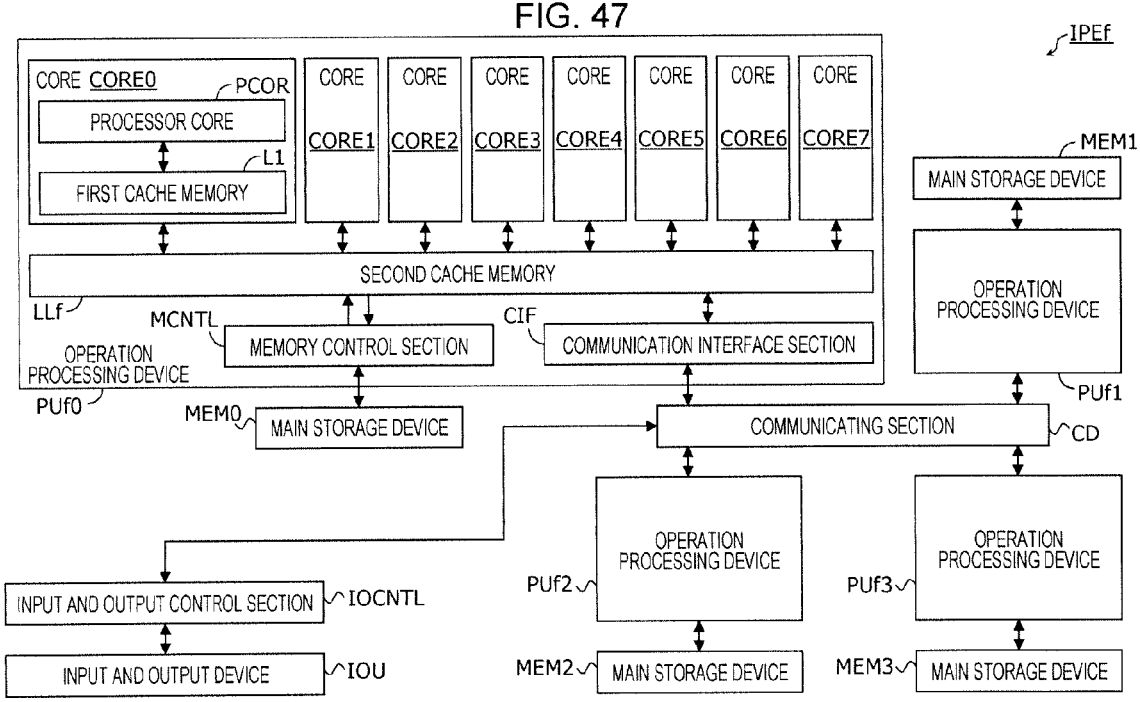
FIG. 47 is a diagram illustrating another embodiment of an operation processing device, an information processing apparatus, and a control method for the operation processing device.

FIG. 47 illustrates another embodiment of an operation processing device, an information processing apparatus, and a control method for the operation processing device. The same or corresponding elements as the elements described in FIG. 1 to FIG. 45 will be designated by the same or corresponding reference signs and will not be described in detail. An information processing apparatus IPEf illustrated in FIG. 47 is a computer apparatus such as a server. The information processing apparatus IPEf is the same as or corresponds to the information processing apparatus IPEe illustrated in FIG. 39 except for including an operation processing device PUf instead of the operation processing device PUe illustrated in FIG. 39. For example, the information processing apparatus IPEf includes a plurality of operation processing devices PUf (PUf0, PUf1, PUf2, and PUf3), the plurality of main storage devices MEM (MEM0, MEM1, MEM2, and MEM3), the communicating section CD, the input and output control section IOCNTL, and the input and output device IOU.

The operation processing device PUf is the same as or corresponds to the operation processing device PUe illustrated in FIG. 39 except for including a second cache memory LLf instead of the second cache memory LLe illustrated in FIG. 39. For example, the operation processing device PUf includes the plurality of cores CORE (CORE0, CORE1, . . . , CORE7), the second cache memory LLf, the memory control section MCNTL, and the communication interface section CIF.

The configurations of the operation processing device PUf and the information processing apparatus IPEf are not limited to the example illustrated in FIG. 47. The number of the operation processing devices PUf and the number of main storage devices MEM are not limited to the example illustrated in FIG. 47.

Figure 48:
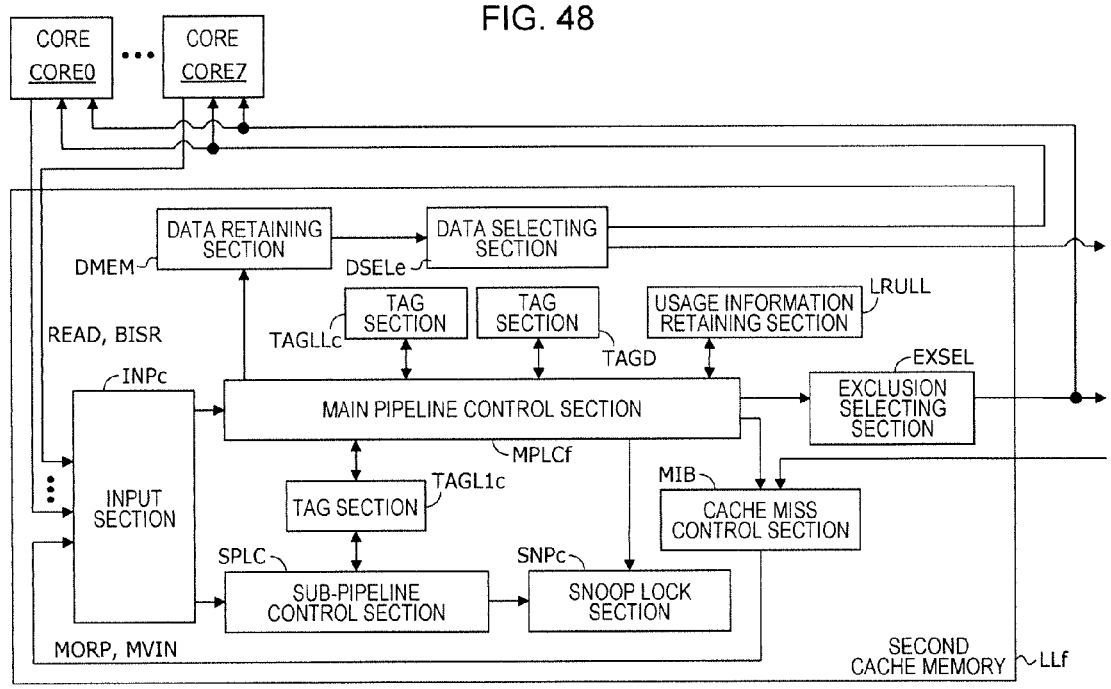
FIG. 48 is a diagram illustrating one example of a second cache memory illustrated in FIG. 47.

FIG. 48 illustrates one example of the second cache memory LLf illustrated in FIG. 47. The configuration of the second cache memory LLf is not limited to the example illustrated in FIG. 48. The second cache memory LLf is the same as or corresponds to the second cache memory LLe illustrated in FIG. 40 except for including a main pipeline control section MPLCf instead of the main pipeline control section MPLCe illustrated in FIG. 40.

For example, the second cache memory LLf includes the input section INPc, the main pipeline control section MPLCf, the sub-pipeline control section SPLC, and the exclusive selecting section EXSEL. Furthermore, the second cache memory LLf includes the data retaining section DMEM, the data selecting section DSELe, the tag sections TAGLLc, TAGL1c, and TAGD, the usage information retaining section LRULL, the snoop lock section SNPc, and the cache miss control section MIB.

The second cache memory LLf illustrated in FIG. 48 has a different second condition of a stop condition for stopping issuing of the eviction request MORP from the second cache memory LLe illustrated in FIG. 39. For example, the condition that the eviction target data is data stored at a local memory address in the ccNUMA configuration is removed from the second condition described in FIG. 40.

That is, the two conditions that the eviction target data is data stored at a local memory address in the ccNUMA configuration and that the state of the eviction target data is equal to a state other than "Modified" are removed from the second condition described in FIG. 9. Therefore, the second condition is that the eviction target data is not retained in the first cache memory L1. Thus, even in the case of the eviction target data being in "Local≠Host", a process that corresponds to a process based on the eviction request MORP is executed in the read request READ if the eviction target data is not retained in the first cache memory L1. A first condition is the same as the first condition described in FIG. 9.

The main pipeline control section MPLCf, in the case of the eviction target data being in "Local≠Host" with issuing of the eviction request MORP stopped, executes an instruction for the CMG managing the eviction target data in the read request READ. For example, the main pipeline control section MPLCf sends an instruction to invalidate output information of the current CMG to the CMG that manages the eviction target data. In the case of the state of the eviction target data being equal to "Modified", the main pipeline control section MPLCf sends, to the CMG that manages the eviction target data, an instruction to invalidate the output information of the current CMG and the eviction target data that is write-back data. As described in FIG. 43, the eviction target data is determined in the third stage. Thus, access to the data retaining section DMEM is executed in the fourth stage.

When a process that corresponds to a process based on the eviction request MORP is executed in the read request READ in the case of the eviction target data being in "Local≠Host", two requests for the communication interface section CIF may occur at the same time. The two requests, for example, are a request for data to respond to the first cache memory L1 and a request for invalidating the output information of the current CMG (in the case of the eviction target data being dirty, includes sending the write-back data).

Accordingly, in the second cache memory LLf, the output destination of the exclusive selecting section EXSEL is the communication interface section CIF in the case of stopping issuing of the eviction request MORP. Meanwhile, in the second cache memory LLe illustrated in FIG. 40, the output destination of the exclusive selecting section EXSEL is the memory control section MCNTL in the case of stopping issuing of the eviction request MORP. Therefore, even in the case of the state of the eviction target data being equal to "Modified", appropriately selecting the output destination of the exclusive selecting section EXSEL may stop issuing of the eviction request MORP. Thus, in the second cache memory LLf, the two conditions that the eviction target data is in "Local=Host" and that the state of the eviction target data is equal to a state other than "Modified" are removed from the second condition described in FIG. 9.

For example, operation of the main pipeline control section MPLCf in the case of the state of the eviction target data being equal to "Modified" is the same as or corresponds to the main pipeline control section MPLCe illustrated in FIG. 43. Details of the main pipeline control section MPLCf will be described in FIG. 49 and thereafter. A block of the input section INPc or the like other than the main pipeline control section MPLCf is the same as or corresponds to the corresponding block in the second cache memory LLe illustrated in FIG. 40.

Figure 49:
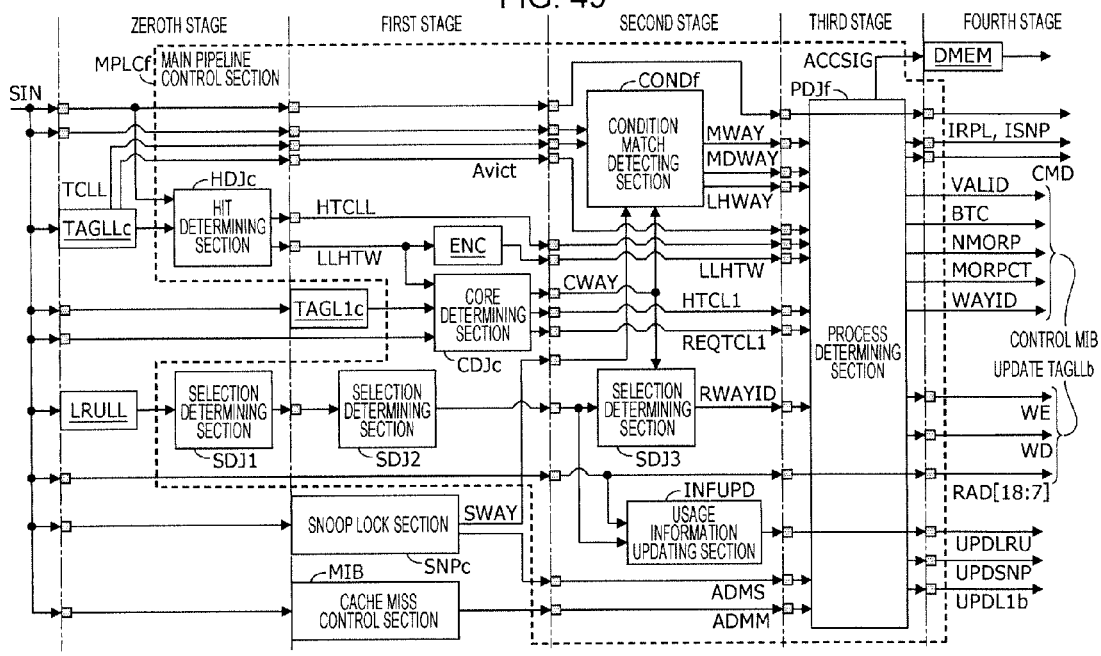
FIG. 49 is a diagram illustrating one example of a main pipeline control section illustrated in FIG. 48.

FIG. 49 illustrates one example of the main pipeline control section MPLCf illustrated in FIG. 48. A dot-dashed line and a halftone rectangle illustrated in FIG. 49 have the same meaning as the dot-dashed line and the halftone rectangle illustrated in FIG. 8. The main pipeline control section MPLCf includes a condition match detecting section CONDf and a process determining section PDJf instead of the condition match detecting section CONDe and the process determining section PDJe illustrated in FIG. 43. Other configurations of the main pipeline control section MPLCf are the same as or correspond to the main pipeline control section MPLCe illustrated in FIG. 43.

For example, the main pipeline control section MPLCf includes the selection determining section SDJ, the hit determining section HDJc, the encoding section ENC, the core determining section CDJc, the condition match detecting section CONDf, the usage information updating section INFUPD, and the process determining section PDJf. The condition match detecting section CONDf and the process determining section PDJf in the main pipeline control section MPLCf are different from the condition match detecting section CONDe and the process determining section PDJe illustrated in FIG. 43.

The condition match detecting section CONDf detects the candidate of the eviction target data not being retained in the first cache memory L1 and transfers the information MWAY indicating a detection result to the process determining section PDJf. In addition, the condition match detecting section CONDf detects whether or not the state of the candidate of the eviction target data is equal to "Modified", and transfers the information MDWAY indicating a detection result to the process determining section PDJf. Furthermore, the condition match detecting section CONDf detects whether or not the candidate of the eviction target data is data stored at a local memory address in the ccNUMA configuration and transfers information LHWAY indicating a detection result to the process determining section PDJf. Details of the condition match detecting section CONDf will be described in FIG. 50. Details of the process determining section PDJf will be described in FIG. 51.

Figure 50:
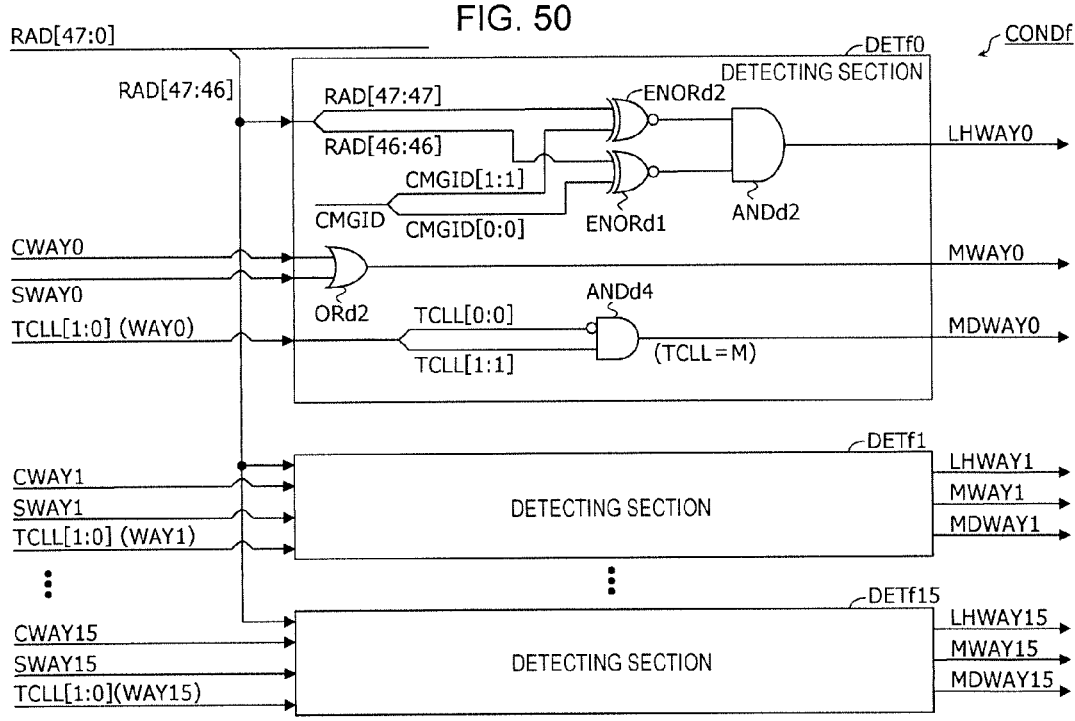
FIG. 50 is a diagram illustrating one example of a condition match detecting section illustrated in FIG. 49.

FIG. 50 illustrates one example of the condition match detecting section CONDf illustrated in FIG. 49. The condition match detecting section CONDf is the same as or corresponds to the condition match detecting section CONDe illustrated in FIG. 44 except for including a detecting section DETf (DETf0 to DETf15) instead of the detecting section DETe (DETe0 to DETe15) illustrated in FIG. 44. For example, the condition match detecting section CONDf includes a plurality of detecting sections DETf (DETf0 to DETf15). The number appended to the reference sign of the detecting section DETf corresponds to the number appended to the reference sign of the way WAY of the second cache memory LLf. The plurality of detecting sections DETf is the same as or corresponds to each other. Thus, the detecting section DETf0 will be described.

The detecting section DETf0 is configured by removing the logical product circuit ANDd3 illustrated in FIG. 44 from the detecting section DETe0. Other configurations of the detecting section DETf0 are the same as or correspond to the detecting section DETe0 illustrated in FIG. 44. For example, the detecting section DETf0 includes the negated exclusive logical sum circuits ENORd1 and ENORd2, the logical sum circuit ORd2, and the logical product circuits ANDd2 and ANDd4. The negated exclusive logical sum circuits ENORd1 and ENORd2, the logical sum circuit ORd2, and the logical product circuits ANDd2 and ANDd4 are the same as or correspond to the negated exclusive logical sum circuits ENORd1 and ENORd2, the logical sum circuit ORd2, and the logical product circuits ANDd2 and ANDd4 illustrated in FIG. 44.

For example, the logical product circuit ANDd2 calculates the logical product of the calculation result of the negated exclusive logical sum circuit ENORd1 and the calculation result of the negated exclusive logical sum circuit ENORd2 and outputs a calculation result as the information LHWAY0 to the process determining section PDJf. The logical sum circuit ORd2 calculates the logical sum of the possession information CWAY0 and the information SWAY0 and outputs a calculation result as the match way information MWAY0 to the process determining section PDJf. The logical product circuit ANDd4 calculates the logical product of an inverted signal of the type code TCLL[0:0] and the type code TCLL[1:1] received from the tag section TAGLLc and outputs a calculation result as the information MDWAY0 to the process determining section PDJf.

Accordingly, the detecting section DETf0 detects whether or not the candidate of the eviction target data, of the data retained in the way WAY0, indicated by the index address PA[18:7] satisfies the stop condition. In addition, the detecting section DETf0 detects whether or not the state of the candidate of the eviction target data is equal to "Modified". Furthermore, the detecting section DETf0 detects whether or not the candidate of the eviction target data is data stored at a local memory address in the ccNUMA configuration.

Figure 51:
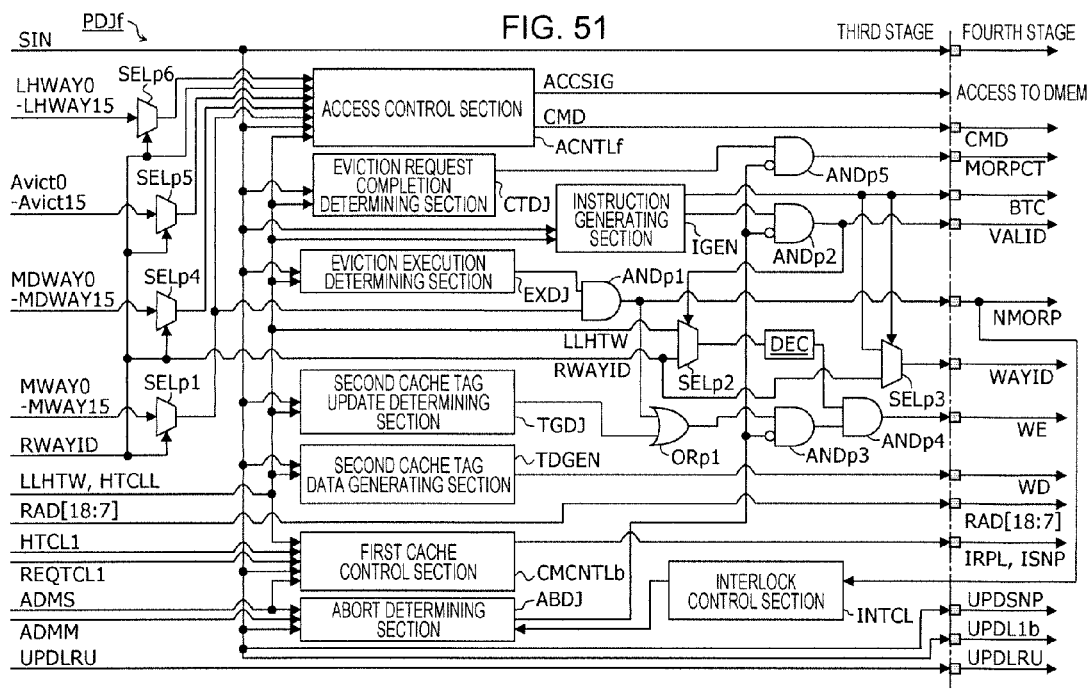
FIG. 51 is a diagram illustrating one example of a process determining section illustrated in FIG. 49.

FIG. 51 illustrates one example of the process determining section PDJf illustrated in FIG. 49. A dot-dashed line and a halftone rectangle illustrated in FIG. 51 have the same meaning as the dot-dashed line and the halftone rectangle illustrated in FIG. 8. The process determining section PDJf includes an access control section ACNTLf instead of the access control section ACNTLe illustrated in FIG. 45. In addition, the process determining section PDJf is configured by adding a selecting section SELp6 to the process determining section PDJe illustrated in FIG. 45. Other configurations of the process determining section PDJf are the same as or correspond to the process determining section PDJe illustrated in FIG. 45.

For example, the process determining section PDJf includes the selecting sections SELp1, SELp2, SELp3, SELp4, SELp5, and SELp6, the decoding section DEC, the access control section ACNTLf, the eviction request completion determining section CTDJ, the eviction execution determining section EXDJ, and the instruction generating section IGEN. Furthermore, the process determining section PDJf includes the second cache tag update determining section TGDJ, the second cache tag data generating section TDGEN, the first cache control section CMCNTLb, the abort determining section ABDJ, and the interlock control section INTCL. In addition, the process determining section PDJf includes the logical product circuits ANDp1, ANDp2, ANDp3, ANDp4, and ANDp5 and the logical sum circuit ORp1. In FIG. 51, the selecting section SELp6 and the access control section ACNTLf that are changes from the process determining section PDJe illustrated in FIG. 45 will be described.

The selecting section SELp6 receives the information LHWAY0 to LHWAY15 of each way WAY that indicates whether or not the candidate of the eviction target data of each way WAY is data stored at a local memory address in the ccNUMA configuration. The selecting section SELp6 selects the information LHWAY, of the information LHWAY0 to LHWAY15, corresponding to the victim way WAY indicated by the information RWAYID and outputs the selected information LHWAY to the access control section ACNTLf. The information LHWAY that is selected based on the information RWAYID indicates whether or not the eviction target data retained in the victim way WAY is data stored at a local memory address in the ccNUMA configuration.

The access control section ACNTLf receives the match way information MWAY, the information MDWAY, the address Avict, and the information LHWAY selected by the selecting sections SELp1, SELp4, SELp5, and SELp6. In addition, the access control section ACNTLf receives the information SIN, LLHTW, HTCLL, and RWAYID. The access control section ACNTLf generates the signal ACCSIG, the command CMD, and the like based on the information SIN, LLHTW, HTCLL, RWAYID, MWAY, MDWAY, and LHWAY, the address Avict, and the like. The signal ACCSIG is a signal for accessing the data retaining section DMEM. The command CMD is transferred to the communication interface section CIF or the like through the exclusive selecting section EXSEL. For example, in the case of requesting another CMG to execute data transfer or the like, the communication interface section CIF is selected as the output destination of the exclusive selecting section EXSEL.

For example, the access control section ACNTLf, in the case of a cache hit occurring for the requested data requested with the read request READ, accesses the data retaining section DMEM by using the signal ACCSIG in order to read the requested data.

For example, the access control section ACNTLf, in the case of a cache miss occurring for the requested data with the state of the eviction target data being equal to a state other than "Modified", requests, by using the command CMD, the memory control section MCNTL or another CMG to transfer the requested data. In this case, the data retaining section DMEM is not accessed.

For example, the access control section ACNTLf, in the case of a cache miss occurring for the requested data with the state of the eviction target data being equal to "Modified", requests, by using the command CMD, the memory control section MCNTL or another CMG to transfer the requested data. Furthermore, the access control section ACNTLf requests, by using the command CMD, the memory control section MCNTL or another CMG to write back the eviction target data. In addition, the access control section ACNTLf instructs, by using the signal ACCSIG, the data retaining section DMEM to read the eviction target data. Furthermore, the access control section ACNTLf requests, by using the command CMD, the memory control section MCNTL or another CMG to write back the eviction target data and instructs, by using the signal ACCSIG, the data retaining section DMEM to read the eviction target data.

The embodiment illustrated in FIG. 47 to FIG. 51 may achieve the same effect as the embodiment illustrated in FIG. 1. For example, the main pipeline control section MPLCf, in the case of the eviction target data satisfying the stop condition below, executes a process of evicting data from any of the plurality of ways WAY without issuing the eviction request MORP.

The stop condition is that the eviction target data is not retained in the first cache memory L1. In the case of the stop condition being satisfied, a process that corresponds to a process based on the eviction request MORP may be executed without issuing the eviction request MORP. Thus, the number of process requests input into the pipeline control section PLC may be decreased compared with the case of issuing the eviction request MORP. Accordingly, the throughput of the pipeline control section PLC at the time of executing a series of processes for one read request READ from the first cache memory L1 may be improved. Consequently, the throughput of the second cache memory LLf may be improved. The operation processing section, the data retaining section, the first information retaining section, the second information retaining section, the state determining section, the processing section, the communicating section, the input and output control section, the memory control section, the communication interface section, the data retaining section, the data selecting section, the tag section, the usage information retaining section, the input section, the control section, the pipeline control section, the main pipeline control section, the information retaining section, the determining section, the process determining section, the decoding section, the match detecting section, the snoop lock section, the cache miss control section, the exclusive selecting section, the selecting section, the access control section, the match flag generating section, the logical product section, and the logical sum section described above may be configured of circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operation-processing device comprising:
a processor core configured to execute an instruction;
a first cache configured to retain data used by the processor core; and
a second cache configured to be coupled to the first cache, wherein the second cache includes
a data-retaining circuit configured to include a plurality of storage areas to retain data,
a first information-retaining circuit configured to retain first management information that includes first state information for indicating a state of data retained in the data-retaining circuit,
a state-determining circuit configured to determine, based on the first management information, whether a requested data requested with a read request from the first cache is retained in the data-retaining circuit, and
an eviction-processing circuit configured to, during an execution cycle of the read request and where the state-determining circuit determines the requested data not to be retained in the data-retaining circuit with not enough space in the storage areas to store the requested data, execute a process based upon whether a condition of a stop condition to stop issuance of an eviction request is satisfied, to cause eviction of data from any of the plurality of storage areas without issuance of an eviction request during the execution cycle of the read request.

2. The operation-processing device according to claim 1, wherein the eviction-processing circuit,
where the state-determining circuit determines the requested data not to be retained in the data-retaining circuit with not enough space in the storage areas to store the requested data and with a stop condition for stopping issuing of the eviction request for an eviction target satisfied, evicts the eviction target data from the data-retaining circuit without issuing the eviction request, and
where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and
the second cache further includes
a condition-determining circuit configured to, where the state of the eviction target data evicted from any of the plurality of storage areas being equal to a state not desiring write-back to a storage device connected to the second cache, determine the stop condition to be satisfied, and
an eviction control circuit configured to issue the eviction request to the eviction-processing circuit based on an instruction from the eviction-processing circuit.

3. The operation-processing device according to claim 1, wherein the eviction-processing circuit,
where the state-determining circuit determines the requested data not to be retained in the data-retaining circuit with not enough space in the storage areas to store the requested data and with a stop condition for stopping issuing of the eviction request satisfied, evicts an eviction target data from the data-retaining circuit without issuing the eviction request, and
where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and
the second cache further includes
a second information-retaining circuit configured to retain second management information that includes second state information indicating the state of data retained in the first cache,
a condition-determining circuit configured to, where the eviction target data evicted from the plurality of storage areas not being retained in the first cache, determine the stop condition to be satisfied, and
an eviction control circuit configured to issue the eviction request to the eviction-processing circuit based on an instruction from the eviction-processing circuit.

4. The operation-processing device according to claim 1, wherein the eviction-processing circuit,
where the state-determining circuit determines the requested data not to be retained in the data-retaining circuit with not enough space in the storage areas to store the requested data and with a stop condition for stopping issuing of the eviction request satisfied, evicts an eviction target data from the data-retaining circuit without issuing the eviction request, and
where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and the second cache further includes a second information-retaining circuit configured to retain second management information that includes second state information for indicating the state of data retained in the first cache, a condition-determining circuit configured to, where the state of the eviction target data evicted from any of the plurality of storage areas being equal to a state not desiring write-back to a storage device connected to the second cache with the eviction target data not retained in the first cache, determine the stop condition to be satisfied, and an eviction control circuit configured to issue the eviction request to the eviction-processing circuit based on an instruction from the eviction-processing circuit.

5. The operation-processing device according to claim 1, further comprising:

a memory control circuit configured to control data transfer between the second cache and a storage device; and a communication interface circuit configured to communicate with another operation-processing device that includes a processor core, a first cache, and a second cache and is connected to another storage device, wherein the eviction-processing circuit, where the state-determining circuit determines the requested data not to be retained in the data-retaining circuit with not enough space in the storage areas to store the requested data and with a stop condition for stopping issuing of the eviction request satisfied, evicts an eviction target data from the data-retaining circuit without issuing the eviction request, and where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and the second cache further includes a condition-determining circuit configured to determine the stop condition to be satisfied where a memory address indicates a storing destination of the eviction target data evicted from the plurality of storage areas being assigned to the storage device, and an eviction control circuit configured to issue the eviction request to the eviction-processing circuit based on an instruction from the eviction-processing circuit.

6. The operation-processing device according to claim 1, further comprising:

a memory control circuit configured to control data transfer between the second cache and a storage device; and a communication interface circuit configured to communicate with another operation-processing device that includes a processor core, a first cache, and a second cache and is connected to another storage device, wherein the eviction-processing circuit where the state-determining circuit determines the requested data not to be retained in the data-retaining circuit with not enough space in the storage areas to store the requested data and with a stop condition for stopping issuing of the eviction request satisfied, evicts an eviction target data from the data-retaining circuit without issuing the eviction request, and where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and the second cache further includes a condition-determining circuit configured to determine the stop condition to be satisfied where a memory address that indicates a storing destination of the eviction target data evicted from the plurality of storage areas being assigned to the storage device with the state of the eviction target data being equal to a state not desiring write-back to the storage device, and an eviction control circuit configured to issue the eviction request to the eviction-processing circuit based on an instruction from the eviction-processing circuit.

7. The operation-processing device according to claim 1, further comprising:

a memory control circuit configured to control data transfer between the second cache and a storage device; and a communication interface circuit configured to communicate with another operation-processing device that includes a processor core, a first cache, and a second cache and is connected to another storage device, wherein the eviction-processing circuit, where the state-determining circuit determines the requested data not to be retained in the data-retaining circuit with not enough space in the storage areas to store the requested data and with a stop condition for stopping issuing of the eviction request satisfied, evicts an eviction target data from the data-retaining circuit without issuing the eviction request, and where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and the second cache further includes a second information-retaining circuit configured to retain second management information that includes second state information for indicating the state of data retained in the first cache, a condition-determining circuit configured to determine the stop condition to be satisfied where a memory address indicates a storing destination of the eviction target data evicted from the plurality of storage areas being assigned to the storage device with the eviction target data not retained in the first cache, and an eviction control circuit configured to issue the eviction request to the eviction-processing circuit based on an instruction from the eviction-processing circuit.

8. The operation-processing device according to claim 1, further comprising:

a memory control circuit configured to control data transfer between the second cache and a storage device; and a communication interface circuit configured to communicate with another operation-processing device that includes a processor core, a first cache, and a second cache and is connected to another storage device,
wherein the eviction-processing circuit,
where the state-determining circuit determines the requested data not to be retained in the data-retaining circuit with not enough space in the storage areas to store the requested data and with a stop condition for stopping issuing of the eviction request satisfied, evicts an eviction target data from the data-retaining circuit without issuing the eviction request, and
where the state-determining circuit determines the requested data not to be retained in the data-retaining circuit with not enough space in the storage areas to store the requested data and with the stop condition not satisfied, provides an instruction to issue the eviction request and evicts the eviction target data from the data-retaining circuit based on the issued eviction request, and
the second cache further includes
a second information-retaining circuit configured to retain second management information that includes second state information for indicating the state of data retained in the first cache,
a condition-determining circuit configured to determine the stop condition to be satisfied where a memory address that indicates a storing destination of the eviction target data evicted from any of the plurality of storage areas being assigned to the storage device with the state of the eviction target data being equal to a state not desiring write-back to the storage device and with the eviction target data not retained in the first cache, and
an eviction control circuit configured to issue the eviction request to the eviction-processing circuit based on an instruction from the eviction-processing circuit.

9. The operation-processing device according to claim 3, wherein a plurality of the processor cores,
the first cache is disposed in respective correspondence with the plurality of the processor cores,
the second cache is disposed in common for the plurality of processor cores, and
the condition-determining circuit, where detecting, based on the second management information, the eviction target data not being retained in the plurality of first caches and detecting a process of evicting the eviction target data from any of the plurality of first caches not being executed, determines the eviction target data not to be retained in the first cache.

10. The operation-processing device according to claim 4, wherein a plurality of the processor cores,
the first cache is disposed in respective correspondence with the plurality of the processor cores,
the second cache is disposed in common for the plurality of processor cores, and
the condition-determining circuit, where detecting, based on the second management information, the eviction target data not being retained in the plurality of first caches and detecting a process of evicting the eviction target data from any of the plurality of first caches not being executed, determines the eviction target data not to be retained in the first cache.

11. The operation-processing device according to claim 7, wherein a plurality of the processor cores,
the first cache is disposed in respective correspondence with the plurality of the processor cores,
the second cache is disposed in common for the plurality of processor cores, and
the condition-determining circuit, where detecting, based on the second management information, the eviction target data not being retained in the plurality of first caches and detecting a process of evicting the eviction target data from any of the plurality of first caches not being executed, determines the eviction target data not to be retained in the first cache.

12. The operation-processing device according to claim 8, wherein a plurality of the processor cores,
the first cache is disposed in respective correspondence with the plurality of the processor cores,
the second cache is disposed in common for the plurality of processor cores, and
the condition-determining circuit, where detecting, based on the second management information, the eviction target data not being retained in the plurality of first caches and detecting a process of evicting the eviction target data from any of the plurality of first caches not being executed, determines the eviction target data not to be retained in the first cache.

13. The operation-processing device according to claim 1, a plurality of the processor cores;
the first cache is disposed in respective correspondence with the plurality of the processor cores,
the second cache
is disposed in common for the plurality of processor cores, and
further includes a condition-determining circuit configured to determine that a process of evicting an eviction target data from the plurality of first caches is not being executed, and
the eviction-processing circuit, where the state-determining circuit determines the requested data not to be retained in the data-retaining circuit with not enough space in the storage areas to store the requested data, with the eviction target data retained in the plurality of first caches, and with the process of evicting the eviction target data from the plurality of first caches not being executed, notifies an eviction instruction to evict the eviction target data from the first cache to the first cache for retaining the eviction target data and, after receiving response information that indicates completion of a process based on the eviction instruction, evicts the eviction target data from the data-retaining circuit without issuing the eviction request.

14. The operation-processing device according to claim 13,
wherein the data-retaining circuit includes a plurality of ways configured to retain data for each first index that is represented by a bit group of a part of a memory address used in data access,
each of the plurality of first caches includes at least one way configured to retain data for each second index that is represented by a bit group of a part of the first index,
the second cache further includes
a second information-retaining circuit configured to retain, for each second index, second management information for managing data retained in the first cache for each way of the plurality of first caches, the second management information being information including a way identifier that indicates a way, of the plurality of ways, retaining management target data, a difference index that indicates the difference between the second index and the first index, and a state identifier that indicates a state of the management target data, a decoding circuit configured to decode a logical value indicated by the way identifier of the second management information specified by the second index to generate, for each way of the plurality of first caches, decoded information that includes a bit for indicating truth or falsity for each of the plurality of ways, a match-flag-generating circuit configured to generate, for each way of the plurality of first caches, a match flag that indicates truth where the difference index of the second management information specified by the second index matching information of a part of a memory address of the requested data corresponding to the difference index, a logical product circuit configured to calculate, for each way of the plurality of first caches, a logical product of a validity bit, each bit of the decoded information, and the match flag, the validity bit for indicating truth where the state identifier of the second management information specified by the second index for indicating that data is valid, and a logical sum circuit configured to calculate a logical sum of a calculation result of the logical product circuit for each first cache and output a calculation result as possession information of each of the plurality of first caches to the eviction-processing circuit, and the eviction-processing circuit specifies the first cache retaining the eviction target data based on the possession information of each of the plurality of first caches.

15. The operation-processing device according to claim 9, wherein the data-retaining circuit includes a plurality of ways configured to retain data for each first index that is represented by a bit group of a part of a memory address used in data access, the second cache further includes a third information-retaining circuit configured to retain third management information for managing, for each first cache, data of a target of a process of evicting data from the first cache, the third management information being information including a way identifier that indicates a way, of the plurality of ways, retaining management target data, a first index included in a memory address of the management target data, and a validity bit that indicates that the management target data is valid, a decoding circuit configured to decode a logical value indicated by the way identifier of the third management information to generate, for each third management information, decoded information that includes a bit for indicating truth or falsity for each of the plurality of ways, a match-flag-generating circuit configured to generate, for each third management information, a match flag that indicates truth where the first index of the third management information matching the first index of the requested data, a logical product circuit configured to calculate, for each third management information, a logical product of the validity bit of the third management information, each bit of the decoded information, and the match flag, and a logical sum circuit configured to calculate a logical sum of a calculation result of the logical product circuit for each of the plurality of ways, and the condition-determining circuit, based on a calculation result of the logical sum circuit, determines that a process of evicting the eviction target data from the plurality of first caches is not being executed.

16. The operation-processing device according to claim 10, wherein the data-retaining circuit includes a plurality of ways configured to retain data for each first index that is represented by a bit group of a part of a memory address used in data access, the second cache further includes a third information-retaining circuit configured to retain third management information for managing, for each first cache, data of a target of a process of evicting data from the first cache, the third management information being information including a way identifier that indicates a way, of the plurality of ways, retaining management target data, a first index included in a memory address of the management target data, and a validity bit that indicates that the management target data is valid, a decoding circuit configured to decode a logical value indicated by the way identifier of the third management information to generate, for each third management information, decoded information that includes a bit for indicating truth or falsity for each of the plurality of ways, a match-flag-generating circuit configured to generate, for each third management information, a match flag that indicates truth where the first index of the third management information matching the first index of the requested data, a logical product circuit configured to calculate, for each third management information, a logical product of the validity bit of the third management information, each bit of the decoded information, and the match flag, and a logical sum circuit configured to calculate a logical sum of a calculation result of the logical product circuit for each of the plurality of ways, and the condition-determining circuit, based on a calculation result of the logical sum circuit, determines that a process of evicting the eviction target data from the plurality of first caches is not being executed.

17. The operation-processing device according to claim 1, wherein a process of evicting data from the plurality of storage areas includes a process of writing the data evicted from the plurality of storage areas back to a storage device that is connected to the second cache.

18. An information processing apparatus comprising:

a plurality of operation-processing devices, each of which is configured to include a processor core configured to execute an instruction, a first cache configured to retain data used by the processor core, and a second cache configured to be connected to the first cache, wherein the second cache includes a data-retaining circuit configured to include a plurality of storage areas to retain data, a first information-retaining circuit configured to retain first management information that includes first state information for indicating a state of data retained in the data-retaining circuit, a state-determining circuit configured to determine, based on the first management information, whether a requested data requested with a read request from the first cache is retained in the data-retaining circuit, and an eviction-processing circuit configured to, during an execution cycle of the read request and where the state-determining circuit determines the requested data not to be retained in the data-retaining circuit with not enough space in the storage areas to store the requested data, execute a process based upon whether a condition of a stop condition to stop issuance of an eviction request is satisfied, to cause eviction of data from any of the plurality of storage areas without issuance of an eviction request during the execution cycle of the read request.

19. A control method for an operation processing device including a processor core configured to execute an instruction, a first cache configured to retain data used by the processor core, and a second cache configured to be connected to the first cache and to include a data-retaining circuit configured to include storage areas to retain data and a first information-retaining circuit configured to retain first management information that includes first state information indicating a state of data retained in the data-retaining circuit, the method comprising:

determining whether a requested data requested with a read request from the first cache is retained in the data-retaining circuit, and during an execution cycle of the read request and in response to determining the requested data not to be retained in the data-retaining circuit with not enough space in the storage areas to store the requested data, executing a process based upon whether a condition of a stop condition to stop issuance of an eviction request is satisfied, to cause eviction of data from any of the storage areas without issuance of an eviction request during the execution cycle of the read request.

* * * * *